(12) United States Patent
Anagnostopoulos

(10) Patent No.: US 11,790,539 B1
(45) Date of Patent: *Oct. 17, 2023

(54) OPTICAL SYSTEM FOR TRACKING THE HEADING AND POSITION OF AN IMPLEMENT COMPARED TO THE PULLING TRACTOR AND OTHER USES

(71) Applicant: Ag Leader Technology, Inc., Ames, IA (US)

(72) Inventor: Trenton Anagnostopoulos, Ames, IA (US)

(73) Assignee: Ag Leader Technology, Inc., Ames, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/656,291

(22) Filed: Mar. 24, 2022

Related U.S. Application Data

(62) Division of application No. 16/947,827, filed on Aug. 19, 2020, now Pat. No. 11,315,258.

(Continued)

(51) Int. Cl.
| | | |
|---|---|---|
| *G06T 7/246* | (2017.01) | |
| *G06T 7/70* | (2017.01) | |
| *G01S 19/01* | (2010.01) | |
| *G06V 10/34* | (2022.01) | |
| *G06V 20/56* | (2022.01) | |
| *H04N 23/55* | (2023.01) | |
| *H04N 23/56* | (2023.01) | |

(52) U.S. Cl.
CPC .............. *G06T 7/246* (2017.01); *G01S 19/01* (2013.01); *G06T 7/70* (2017.01); *G06V 10/34* (2022.01); *G06V 20/56* (2022.01); *H04N 23/55* (2023.01); *H04N 23/56* (2023.01); *G06T 2207/30252* (2013.01)

(58) Field of Classification Search
CPC . G06T 7/246; G06T 7/70; G06T 2207/30252; H04N 5/2254; H04N 5/2256; G06K 9/44; G06K 9/00791; G01S 19/01
See application file for complete search history.

(56) References Cited

U.S. PATENT DOCUMENTS

| | | |
|---|---|---|
| 5,001,650 A | 3/1991 | Francis et al. |
| 5,582,013 A | 12/1996 | Neufeld |

(Continued)

OTHER PUBLICATIONS

Ababsa et al., "Robust Camera Pose Estimation Using 2D Fiducials Tracking for Real-Time Augmented Reality Systems", ACM SIGGRAPH International Conference on Virtual Realty Continuum and its Applications in Industry, held at Nanyang Technological University, Singapore, 5 pages, on Jun. 16, 2004.

(Continued)

*Primary Examiner* — Nasim N Nirjhar
(74) *Attorney, Agent, or Firm* — McKee, Voorhees & Sease, PLC

(57) ABSTRACT

Methods, apparatus, and systems for sensing or tracking relative position between objects or locations. A digital camera or imager captures one or more fiducials in its field of view. By calibration and processing, the imaged fiducials can be identified and distinguished from other objects and background in camera space, and position of imaged fiducials in camera space relative to a reference can be translated to position of the actual fiducials in physical space. In one example, the fiducials are IR LEDs.

23 Claims, 41 Drawing Sheets

Related U.S. Application Data

(60) Provisional application No. 62/888,662, filed on Aug. 19, 2019.

(56) References Cited

U.S. PATENT DOCUMENTS

| | | | |
|---|---|---|---|
| 6,324,296 | B1 | 11/2001 | McSheery et al. |
| 6,539,107 | B1 | 3/2003 | Michael et al. |
| 6,865,465 | B2 | 3/2005 | McClure |
| 7,336,814 | B2 | 2/2008 | Boca et al. |
| 8,090,507 | B2 | 1/2012 | Yegerlehner et al. |
| 8,310,656 | B2 | 11/2012 | Zalewski |
| 8,600,629 | B2 | 12/2013 | Zielke |
| 8,839,681 | B2 | 9/2014 | Stewart et al. |
| 9,629,304 | B2 | 4/2017 | Zielke |
| 9,678,583 | B2 | 6/2017 | Cheng |
| 9,804,603 | B1 | 10/2017 | Yegerlehner |
| 9,964,559 | B2 | 5/2018 | Zielke et al. |
| 10,024,977 | B1 | 7/2018 | Schneider et al. |
| 2006/0119574 | A1 | 6/2006 | Richardson et al. |
| 2006/0142936 | A1 | 6/2006 | Dix |
| 2008/0211771 | A1 | 9/2008 | Richardson |
| 2008/0231701 | A1* | 9/2008 | Greenwood ........... G08G 1/167 |
| | | | 348/148 |
| 2009/0128482 | A1 | 5/2009 | Richardson |
| 2009/0187315 | A1 | 7/2009 | Yegerlehner et al. |
| 2011/0259618 | A1 | 10/2011 | Zielke et al. |
| 2012/0105585 | A1 | 5/2012 | Masalkar et al. |
| 2013/0238200 | A1 | 9/2013 | Woodcock |
| 2014/0200759 | A1 | 7/2014 | Lu et al. |
| 2016/0148045 | A1* | 5/2016 | Bicer ...................... G06T 7/246 |
| | | | 348/370 |
| 2016/0264220 | A1* | 9/2016 | Laceky ................. B60P 3/1075 |
| 2017/0337700 | A1 | 11/2017 | Wilson et al. |
| 2018/0127027 | A1* | 5/2018 | Brennan ................ B62D 13/06 |
| 2018/0036474 | A1 | 12/2018 | Collins et al. |
| 2018/0364740 | A1* | 12/2018 | Collins ................ G06V 20/176 |
| 2020/0057453 | A1 | 2/2020 | Laws et al. |

OTHER PUBLICATIONS

Daftry et al., "Flexible and User-Centric Camera Calibration using Planar Fiducial Markers", Proceedings of British Machine Vision Conference (BMVC), 13 pages, Sep. 2013.

Kawai et al., "Anti-sway system with image sensor for container cranes", Journal of Mechanical Science and Technology, vol. 23, pp. 2757-2765, Apr. 29, 2009.

Kim et al., "Kalman Filtering for Relative Spacecraft Attitude and Position Estimation", AIAA Guidance, Navigation and Control Conference and Exhibit, San Francisco, CA, 18 pages, Aug. 15, 2005.

Zanuttigh et al., "Operating Principles of Structured Light Depth Cameras", Time-of-Flight and structured light depth cameras: Technology and Applications, pp. 43-79, May 2016.

* cited by examiner (COMBINE: 1. KNOWN GEO POSITION OF OBJECT 1 and 2. OPTICAL DETECTION OF OBJECT 2 THROUGH FREE SPACE)

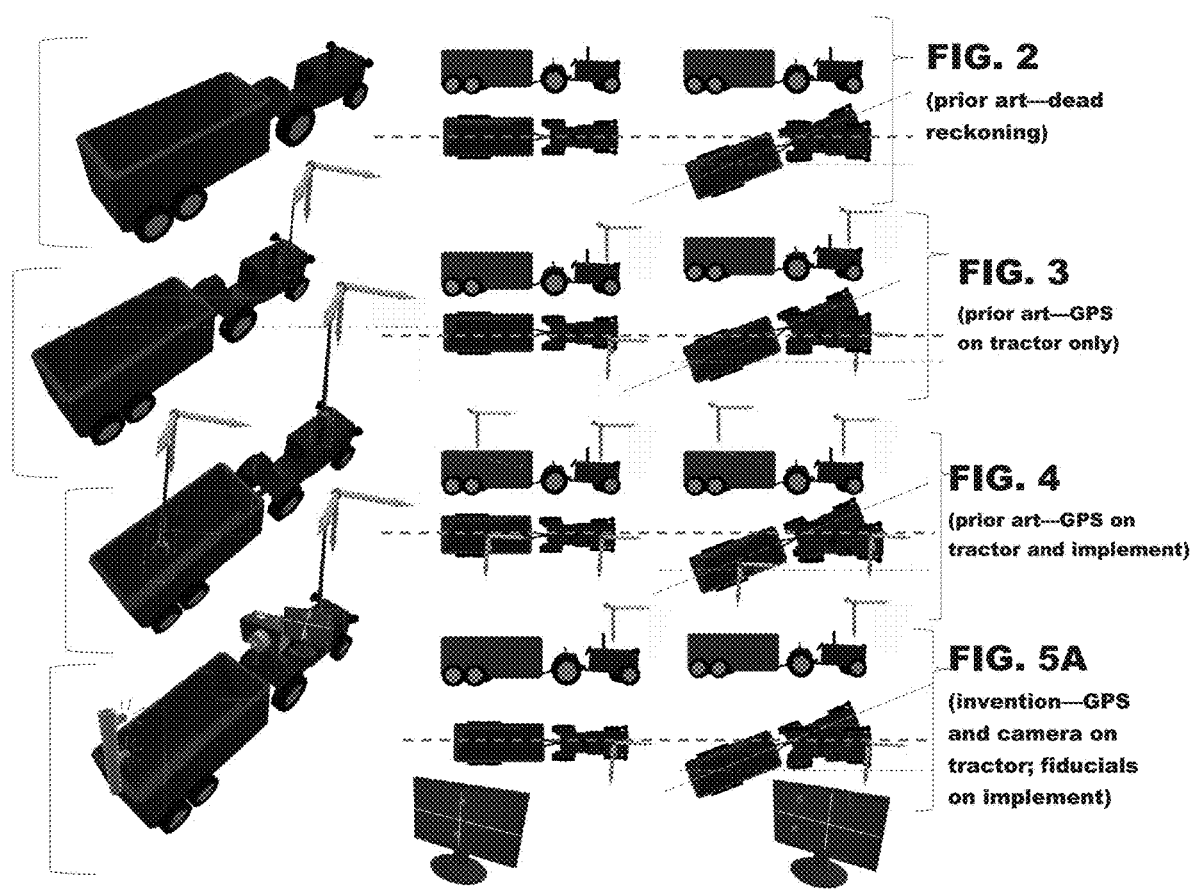

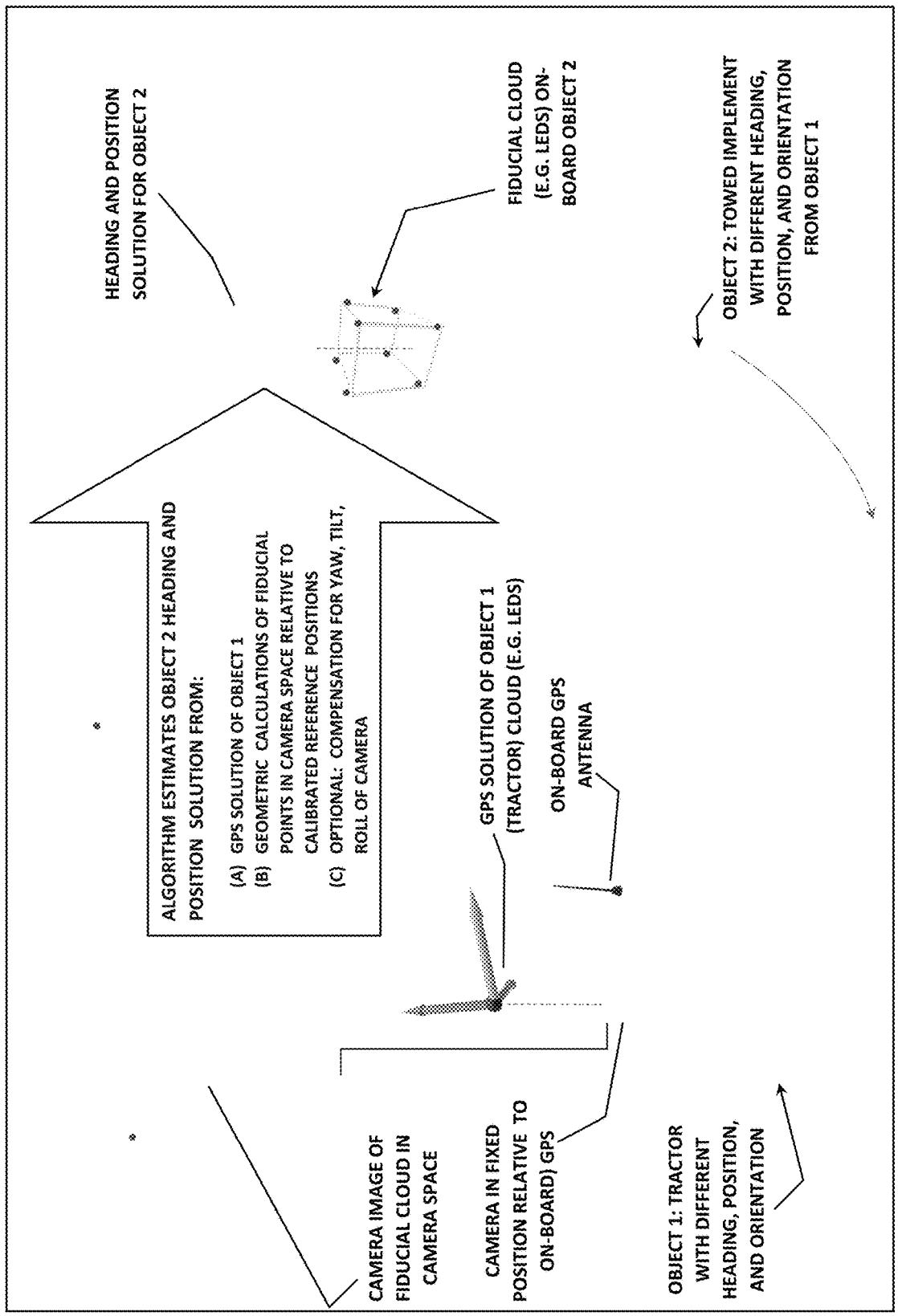
FIG. 5B (invention)

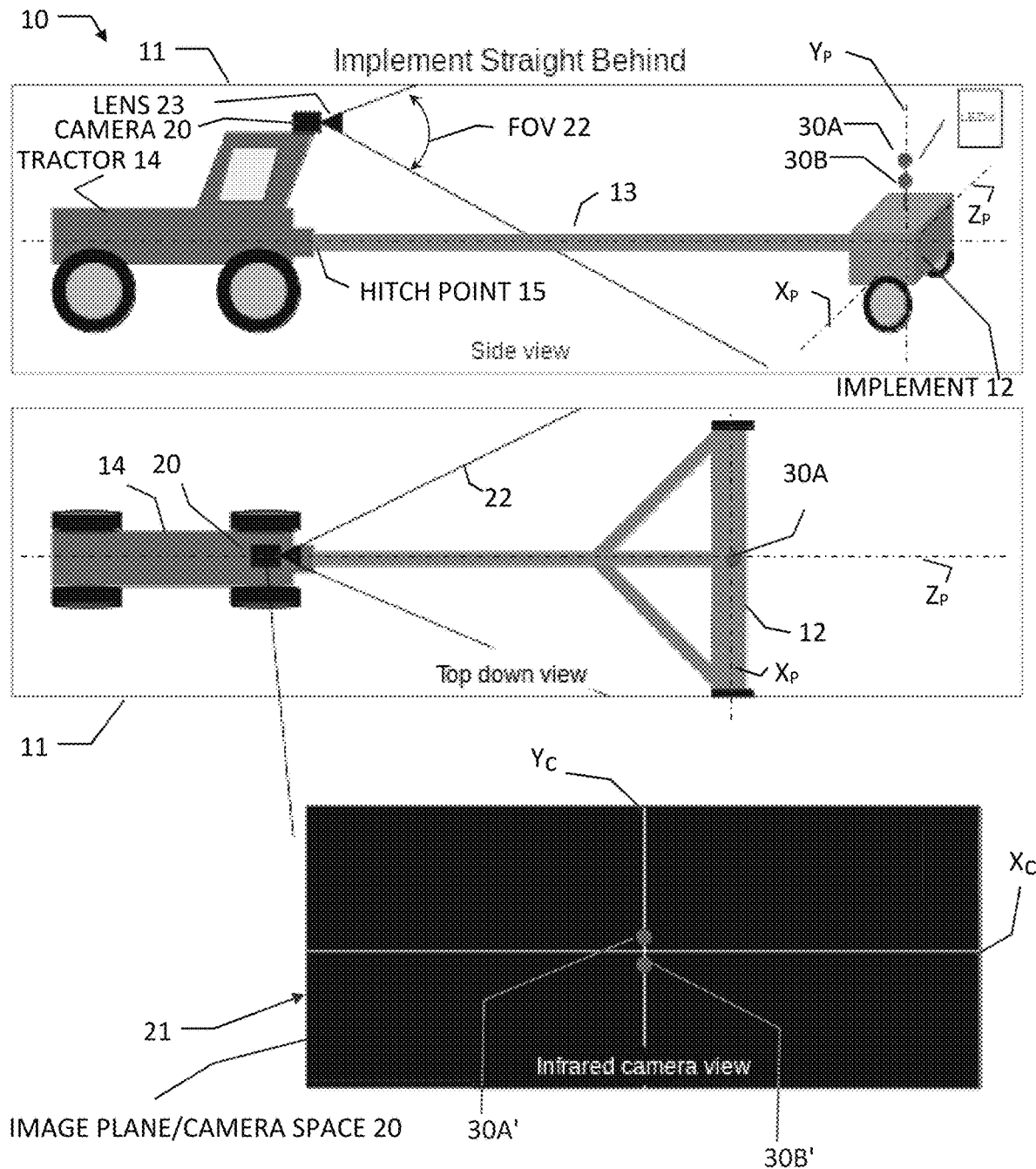
FIG. 6A (simple example of invention: calibration position)

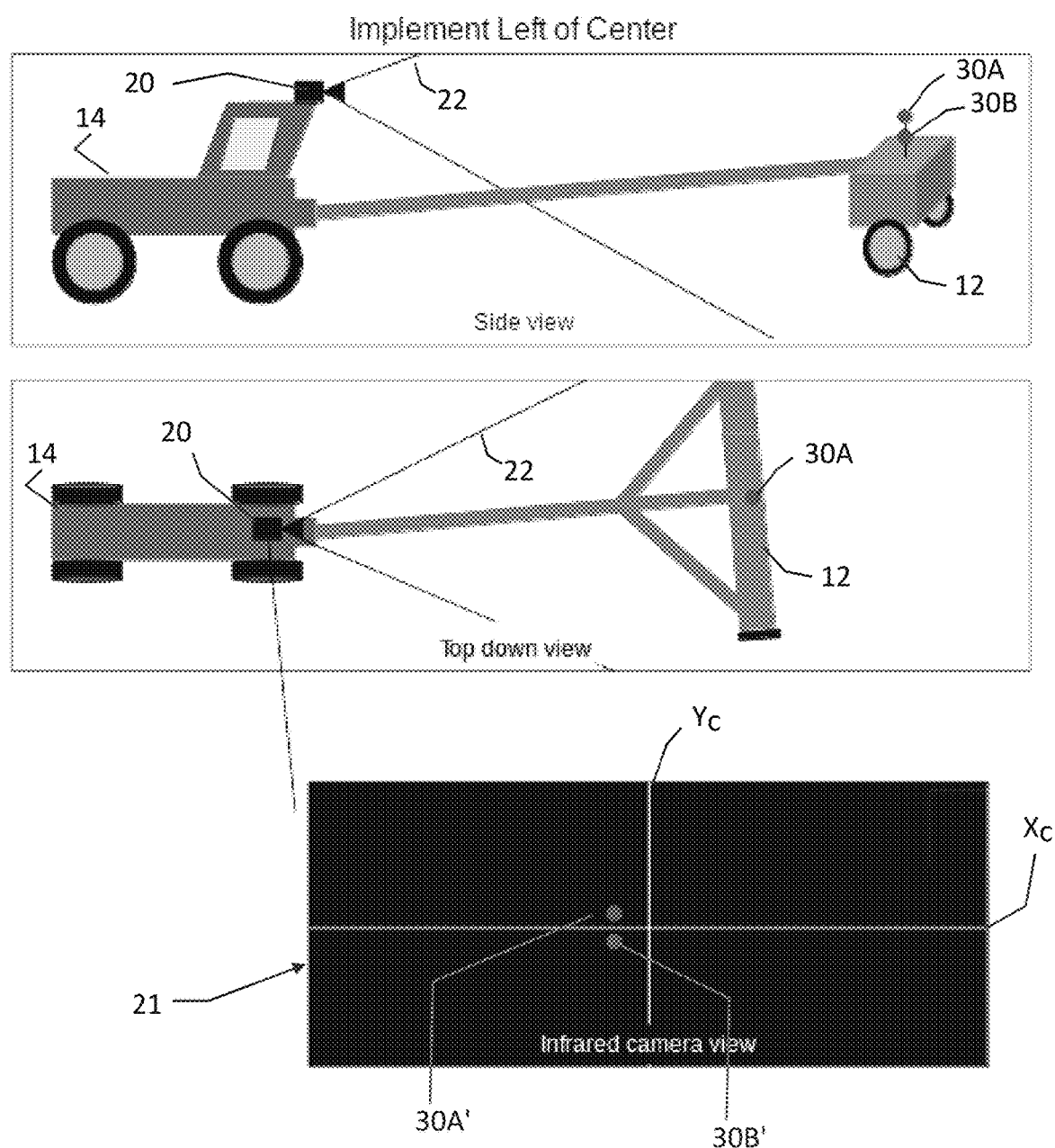
FIG. 6B (simple example of invention: measuring position)

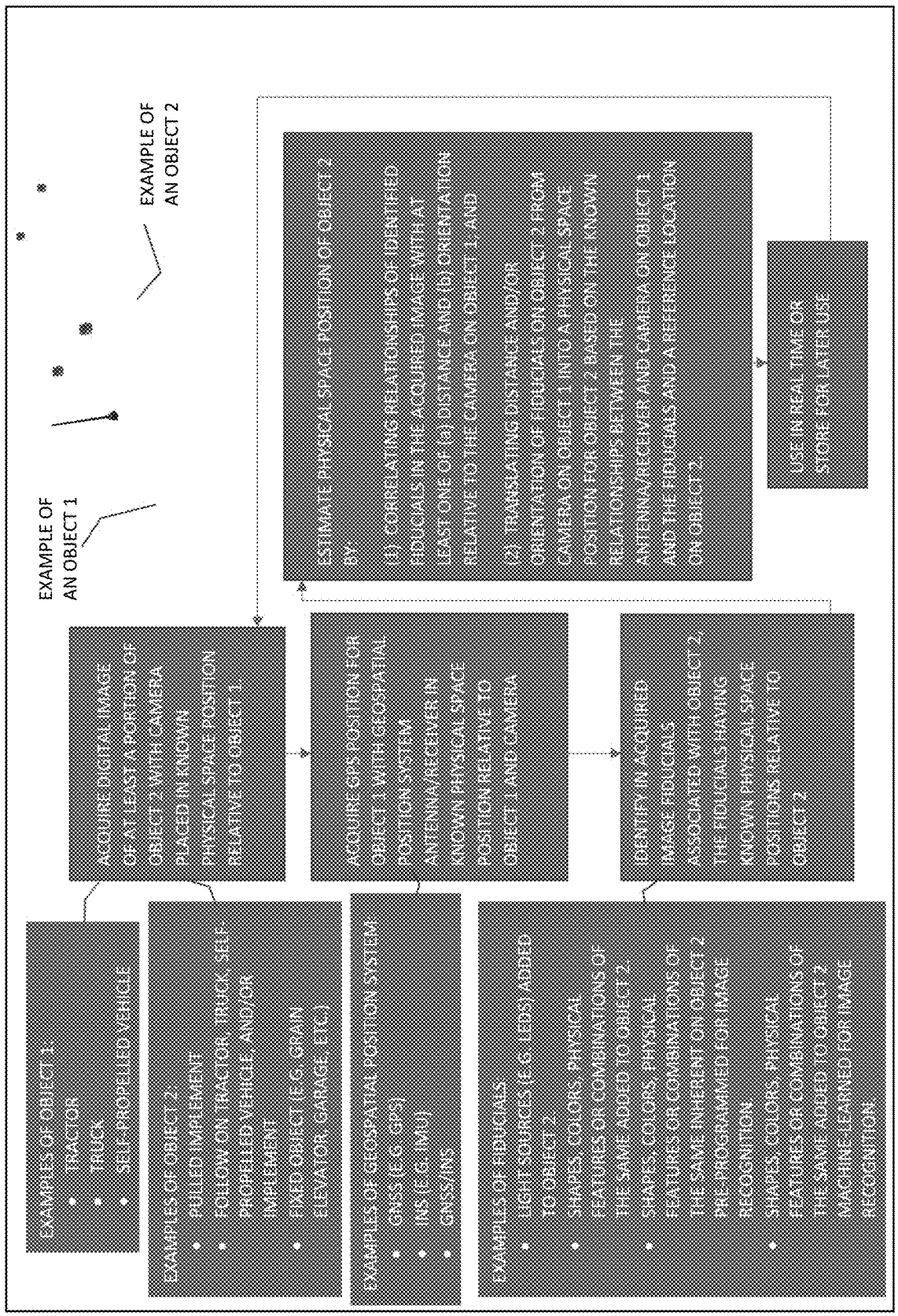
FIG. 7A (example of invention: system)

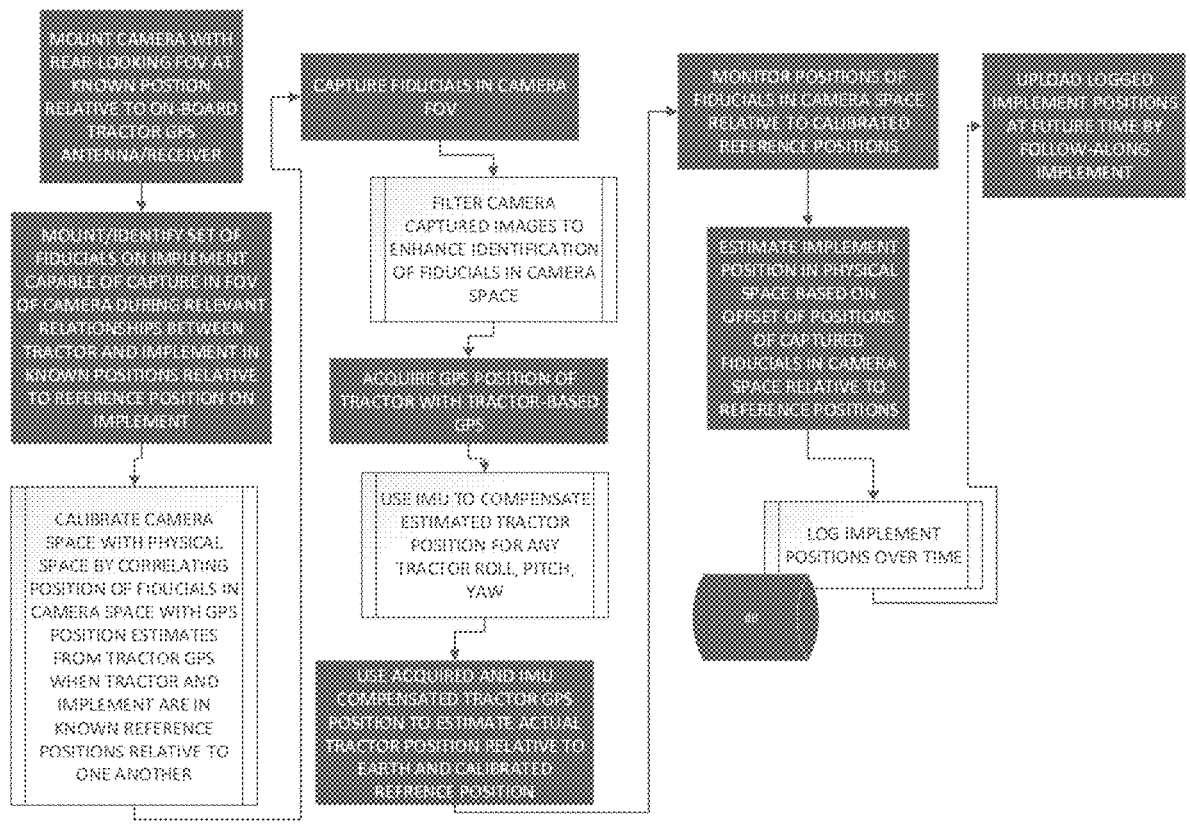
FIG. 7B (example of invention: method including enhancement techniques)

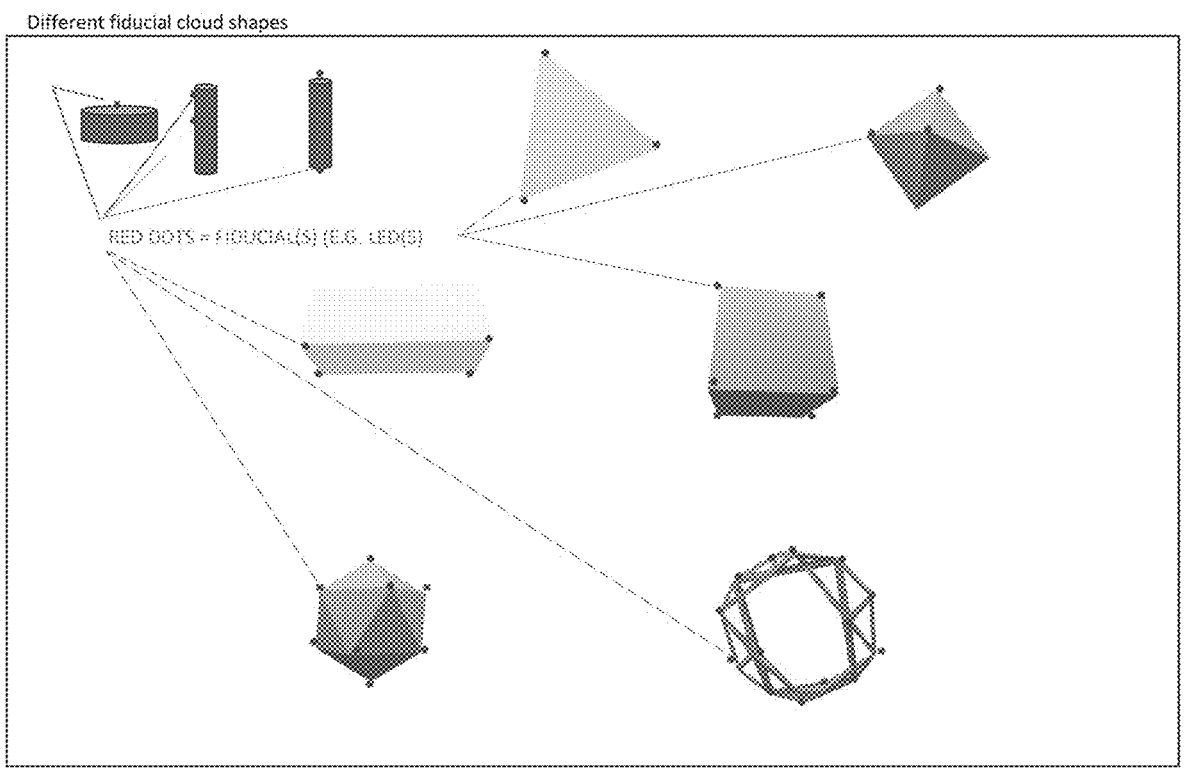
FIG. 8 (a few examples of fiducials or fiducial clouds)

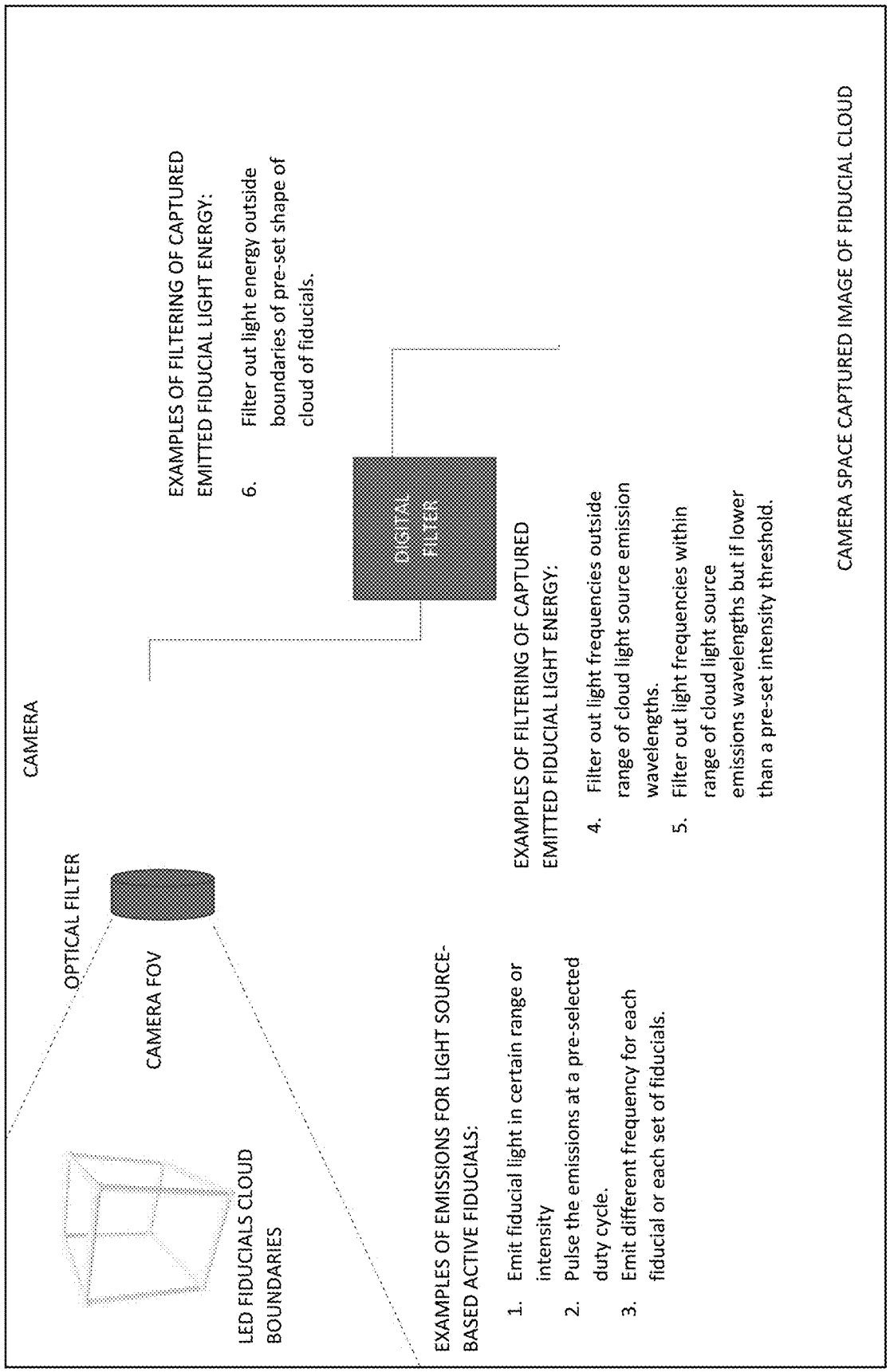
FIG. 9 (examples of LED operation or filtering techniques)

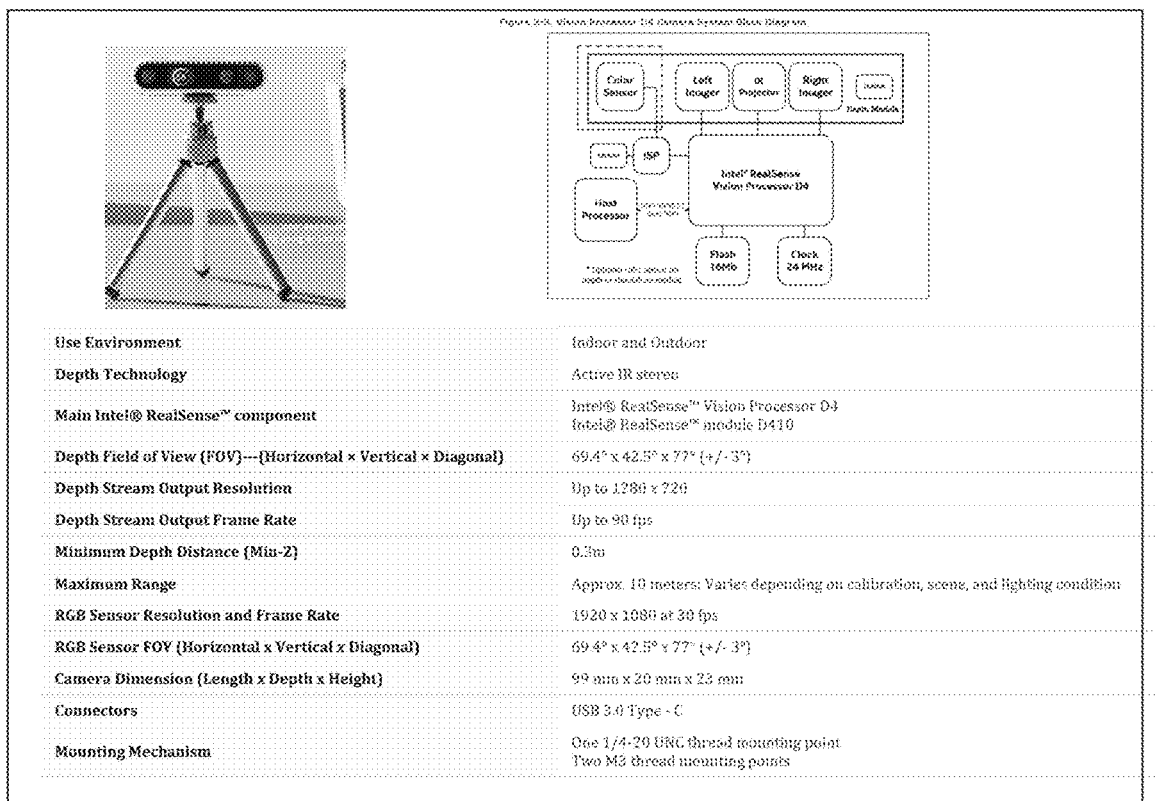
FIG. 10 (camera with depth sensing)

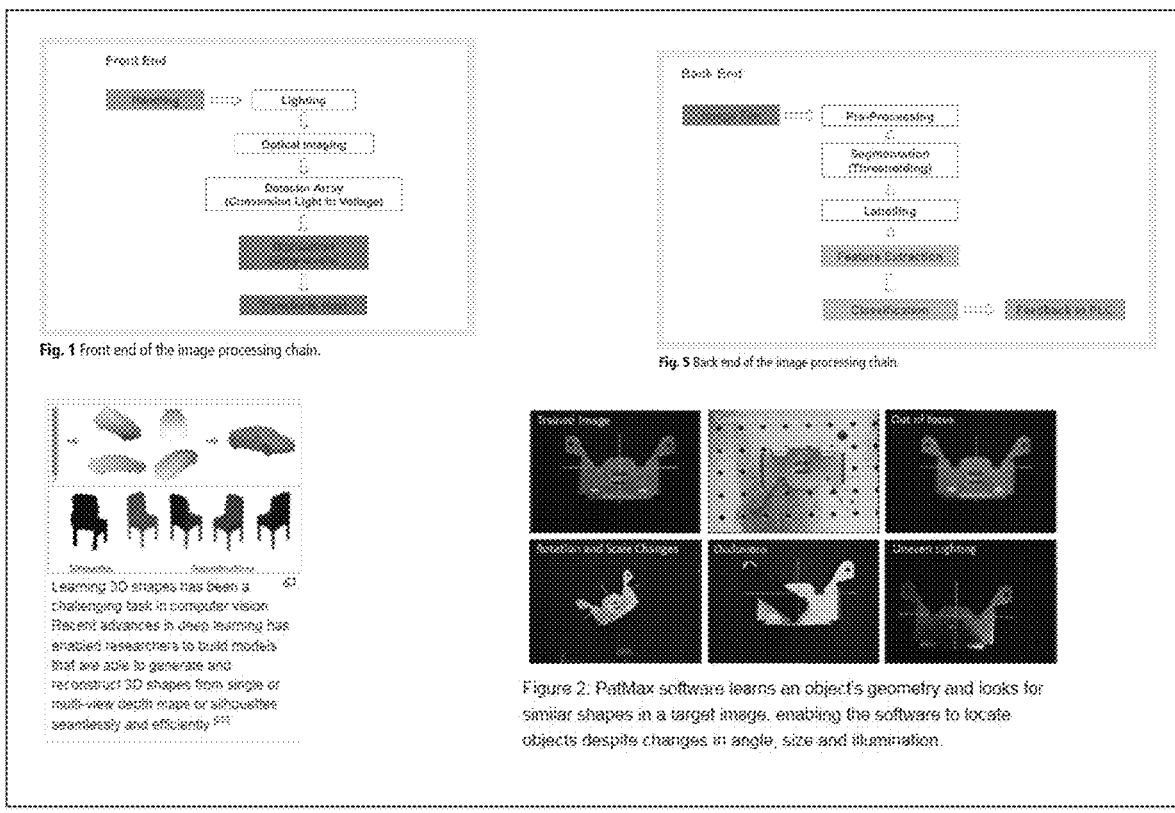
FIG. 11A (illustrations of use of machine vision for inherent fiducial recognition)

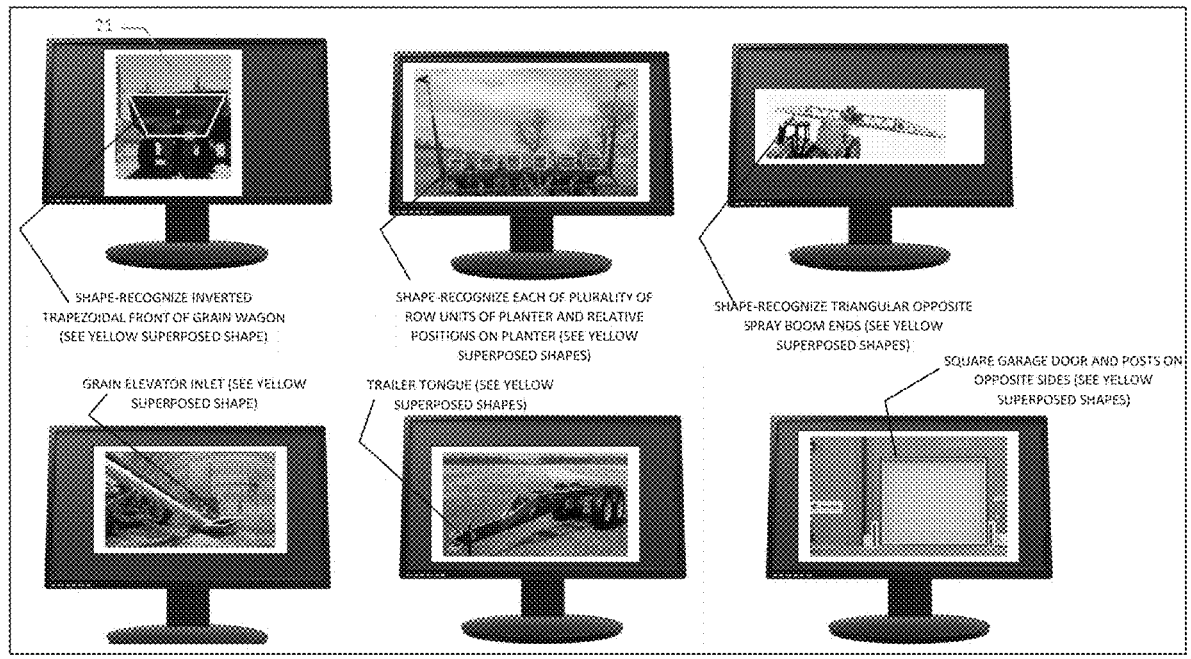
FIG. 11B (non-limiting examples of inherent fiducials that can be learned with machine vision—learned shapes indicated in yellow outlining)

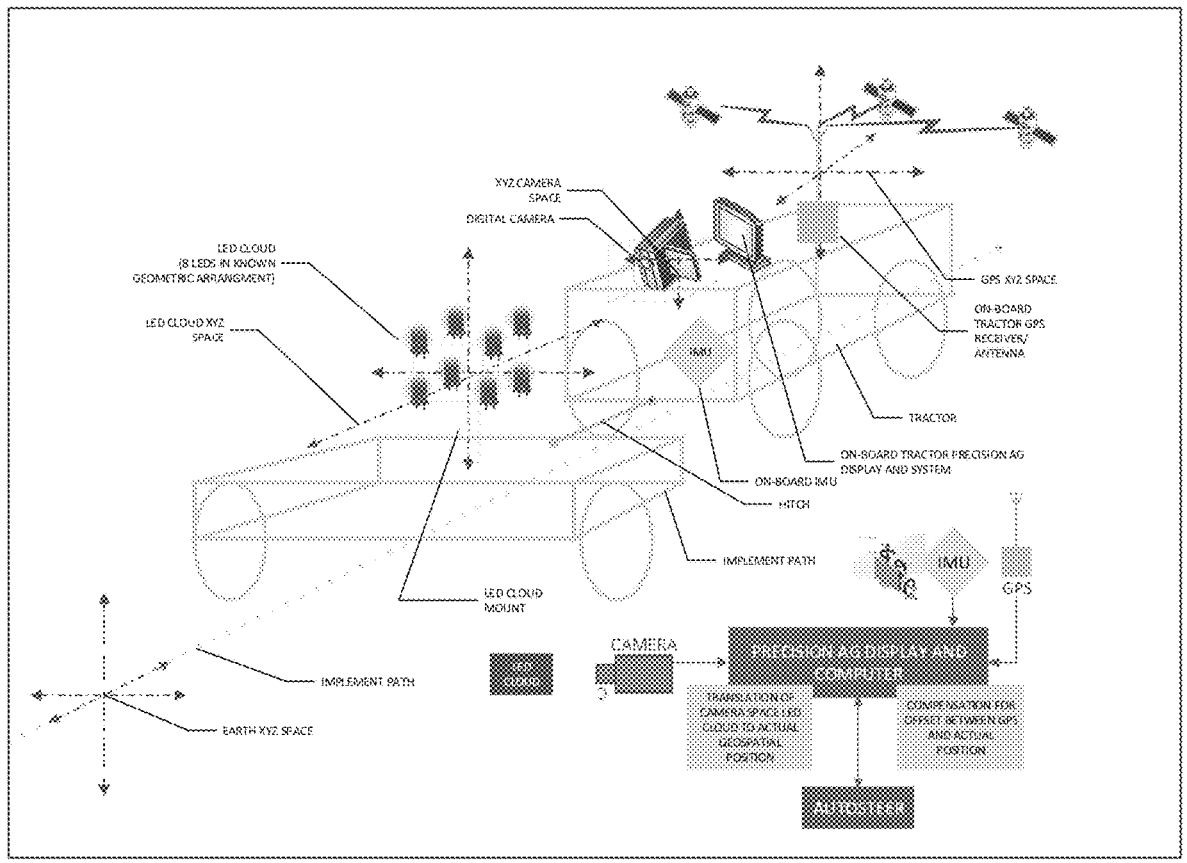
FIG. 12 (illustration of use of IMU to compensate for camera movement)

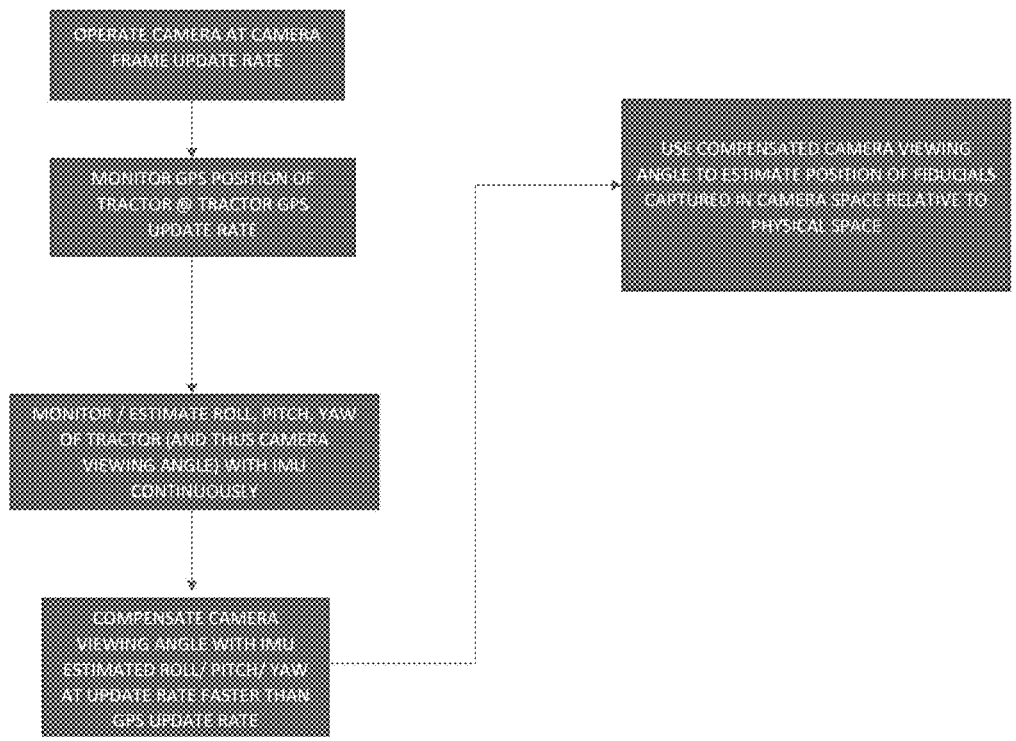
FIG. 13 (method of compensation for refresh rate differences between camera, GPS, and IMU)

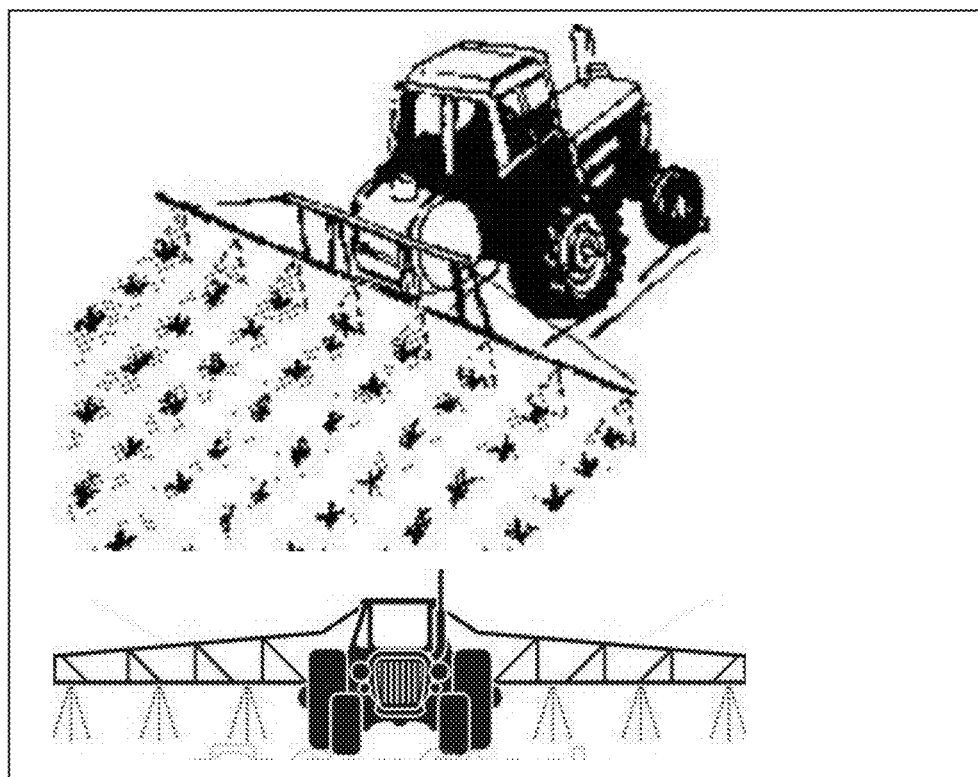
FIG. 14A (Illustrations of row crop boom sprayers)

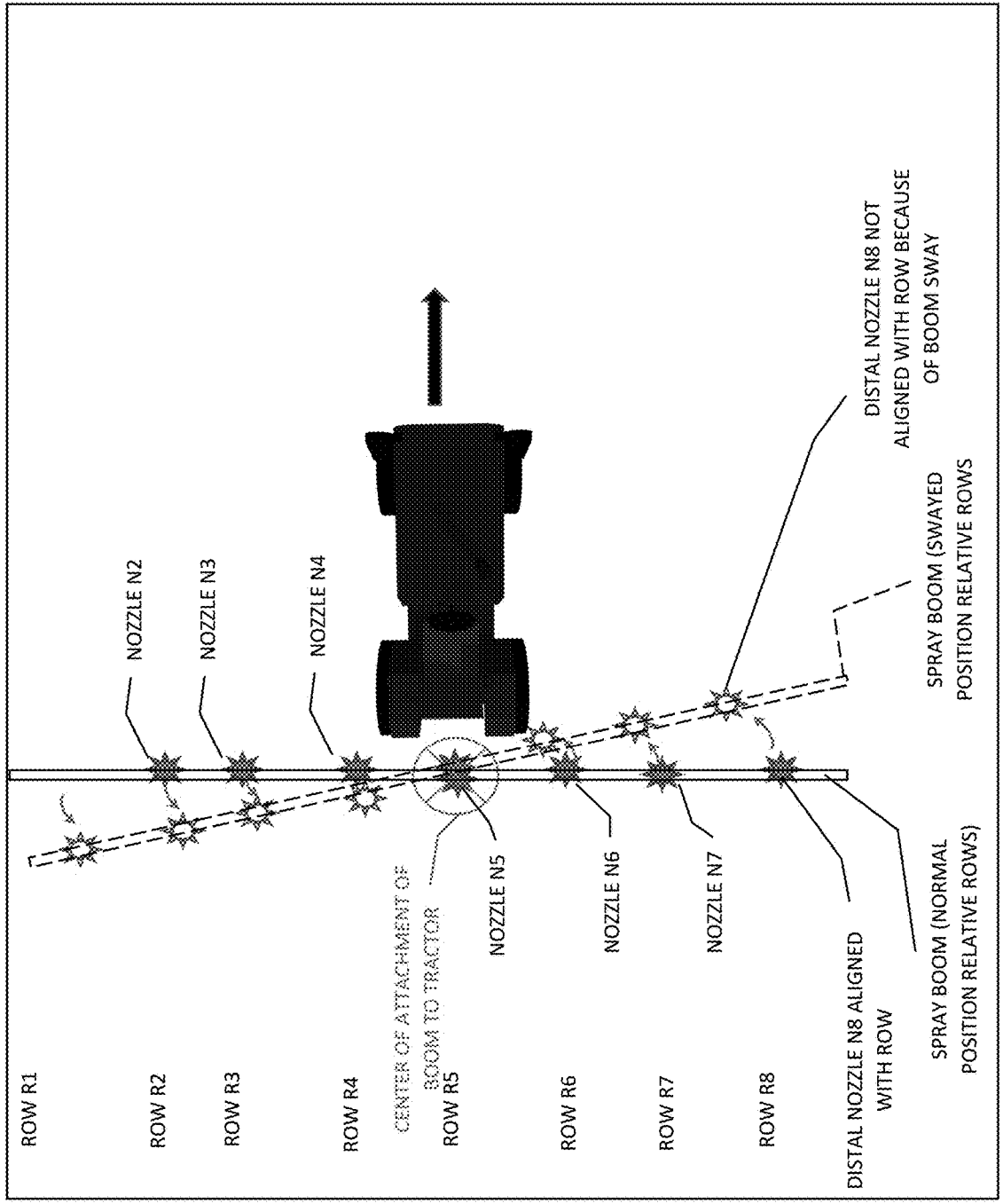
FIG. 14B (Illustration of boom sway)

4.1. Camera Model and Coordinates

The configuration of our system includes only a moving CCD video camera. There are three principal coordinate systems, as illustrated in Figure 4: the world coordinate system W, the camera-centered coordinate system C, and the 2D image coordinate system U.

Figure 4. Camera model and the related coordinates systems.

A pinhole camera models the imaging process. The origin of C is at the projection center of camera. The transformation from W to C is:

$$\begin{bmatrix} x_c \\ y_c \\ z_c \end{bmatrix} = R \begin{bmatrix} x_w \\ y_w \\ z_w \end{bmatrix} + t \begin{bmatrix} t_x \\ t_y \\ t_z \end{bmatrix}$$

(6)

where the rotation matrix $R$ and the translation vector $t$ characterize the orientation and the position of the camera with respect to the world coordinate frame. Under perspective projection, the transformation from W to U is:

4.2. Camera Calibration

Internal, as well as, external camera parameters are determined by an automated (i.e. with no user interaction) camera calibration procedure. A highly precise camera calibration is required for a good initialisation of the camera pose tracker. For that purpose, we have used our fiducials tracking algorithm to generate enough 2D-3D matched points. The calibration parameters are then computed by an iterative least-squares estimation [Faugeras, 1993].

The intrinsic parameters $K$ remain constant during the camera tracking mode. The external parameters describe the transformation (rotation and translation) from world to camera coordinates and undergo dynamic changes during a session (e.g. camera motion). Once the camera calibration is finished, the system passes in tracking mode, and uses the obtained external camera parameters for the first initialisation of the camera pose. The current camera pose is then computed using the OI algorithm described below.

4.3. Orthogonal Iteration Algorithm

The OI algorithm allows to dynamically determine the external camera parameters using 2D-3D correspondences established by the 2D fiducials tracking algorithm from the current video image. The main idea of this algorithm is first in defining pose estimation using an appropriate object space error function, in this case object-space collinearity error vector, and then in showing that this function can be rewritten in a way which admits an iteration based on the solution to the 3D-3D pose estimation or absolute orientation problem [Arun et al. 1987]. Otherwise, the OI algorithm converge to an optimum for any set of observed points and any starting point $R^{(0)}$. However, in order to reduce the average number of iteration taken by OI to converge, we initialize it near the optimum for each new acquired image. So, at time $t$ (corresponding to the current image), we initialize the rotation matrix by the matrix $R$ found at time $t-1$ (corresponding to the previous image).

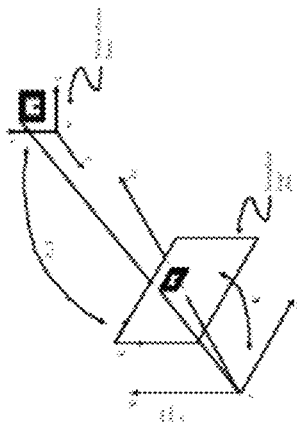

FIG. 15A (Example of camera space calibration of fiducials to physical space)

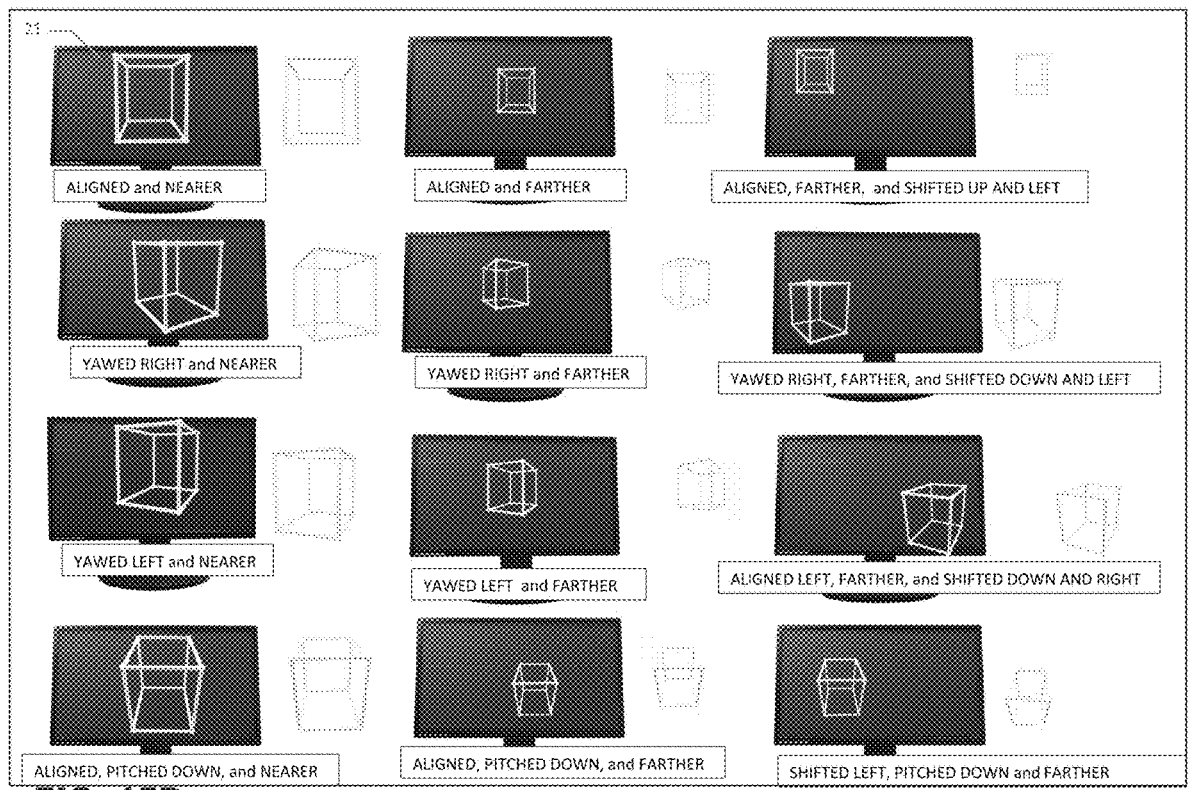
FIG. 15B (illustrations of examples of trained calibration set of 8 fiducials (at each corner of box))

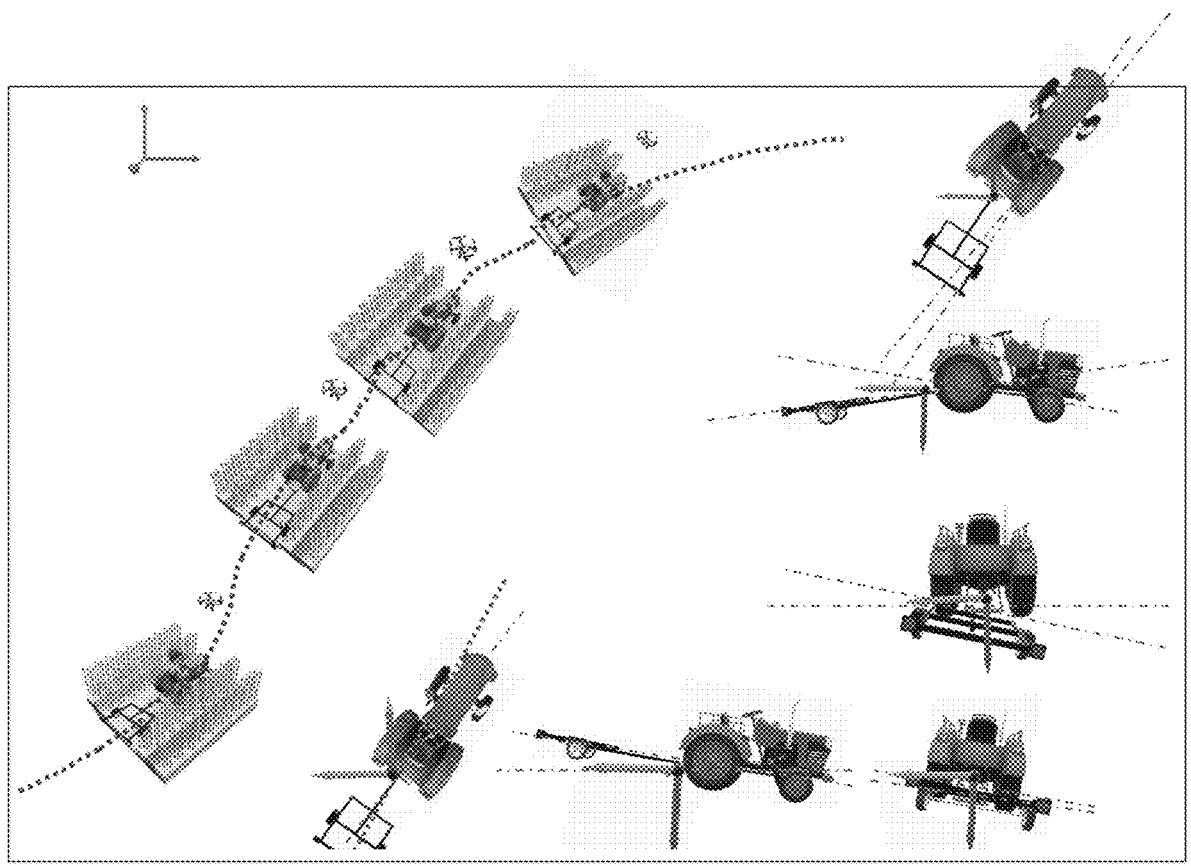
FIG. 16 (illustration of follow along problem)

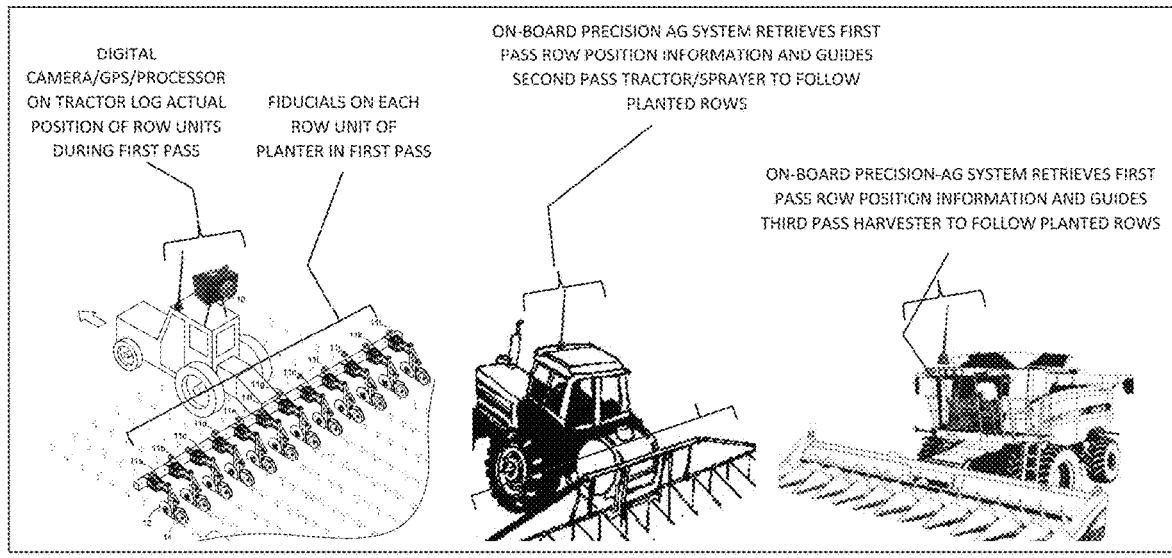
FIG. 17 (Illustration of how stored first pass implement position information is used in second pass, follow along navigation)

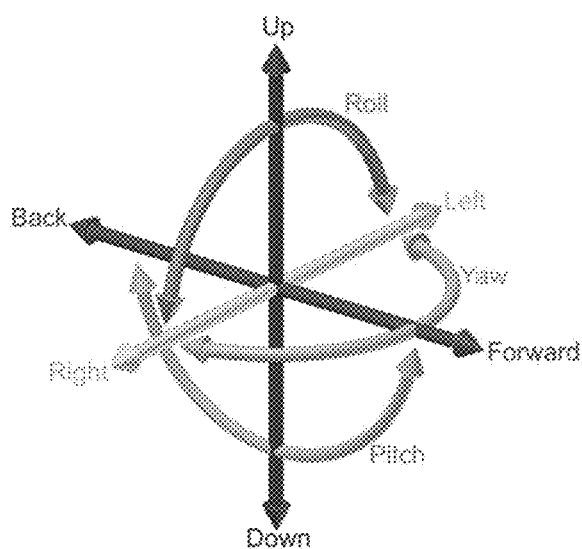
FIG. 19 (illustration of 6-Axis measurements)

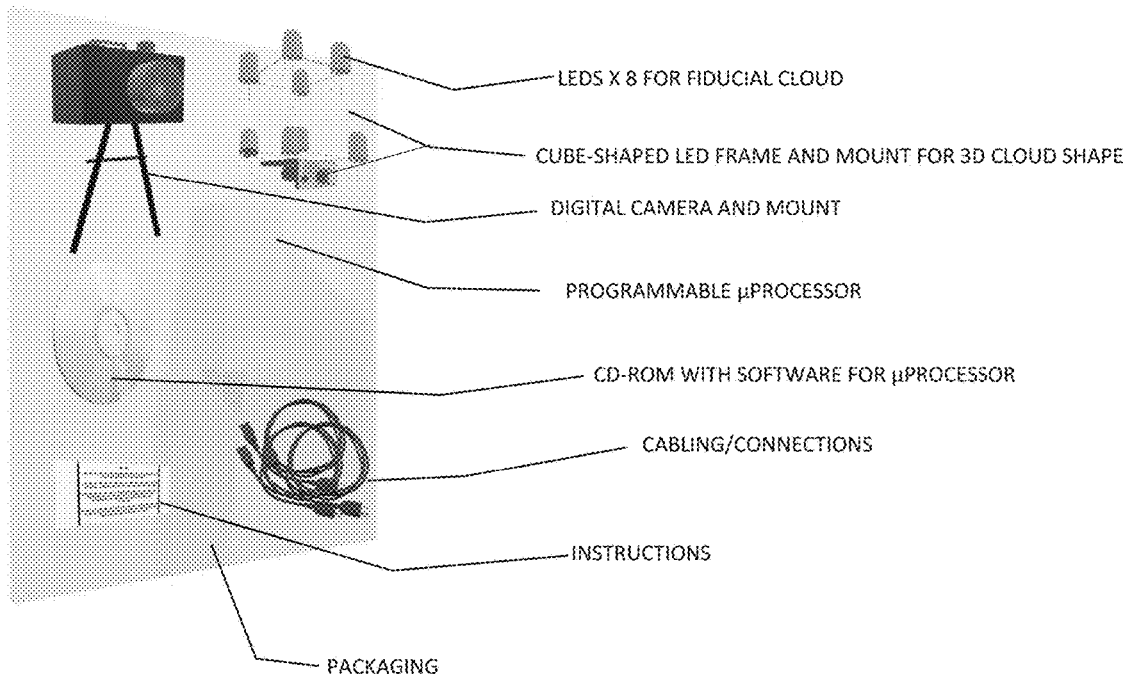
FIG. 20 (illustration of kit for retrofit mount of components of invention)

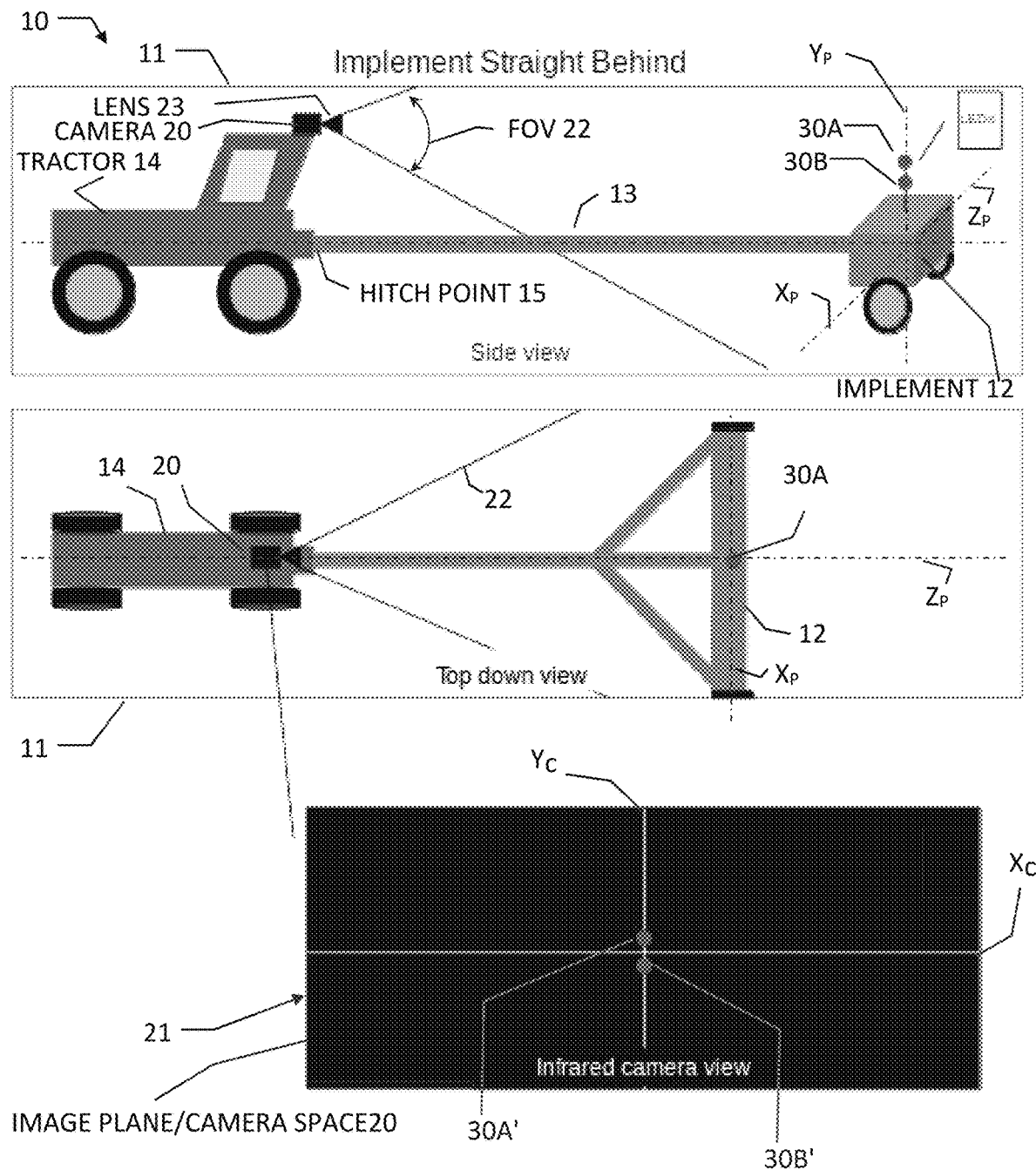
FIG. 21A (simple example of invention: calibration position)

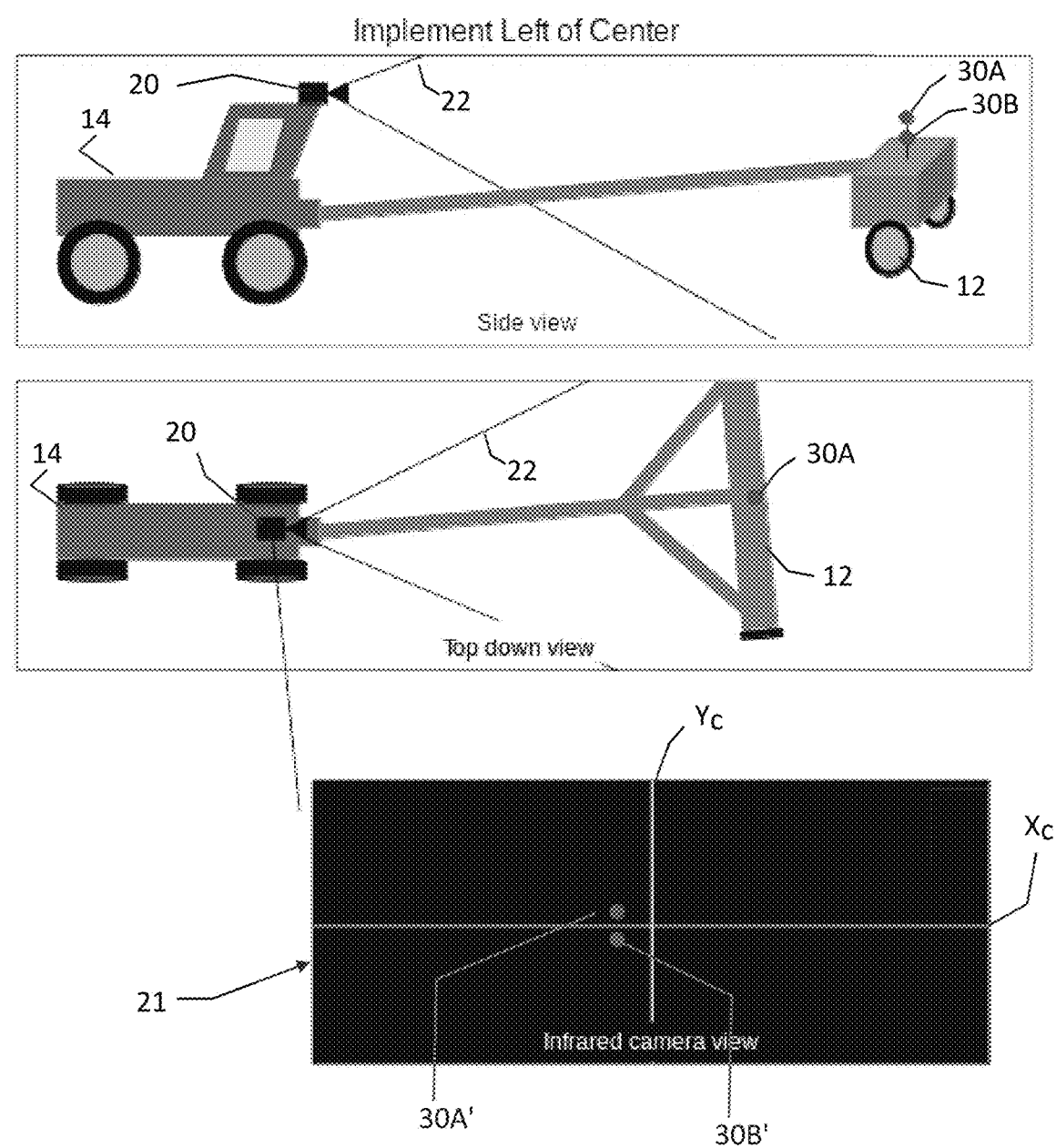
FIG. 21B (simple example of invention: measuring position)

(tile plow up)

(tile plow down)

(spray arms up)

(spray arms down)

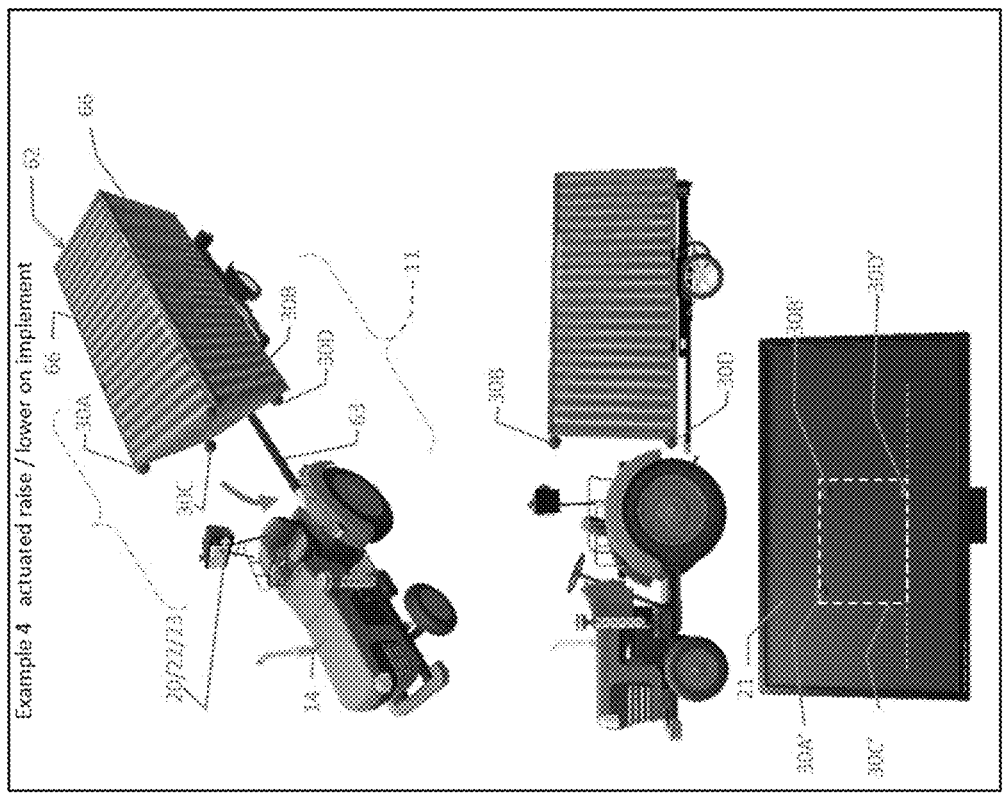
FIG. 24A (implement up)
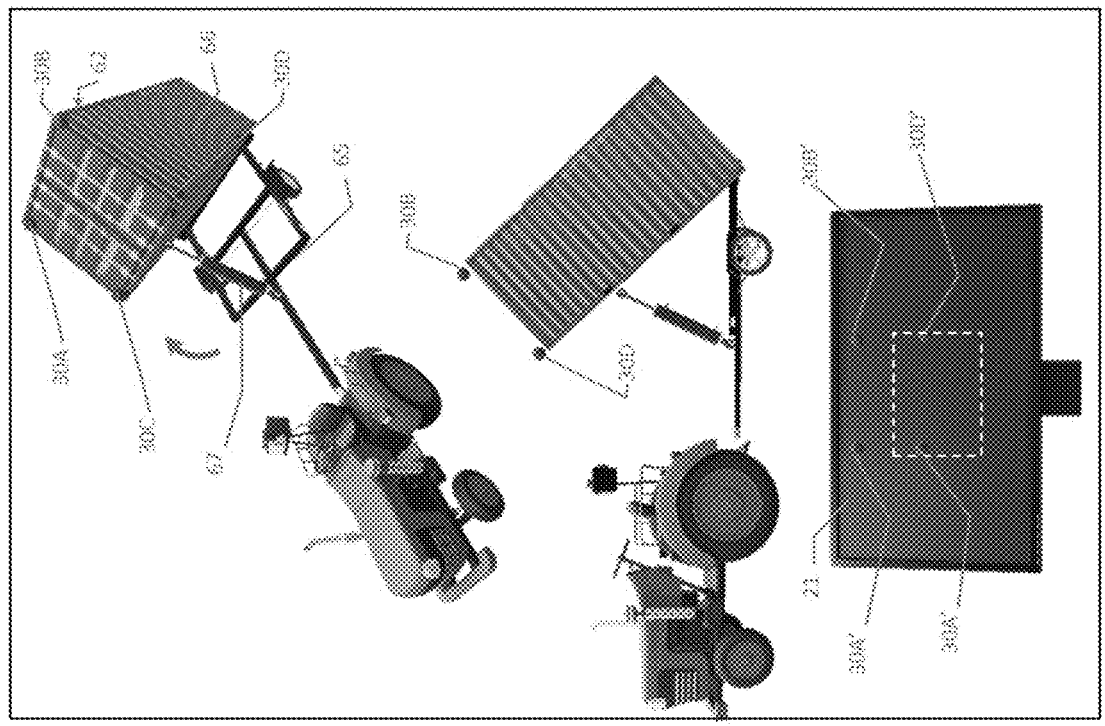
FIG. 24B (implement down)

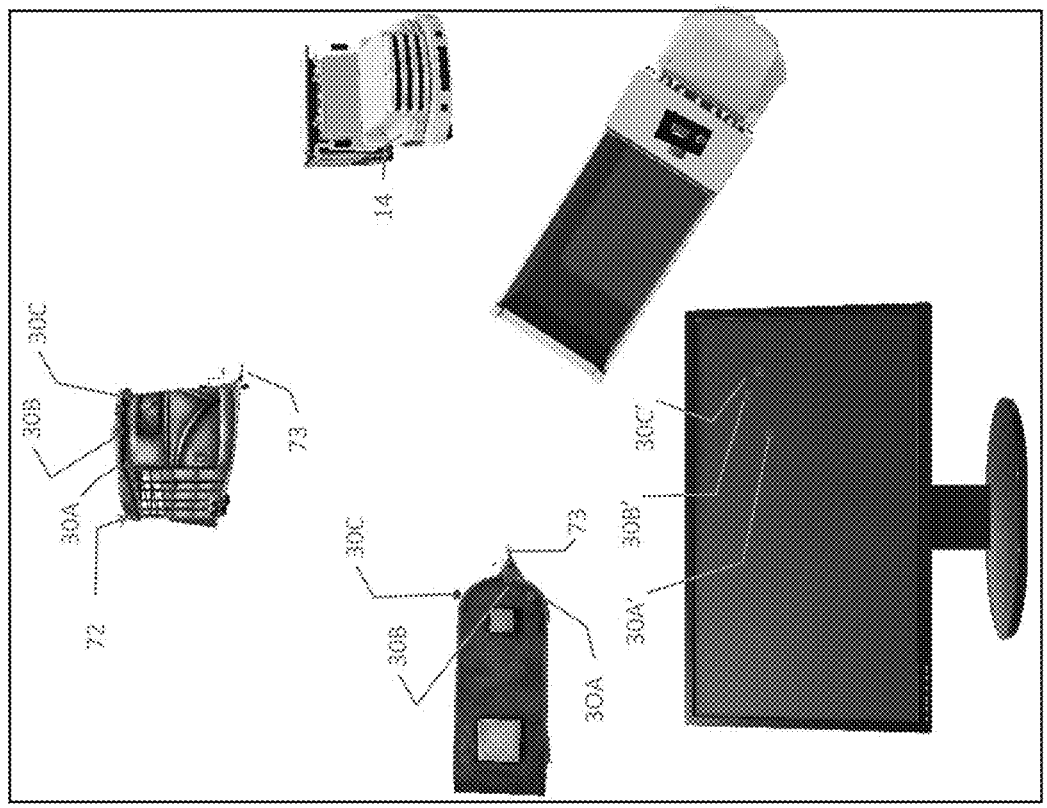
FIG. 25B (truck and trailer mis-aligned)
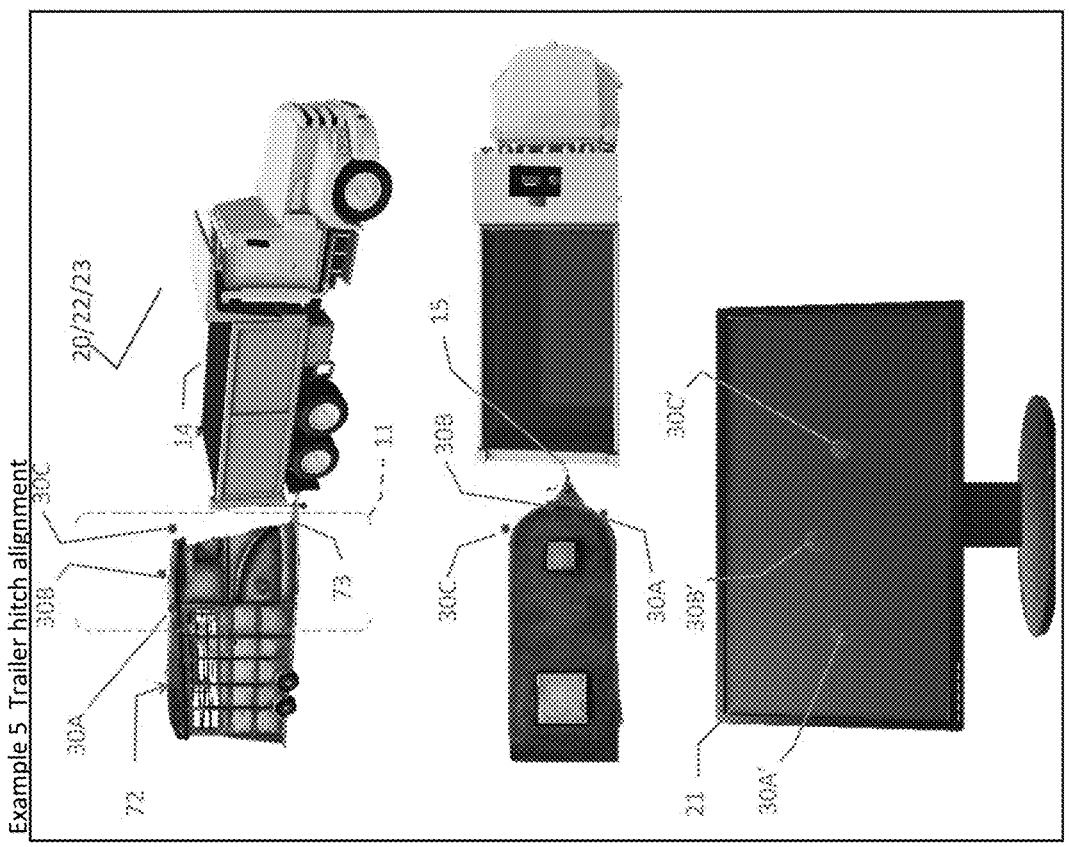
FIG. 25A (truck and trailer aligned)

(grain truck/trailer aligned with combine)

(grain truck/trailer mis-aligned with combine)

(grain truck aligned with grain bin loading chute)

(grain truck/trailer mis-aligned with bin)

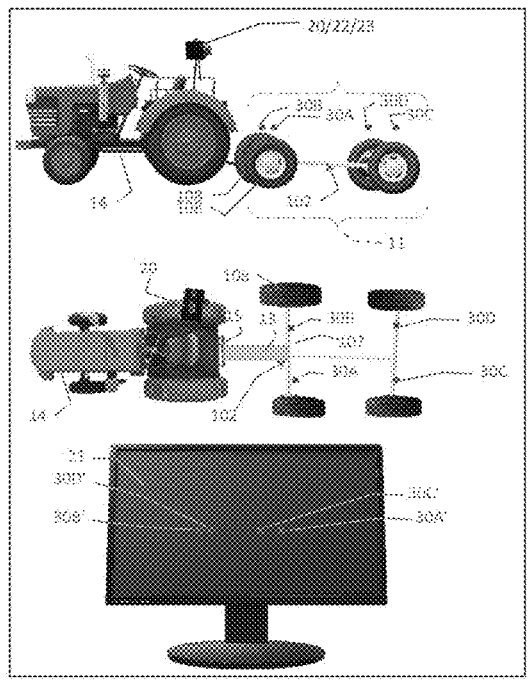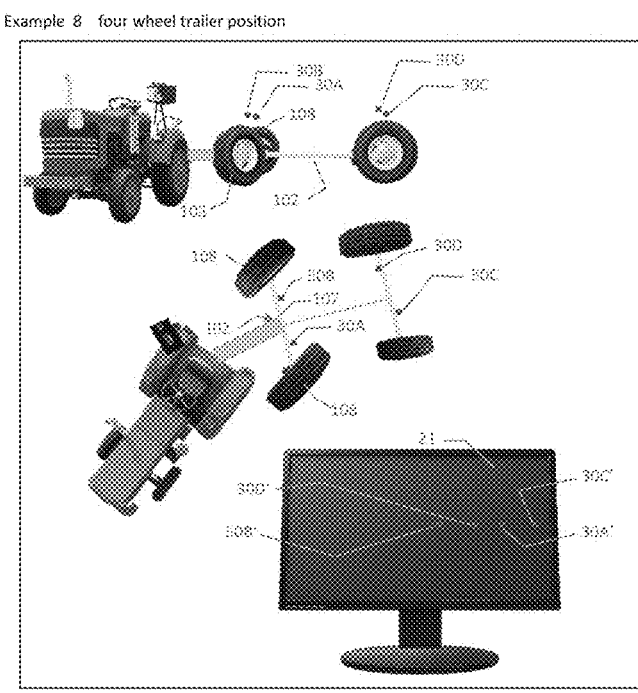
FIG. 28A
(four-wheeled trailer aligned with tractor)
FIG. 28B
(four-wheeled trailer mis-aligned with tractor)

(articulated vehicle; front and back aligned)

(articulated vehicle; front and back mis-aligned)

(steerable wheel straight)

(steerable wheel turned)

(WHEEL TURNED ALL THE WAY ONE WAY)

(WHEEL STRAIGHT)

(WHEEL TURNED ALL THE WAY OTHER WAY)

(truck aligned with loading door)

(truck misaligned with loading door)

(double trailers aligned with tractor)

(double trailers misaligned with tractor)

(slow and low fluid flow pipe)

(fast and fuller fluid flow pipe)

(empty fluid container)

(full fluid container)

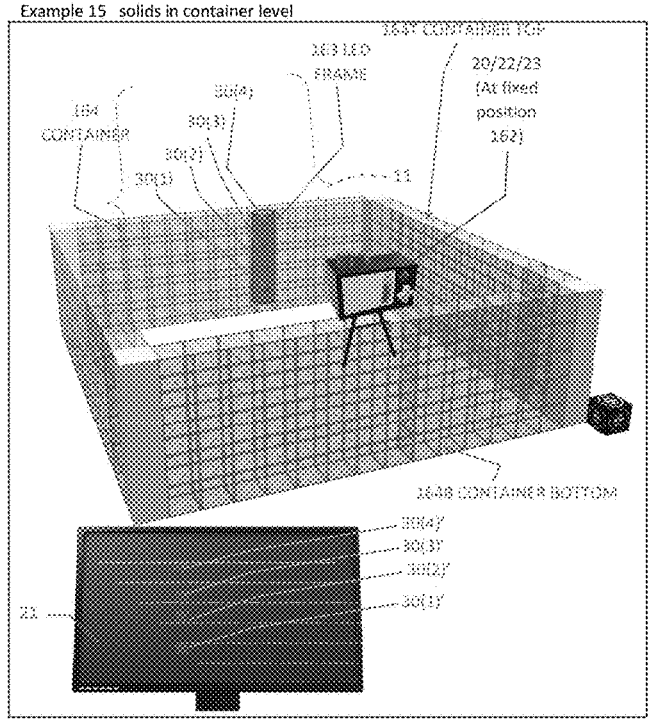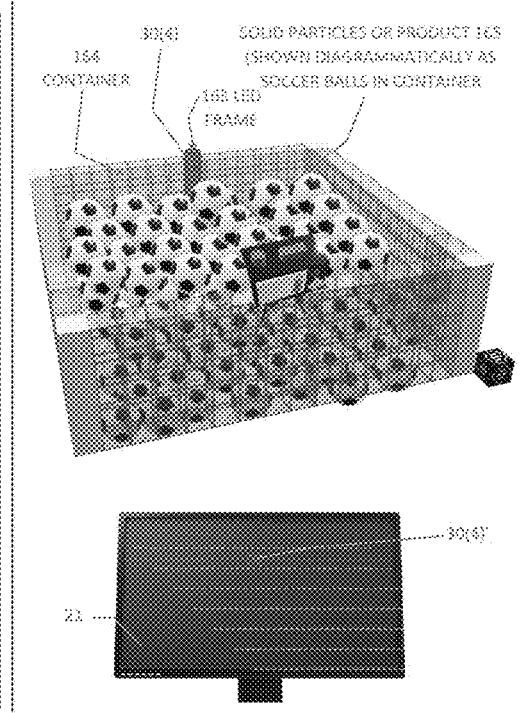
FIG. 35A
(empty solids container)
FIG. 35B
(mostly full solids container)

OPTICAL SYSTEM FOR TRACKING THE HEADING AND POSITION OF AN IMPLEMENT COMPARED TO THE PULLING TRACTOR AND OTHER USES

CROSS-REFERENCE TO RELATED APPLICATIONS

This application is a Divisional Application which claims priority to U. S. Ser. No. 16/947,827, filed Aug. 19, 2020, herein incorporated by reference in its entirety, which claims the benefit of Provisional Application U.S. Ser. No. 62/888,662 filed on Aug. 19, 2019, all of which is herein incorporated by reference in its entirety.

I. BACKGROUND OF THE INVENTION

A. Field of the Invention

The present invention relates to tracking or detecting one or more objects in physical space relative to a sensor, or to each other and, in particular, using optical sensing of pre-placed imageable cues, landmarks, or fiducials (hereinafter primarily referred to as "fiducials") in physical space, identifying or distinguishing the optically sensed fiducials in camera space relative to a reference, calibration, or trained framework, estimating position of the actual fiducials in physical space from combining (a) known geospatial position of the position in physical space of the sensor and (b) the optical sensing of the imaged fiducials in camera space, and issuing or storing an estimate of position of the detected object for further use.

A generalized example of the invention is illustrated diagrammatically in FIGS. 1A and 1B. As indicated in FIG. 1A, a sensor (one example being a digital camera or imager) is mounted to a first object (Object 1). Geospatial position data from an on-board device or devices is available for Object 1 (examples are GNSS, inertial, or a combination of the two). The camera is in a known position relative the acquired geospatial position of Object 1, so its position is also known. A processor is operatively connected to the sensor and geospatial data device. One or more fiducials (sometimes referred to as "fiducial cloud" if plural) are mounted on or inherent in the second object (Object 2) (examples are LEDs placed in known positions on Object 2, or parts or locations of Object 2 itself, that can be distinguished in images obtained from the sensor). A fundamental feature of the invention is the counter-intuitive rejection of using dedicated geospatial position data acquisition components on Object 2. Instead, optical detection of fiducials on Object 2, acquired by components on Object 1 through free space, are used to estimate Object 2 position in actual physical space. This avoids the expense and complexity of two geospatial position data acquisition systems or hard-wiring between Object 2 and Object 1.

As indicated in FIG. 1B, the paradigm of the invention is not without challenges. Factors involved are many. Some can be antagonistic with one another. Therefore, the present invention is based on not only the innovation of determining position-related information of a second object without on-board geospatial acquisition components, but also practical and effective implementations of optical detection to derive position or other geospatial calculations that can be derived from position over time.

For example, one challenge is what information about Object 2 can be obtained with optical sensing. For example, one or two fiducials (fiducial cloud) can be used to estimate Object 2 position relative a 2-D reference plane. Three or more fiducials, however, can enable 3-D solutions. Furthermore, use of multiple fiducials or sets of fiducials on different locations of Object 2 can be used to estimate position and position change at those plural points. Another challenge is subtle issues regarding precision, accuracy, and reliability of optical detection of the fiducials optically, especially in outdoors and agricultural environments. Differentiating relevant versus irrelevant optically-acquired information must be addressed.

Another challenge is movement of the sensor during use. Because sensor position is fixed relative to Object 1, pitch, roll, yaw, or drift of Object 1 over time can change the viewing angle of the sensor or its relationship to a calibration. If the optical detection is calibrated to a reference position/orientation for Object 1 or a particular aiming orientation of the camera, movement/orientation changes of Object 1 during optical sensing can affect accuracy of any position estimate from the optical sensing.

Another challenge is how the system is calibrated. The nature and sophistication can vary depending on the application and needed resolution of the position estimate.

These and other issues and challenges can vary and must be addressed by the designer. However, the paradigm of the invention is an economical, practical, and flexible solution to estimating Object 2 position is physical space without requiring GNSS or other geospatial acquisition systems on-board Object 2.

B. Problem Statement

Automation in agriculture continues at a tremendous pace. Sophisticated machines can automatically move through and work fields with increasingly high accuracy. GPS and other sub-systems can provide geospatial position information in almost real time. Sensors can provide feedback of a variety of operational parameters in real time. Digital processors can use these inputs to then control motion and operation of a tractor and implements associated with the tractor. A few examples, each incorporated by reference herein, commonly-owned by the owner of the present application include:

a. U.S. Pat. No. 9,804,603 to Ag Leader Technologies, Inc. (details about estimations used in precision ag guidance) (incorporated by reference herein);
b. U.S. Pat. No. 9,629,304 to Ag Leader Technologies, Inc. (details about acquiring measurements from sensors, communicating them to a precision ag system, and using the combination of measurements and precision ag system to control tractors and/or implements (incorporated by reference herein);
c. U.S. Pat. No. 8,600,629 to Ag Leader Technologies, Inc. (details about automatic control of functions on an implement from a precision ag system) (incorporated by reference herein);
d. U.S. Pat. No. 8,090,507 to Ag Leader Technologies, Inc. (details about drainage tile plows and automatic control) (incorporated by reference herein).

Because many agricultural producers utilize such technology, sometimes called precision ag, the availability of on-board GPS is typically looked to for position information. Other estimates (heading, velocity, etc.) can be mathematically derived from this position information.

However, the cost of GPS-centered position sub-systems is not insignificant. They also have well-known limitations. Loss of satellite signal can lead to significant absence of position information. Position of GPS antenna(s) can affect accuracy. In most agriculture, outdoors environmental conditions can be challenging, including how the machines react to different terrains and ground conditions. For example, sometimes an implement being pulled by a tractor does not follow the desired motion path. Sometimes the tractor drifts from the desired motion path, or changes orientation in space (e.g. roll, yaw, pitch). Sometimes both do. It can be very beneficial to the operator to have automatic detection and some level of quantification of any of the above, and the ability to either manually or automatically compensate. One example would be instructing automatic steering of an automotive Object 1 to compensate for sensed misalignment of a towed Object 2.

Other examples relate to follow-along vehicles or implements. The ability to automatically sense and store vehicle or towed implement position, including any misalignments relative to each other or an intended guidance path, can be invaluable to vehicles or vehicles/implements making a later, second pass. Today's agricultural practices take advantage of increasingly finely spatially-resolved techniques. For example, seed spacing for planting has reduced to a handfull of inches or less. Row spacing has narrowed. Product application systems allow minute and almost real time adjustment of placement and application rates of such things as fertilizer, insecticides, and herbicides to that same scale. The inventive concept is valuable not just for first-pass vehicles or implement steering, but can provide a guidance path for a second or more subsequent pass(es). Examples could include a first pass tractor pulling a planter implement. Planter position across the field can be obtained and stored. A second pass vehicle/implement, e.g. a sprayer or combine, can use that stored information to avoid running over the planted row crops and/or enabling more accurate placement of product at the plants. Currently, follow-along, second pass sprayers and combines must be carefully hand driven to avoid crop damage. With the techniques of the present invention, it is be possible to automate the steering of the follow-on vehicles/implements.

FIGS. 2-4 illustrate examples of the present state of the art. In these Figures, if GNSS components are involved, the tri-color (red, blue, green) arrows indicate the same. The larger dashed line indicates heading of the tractor. The smaller dashed line indicates the heading of the towed implement.

One technique presently used in agricultural is for the farmer to visually monitor a towed implement (FIG. 2). The farmer can turn around and see the implement is drifting and can manually adjust the tractor to attempt to fix the issue. But this is subject to human error and is burdensome on the farmer. There is a need for automated systems which respond without farmer input.

FIG. 3 adds a GPS antenna/receiver to the tractor or uses one that is original equipment. It can estimate tractor geospatial position, and store it over time, but implement drift is not automatically detected or compensated without operator action.

An automated technique in present use is to place GPS antennas on both tractor and implement (FIG. 4), derive GPS position of both, and automatically issue an alarm or instruction if there is significant offset of either tractor or implement from a desired motion path through a field, or store the GPS-derived tractor and/or implement path for later use, such as follow-along vehicles/implements. But as mentioned, this adds further cost and complexity to the system. There must be accurate communication between each implement-mounted antenna and its GPS receiver, and then accurate processing of the sometimes-interrupted GPS positional signals. Thus, even if not used to real-time correct implement position on the desired path, just to know what path it actually took is valuable. Again, knowing implement position during a first pass through a field can be used advantageously in a second, third, etc. pass through the field.

Another technique to mis-alignment of implement and tractor is discussed at US2006/0142936A1, incorporated herein by reference. A hitch point sensor determines hitch angle between implement and tractor. This allows estimation of implement heading and position without use of GPS on the implement. Implement heading/position can be measured relative to the GPS tractor position and heading and automatically adjust autosteer to compensate (i.e. change wheel angle of tractor steering). However, this involves calculations and comparisons that can be complex, as well as very specific adaptations at or related to the hitch.

The foregoing are just a few examples of techniques available in the state of the art and/or issues with them. As will be appreciated by these examples as well as the rest of this disclosure, there is room for improvement in the state of the art.

Therefore, a need has been identified in this technical art for automatically estimating actual physical-space position without on-board geospatial acquisition components including, but not limited to, tracking position of an implement relative to a pulling tractor; where the tracking is fast, economical, and flexible in use and application, including in the sometimes hostile environmental and working conditions of agriculture production and without requiring GPS or other navigation-type data. Another is tracking movement of different parts of an implement, such as the sway of booms in large sprayers, whether the boom is on a towed platform, is on a self-propelled vehicle, or is mounted on the back of a tractor or truck. Another is to use tracked position during a first pass to inform a second or subsequent pass with a follow-on vehicle/implement.

A few other factors that make the present optical detection paradigm unique, and provide value over the "ratchet" system of having a GPS unit on an implement, include at least the following. It is potentially cheaper. It can be moved between multiple vehicles/implements/objects more easily. It does not require wires to be run from the Object 1/tractor. It does not rely on a specific type of hitch or for there to be a hitch point between the two devices at all. Notably it also allows achievement of 6 axis measurement, which would not be measurable with the hitch point technique of US US2006/0142936A1 (incorporated by reference herein). A more advanced sensor on the hitch might be able to do so but, again, this has at least the issues discussed above regarding a hitch point technique.

II. SUMMARY OF THE INVENTION

A. Aspects of the Invention

One aspect of the invention is estimation of position in physical space of a second object, or parts thereof, by combining automatically acquired data of position in physical space of a first object with optically-detected information of the second object obtained through free-space. In one embodiment, optically detected information comprises a camera space image of at least one fiducial associated with the second object, and translating the position of the imaged fiducial in camera space to an estimate of position in physical space. The translation can be based on comparison in camera space to some reference, calibration, or trained camera space position correlated to distance or orientation in physical space. In one embodiment, the reference, calibration, or training is optically sensing the second object fiducial(s) in a known relationship to the first object and storing the camera space location(s) in digital form. Offset in camera space of the fiducial(s) optically sensed during use of the invention from the stored position(s) from the sensing when in the known relative positions indicates direction of offset and is proportional to distance of offset in physical space. This allows estimation of position of the second object in physical space by combining camera space offset with known physical space position of the first object. As will be appreciated, this paradigm, avoiding the use of a GPS or other geospatial acquisition system on the second object can be applied and implemented in a variety of beneficial ways to a variety of objects and contexts.

According to another aspect of the invention, relative position between a tractor as object 1 and a towed implement as object 2 is tracked by using an optical imaging sensor (e.g. digital camera or imager) on the tractor with a field-of-view (FOV) pointed at the implement. One or more fiducials mounted or inherent on the implement in physical space, and that can be identified in and distinguished from other objects in the image of the FOV in camera or image space, have known positions on the implement. Offset of the imaged fiducials from calibrated reference position(s) or boundary(ies) in camera space indicate an offset of the implement from desired or reference position in physical space. Such offset can be indicated to the operator visually or otherwise, or quantified and sent to other systems, such as autosteer for corrective or compensating action; or logged for future use.

In another aspect of the invention, the one or more fiducials comprise a set, cloud, or plurality of fiducials in a known geometric shape or configuration. Fiducial shape and design can be beneficial to estimating position and other information about the second object. For example, to estimate the second object's 6 axis position, at least 3 reference points are needed. In one example, three fiducials, with at least one in a different plane, can be used. More than three fiducials are possible. Additionally, more than one fiducial cloud can be placed on the second object and tracked. Furthermore, fiducial clouds can be placed on multiple second objects and each tracked.

According to another aspect of the invention, relative position between several objects in physical space, at least one having a fiducial, is tracked by using an optical imaging sensor of known position. One or more of the objects are either within, or have the potential to enter, the field of view (FOV) of the optical imaging sensor. Relative position in physical space between the objects in physical space is monitored in camera space by identifying and evaluating the imaged fiducial(s) that are in or come into the optical imaging sensor's FOV. Position of fiducials captured in FOV camera space can be translated into physical space. Such translation can be characterized to an operator visually or otherwise, and/or utilized by other systems, as desired.

A similar paradigm as described above could be implemented in a number of different applications. This could include other forms or configurations of the fiducials, different objects than tractor and pull-behind implement, or various combinations or multiplications of any of the above. This will be made clear in descriptions of nonlimiting exemplary embodiments herein.

Other aspects of the invention can include one or more of the following:

a. Automatic compensation for changes in optical imaging sensor field of view/aiming axis orientation with movement of the first object. Such things as object 1 roll, pitch, yaw, or drift can produce erroneous object 2 position estimations because the sensor orientation is different from a calibration orientation. In the case of a pulled implement, sometimes tractor drift from a guidance path will also cause divergence of the towed implement from the path. The camera viewing angle remains in calibration orientation, so no misalignment of tractor and implement will be indicated in camera space. However, if the camera viewing angle/axis/FOV changes orientation relative to calibration position, this can be erroneously interpreted as change in position or orientation of second object in camera space, and effect estimation of actual object 2 position in physical space. In one aspect of the invention, compensation for these things can be accomplished by adding one or more inertial-based sensors (e.g. gyroscopes, accelerometers, and/or magnetometers) to object 1. In one example, relatively inexpensive inertial sensor or sensors (e.g., such as might be found in an inertial measurement unit (IMU)) can continuously track object 1 orientation (i.e. any of pitch, roll, yaw, drift). Fiducial position in camera space can be automatically adjusted accordingly.

b. Optimization techniques for accurate and reliable identification of fiducials in camera space. Embodiments that use light-emitting fiducials can use techniques regarding operation of and/or emissions from the light sources to promote better detection. Examples include one or more of size, color, intensity, emission band, and/or duty cycle. Optical or digital filtering of the captured field of view of the camera can be tuned to the fiducials' emissions. Number and arrangement of the fiducials, including plural light sources in 3-D shapes, can be used to help distinguish from noise or irrelevant light energy captured by the camera. Fiducials (e.g. fiducial clusters or clouds) in 3-D shapes can also assist in enabling up to and including 6-axis position estimations.

c. Calibration techniques. A number of variations on calibrating the system for fiducial identification and position estimation from the same are possible. Examples include no prior calibration but simply a visual display (or some other human-perceivable indication) of the imaged fiducials to the operator, or some indication on the display of offset from some reference position. But further, aspects of the invention include the ability to image and store fiducial position(s) in camera space based on reference or training positions of object 1 and object 2, and then use that stored information to make the position estimates during actual tracking use. Still further, machine learning/training techniques could be used to pre-store a large number of images of fiducials relative to a large number of pre-known orientations between object 1 and object 2. During use, acquired fiducial images can be compared to a training set (large or small depending on need or desire) to help produce the estimation of object 2 position. Extrapolation can be used to fill gaps in between training set data when images during use do not match any training set fiducial position exactly.

d. Follow along vehicle/implements. The invention includes aspects which allow estimation of object 2 position or position-related information in physical space during a first pass, storing that position information, and then transferring to or accessing that stored information by another object (vehicle/implement) and using it in a second, third, fourth, or otherwise subsequent pass later in time or separate from the first object first pass.

e. Differences in component refresh rates. Aspects of the invention include techniques to resolve possible update rate conflicts or issues between components; e.g. between GPS, inertial components, and digital camera frame signals.

B. Objects, Features, and Advantages of the Invention

The optical systems according to the invention are substantially cheaper than industrial grade GPS solutions, easier to install, uses large scale produced consumer technology, and are extremely flexible in applications and with compatible equipment.

Other objects, features, aspects, and advantages of the invention include methods, apparatus, or systems which:

a. improve over or solves certain problems and deficiencies in the state of the art;
b. can provide estimated position accuracy to a range of levels tunable to or acceptable/effective for what is needed for a given application;
c. can provide speed at a level that it is essentially or almost real-time resolution, and can compensate for variances in updates rates between components such as camera, GPS, and IMU measurements;
d. can be utilized advantageously in the problem of tracking implement heading and position relative to a pulling tractor, but also in a variety of other agricultural situations, as well as analogous situations in other technical areas;
e. can be robust and operate over a wide range of environmental conditions, including outdoors;
f. can be used to track simple or complex positional relationships;
g. does not require GPS or other navigation components or solutions on the implement or other such object of interest;
h. can be retrofitted to existing equipment or built-in as OEM;
i. can be provided as a kit with one or more relatively inexpensive digital cameras and lenses (If the fiducials are add-ons, the kit can include one or more fiducials with appropriate mounting structure for all, and software to perform filtering and calibration techniques according to need or desire. If the fiducials are inherent on object 2, kits with digital camera and image recognition software that can be used to identify relevant information about a pulled or following implement or vehicle and translate it to estimates of actual geospatial position and/or orientation);
j. provides high flexibility and adaptability to a variety of applications, including mounting on moving objects, one moving object and one or more fixed objects, or plural moving objects;
k. can have results communicated in a number of ways, including but not limited to, visually via a display or other perceivable technique, in an electrical or electronic signal that can be communicated to other components, or both;
l. can compensate for changes in optical imager viewing orientation, including for pitch, roll, yaw, or drift of object 1/optical imager during imaging;
m. can be applied to auto steer, whether tractor or implement;
n. can use estimated implement position for present (e.g. real time indication of actual implement position relative to earth for monitoring), future (e.g. use for corrective action as with autosteering), or past (e.g. log actual path implement took so that it can be reviewed later or used in mapping so that future passes through field can know where implement was);
o. can be used for or with a wide variety applications/contexts, including without limitation (1) tractor pulling implement, (2) follow-on implements (e.g. second pass sprayer or combine), (3) separate vehicles relative to one another, (4) moving object versus fixed object, and others;
p. does not require extensive changes to original equipment, including object 1 or object 2;
q. can be installed, removed, and reinstalled on other equipment multiple times;
r. is relatively inexpensive compared to many other techniques;
s. does not require hard wiring or other physical connection(s) between object 1 (e.g. tractor) and object 2 (e.g. implement or other object of interest);
t. does not have to rely on special relationship between object 1 (e.g. tractor) and object 2 (e.g. implement or other relevant object) such as specific hitch or hitch point;
u. can be configured to achieve 6 axis measurement when used with at least 3 fiducials;
v. allows variance of fiducial shape, size, location, complexity, and type depending on desire or need; and/or
w. achieves sufficient precision, accuracy, and repeatability for effective automated tracking of object 2 for a variety of uses.

These and other objects, features, aspects, and advantages of the invention will become more apparent with reference to the accompanying specification.

III. BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 1A and 1B are diagrammatic illustrations of the generalized concept according to the present invention showing one example of a generalized basic apparatus (FIG. 1A) and one example of a generalized methodology of use (FIG. 1B).

FIGS. 2, 3, and 4 are diagrammatic illustrations of several prior art techniques to track position of a towed implement as Object 2 and towed by a tractor as Object 1.

FIG. 5A is similar to FIGS. 2-4 but shows one example of application of the present invention to track position of the towed implement.

FIG. 5B is an expanded diagrammatic illustration of the example of FIG. 5A to track position of a towed implement.

Figure 1A:
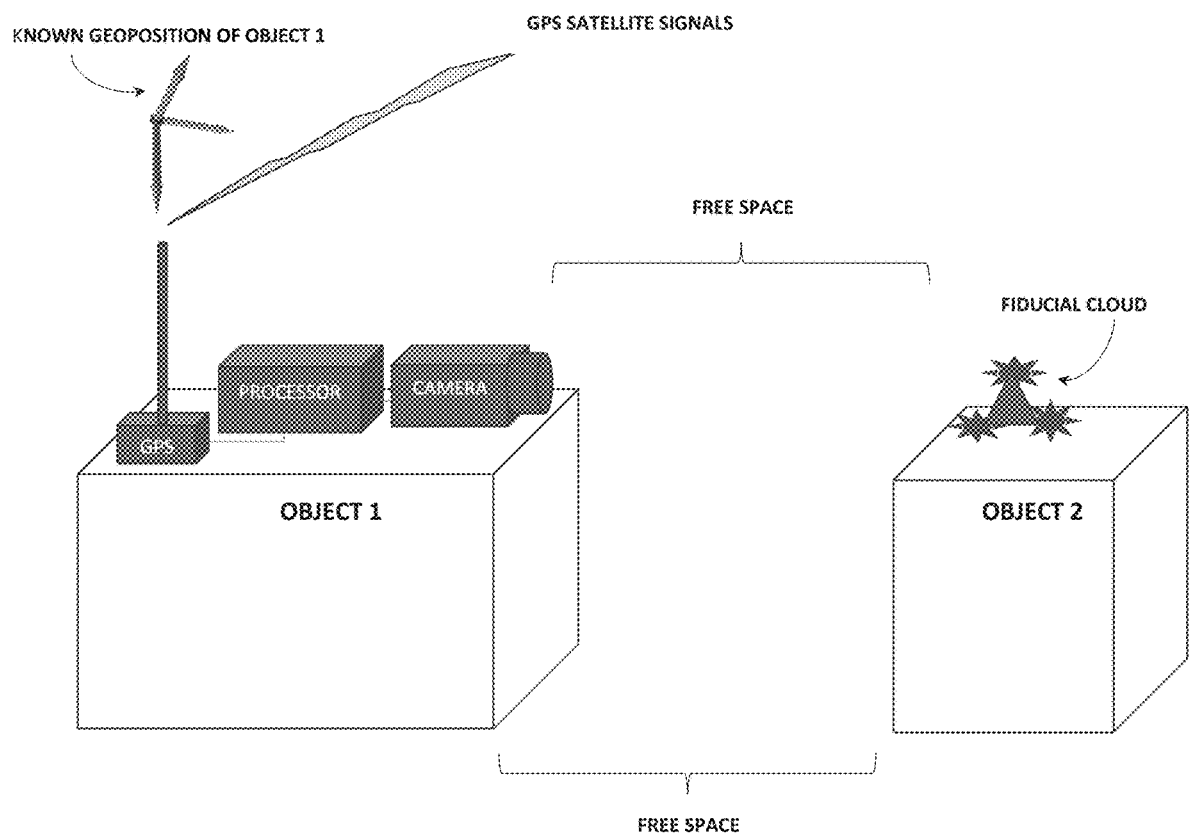

FIGS. 6A and B are illustrations showing a specific simple example of application of the present invention to track position of a towed implement; here with two LED fiducials on the implement and tracking comprises visually indicating on a display relative offset of the fiducials to reference coordinates when Object 1 tractor is aligned with Object 2 implement (FIG. 6A) and when Object 2 is misaligned with Object 1 (FIG. 6B).

FIG. 7A is a diagrammatic depiction of a system using the paradigm of FIGS. 6A and B applied in practice.

FIG. 7B is a flow chart of the techniques according to aspects of the invention of generating an estimate of implement position from the apparatus of FIGS. 6A-B.

FIG. 8 is a diagrammatic illustration of non-limiting examples of different LED fiducial sets or clouds such as can be utilized with embodiments of the invention.

FIG. 9 is a diagrammatic illustration of techniques to enhance reliable detection and identification of fiducials in camera space. Non-limiting examples are physical and/or mathematical filtering (e.g. optical and/or digital filtering), operating the LEDs at preselected wavelengths or pulsing the LEDs at a given duty cycle, or applying digital filters to acquired camera information.

FIG. 10 is a diagrammatic illustration of a digital imager that has the capability of depth recognition of the image in camera space, such as can be used in embodiments.

FIGS. 11A and B are diagrammatic illustrations of use of machine vision to detect and identify fiducials in camera space based on pre-selected or trained image recognitions techniques, instead of using LEDs. FIG. 11A is a diagram of the fundamental concept of machine vision shape recognition that could be used to establish fiducials on Object 2. FIG. 11B is non-limiting examples of types of Object 2 which can be imaged by the optical imaging sensor and then use machine vision to identify and track fiducials inherent on them.

FIG. 12 is a diagrammatic illustration of a technique, according to one embodiment of the invention, for compensating for camera movement during object 1 motion with an IMU.

FIG. 13 is a flow chart showing one example of a technique to compensate for differences in refresh rates in camera frames, GPS data, and IMU when estimating object 2 position with the embodiment of FIG. 12.

FIG. 14A are illustrations of how boom sprayers must align spray from each nozzle to a crop row.

FIG. 14B is an illustration of a set-up, according to an embodiment of the invention, to monitor boom sway of a sprayer boom, and use such monitoring to inform change of rate of spray application at each boom, or even rate or on/off at each nozzle, based on sensed boom sway.

FIGS. 15A and B, are illustrations showing non-limiting concepts regarding calibrating camera space tracking of imaged fiducials with physical space position. FIG. 15A illustrates the fundamental concept of placing object 1 and object 2 in one or more known relationships to one another while capturing images of the fiducial(s) on object 2 in the imager of object 1, and then registering those camera space positions with the known relationships, to then later allow comparison to camera space position(s) of imaged fiducials during actual use of the system to allow estimation of position of the fiducials in physical space. FIG. 15B is simplified diagrammatical illustrations showing how a fiducial cloud of a 3-D shape (here shown by the box frame) can be used to creating a training set of images that can be used during actual tracking. Note that the 3-D cloud of fiducials allows not only X-Y position to be estimated, but also Z-direction closeness or farness and X-Y-Z orientation from the acquired images.

FIGS. 16 and 17 are diagrams illustrating concepts related to use of the invention to inform follow on vehicles/implements. FIG. 16 is intended to illustrate some of the variability of terrain in a first pass across a crop field and how they might affect tractor and towed implement offsets from an intended travel path through a field, and that using the present invention allows tracking and logging of implement actual position during such a first pass. FIG. 17 is intended to illustrate just a few examples of first, second, and more passes through a crop field (planter, sprayer, harvester, etc.). A second- or follow-on-pass implement can retrieve the logged first pass planter path to better follow the same path relative to crop rows by, e.g., using it with active or passive steering adjustment during the second or subsequent pass. These simplified illustrations show how tracking first pass implement position with the invention allows second or subsequent pass, follow-on implements to know and follow that actual first pass path so that ground-working, product placement, and harvesting can more precisely be resolved row-by-row and even plant by plant.

Figure 18:
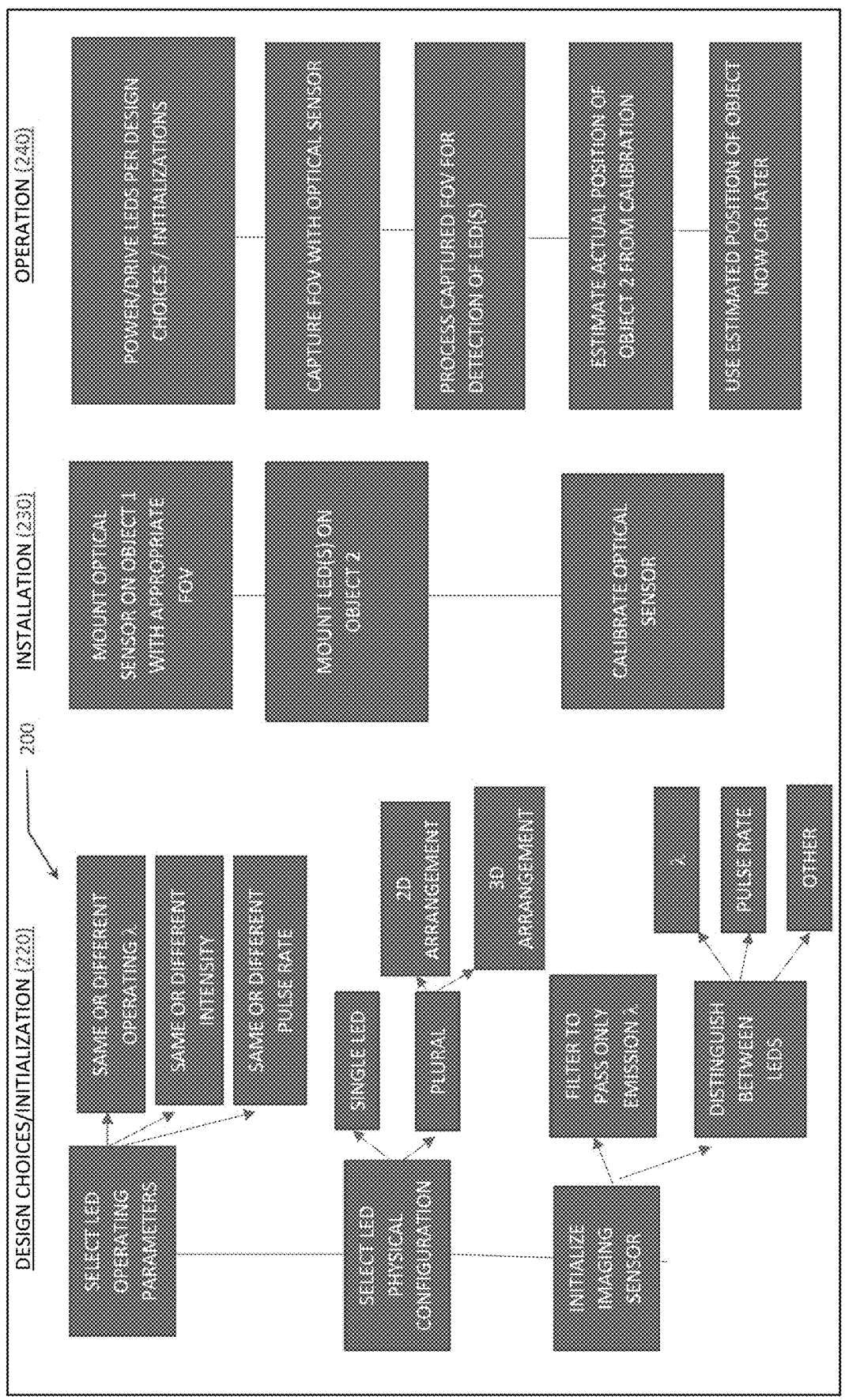

FIG. 18 is a graphic illustration of operation of an embodiment according to the invention, include initialization, installation, and operation states.

FIG. 19 is a diagrammatic illustration of 6-axis degrees freedom of movement.

FIG. 20 is an illustration of a kit that can be packaged with components that can be retrofitted to a variety of Objects 1 and Objects 2 according to an optional aspect of the invention.

FIG. 21A is a duplicate of FIG. 6A. It is a simple, specific, non-limiting example of one exemplary embodiment according to the invention applied to tracking position of a tractor-towed implement, using a camera as optical imaging sensor and a pair of infrared LEDs as fiducials on the implement that, when imaged, can be displayed to indicate when the implement is in an aligned heading with the tractor.

FIG. 21B is a duplicate of FIG. 6B illustrating how the optical tracking system can detect and report an out-of-alignment position of the implement.

Figure 22A:
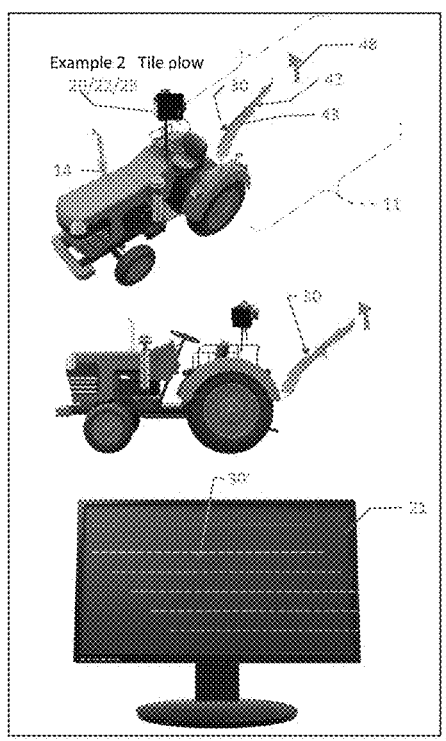

FIGS. 22A and B through FIGS. 25A and B illustrate a variety of examples of how the concepts of the optical tracking system of FIGS. 21A and B can be implemented in different ways with different objects and applications.

FIGS. 22A and B relate to tracking vertical position of a tile plow mounted to a tractor.

Figure 23A:
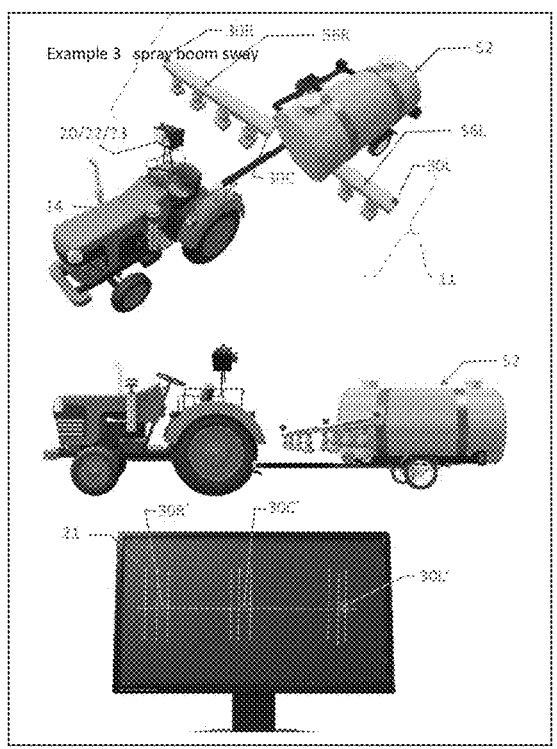
Figure 23B:
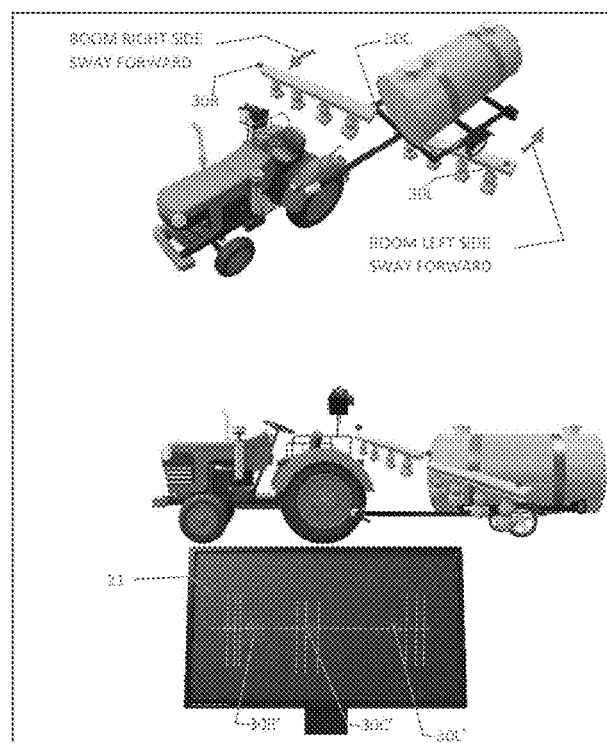

FIGS. 23A and B relate to monitoring position of moveable parts on a towed implement.

FIGS. 24A and B relate to raising and lowering a towed implement.

FIGS. 25A and B relate to guiding a truck to the hitch of a towable implement.

Figure 26A:
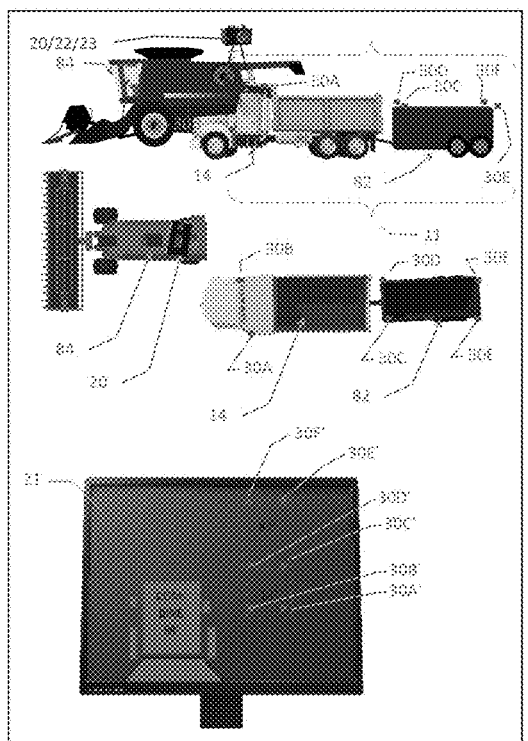

FIGS. 26A and B relate to monitoring position of a follow along truck/grain cart to a combine. Another example of use of the paradigm of FIGS. 26A and B (and other Figures and examples herein) could be monitoring or correcting for application offsets (such as monitoring position between tractor and where agricultural product is applied on or in the ground instead of simply position of a towed implement or following tractor/truck). This would allow being able to monitor whether application of product (e.g. planted seed, herbicide, insecticide, fertilizer) or performance of operations in the ground or on plants (e.g. planting, cultivating, harvesting), and then being able to know those application or operations positions are correct at the ground level. This can be done in a number of ways with this paradigm. One non-limiting example is by known physical relationships between positions on the application or operations implement (e.g. planter row units, sprayer nozzles, combine head intakes) and then extrapolating where those positions would apply or operate on the ground. Another non-limiting example is having fiducials at each such application position on the application or operations implement and then extrapolating distance to ground. Another is using sensors to measure distance from known positions on the application or operations implement and the ground. In reference to application offsets, more information can be gained by measuring the distance from the fiducial to the various points, e.g., actually cutting, planting, or applying product. There is value of knowing exactly where product was applied.

Figures 27A, 27B:
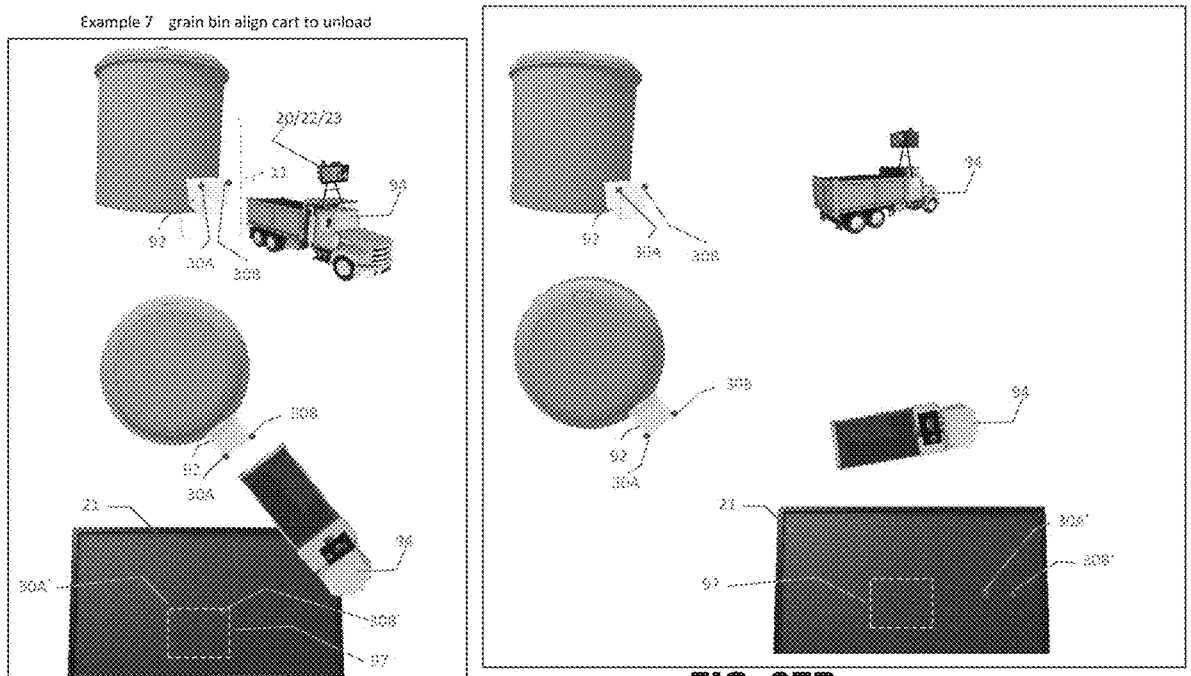

FIGS. 27A and B relate to guiding a grain truck to a loading port to a grain bin.

FIGS. 28A and B relate to monitoring position of a four-wheeled towed implement or trailer.

Figure 29A:
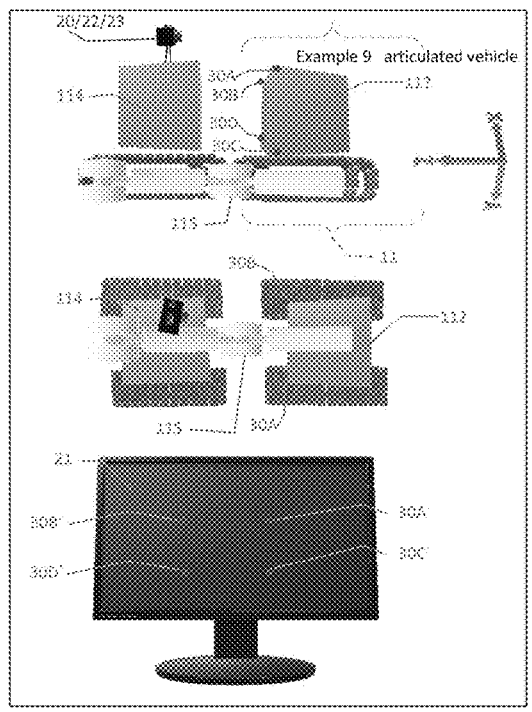
Figure 29B:
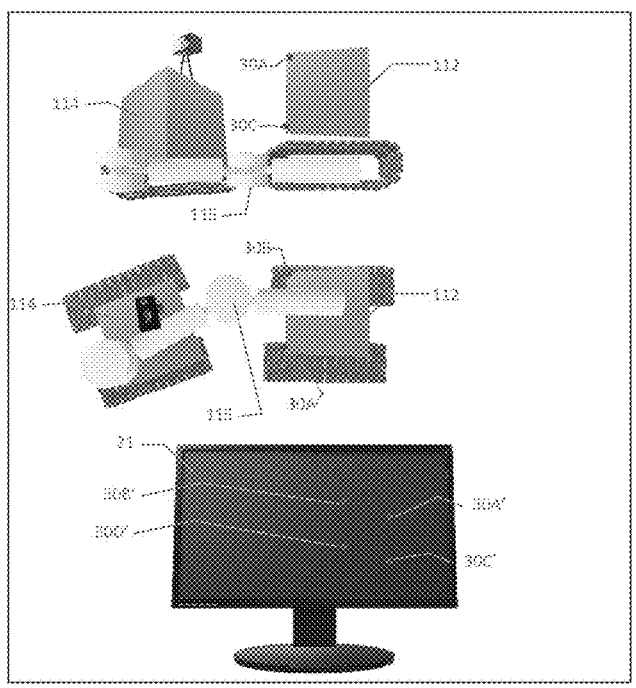

FIGS. 29A and B relate to monitoring position of front and rear portions of an articulated vehicle.

FIGS. 30A-F relate to monitoring steerable wheel position relative its axle for automated steering.

Figure 31A:
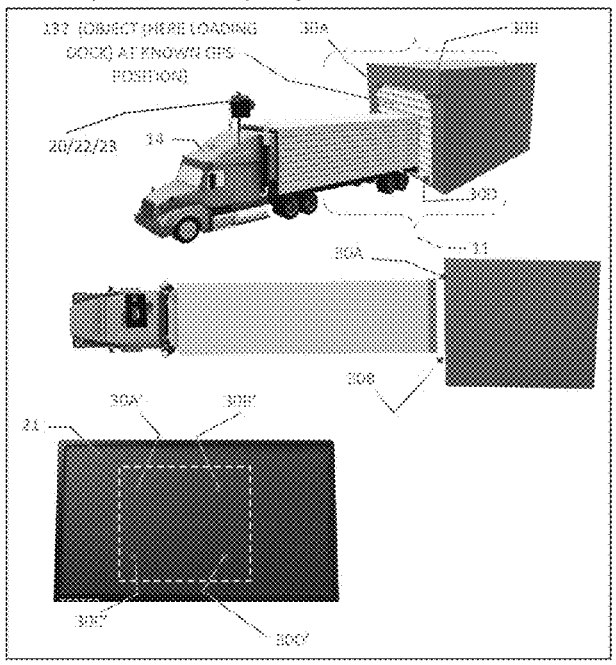
Figure 31B:
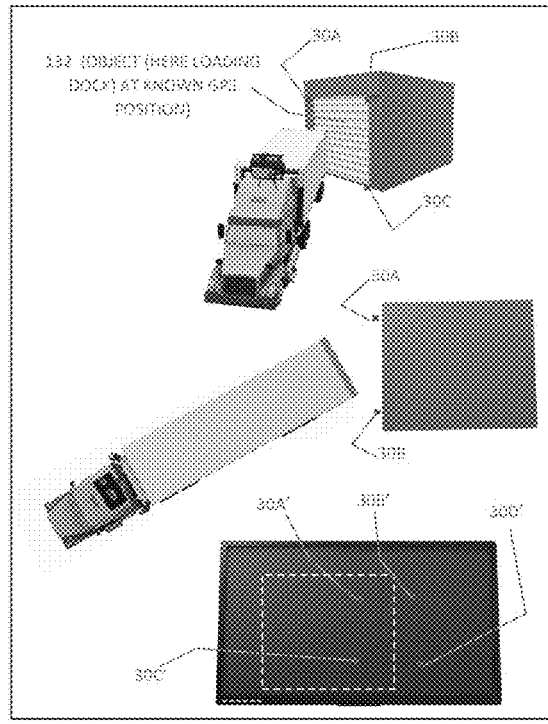

FIGS. 31A and B relate to guiding Object 1 to a fixed Object 2.

Figure 32A:
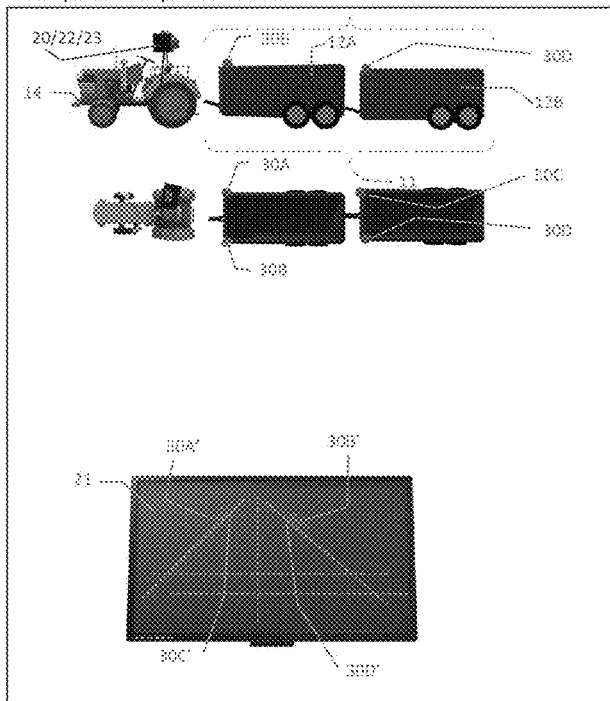

FIGS. 32A and B relate to monitoring position of two or more towed implements or trailers towed by the same tractor or automotive vehicle.

Figures 33A, 33B:
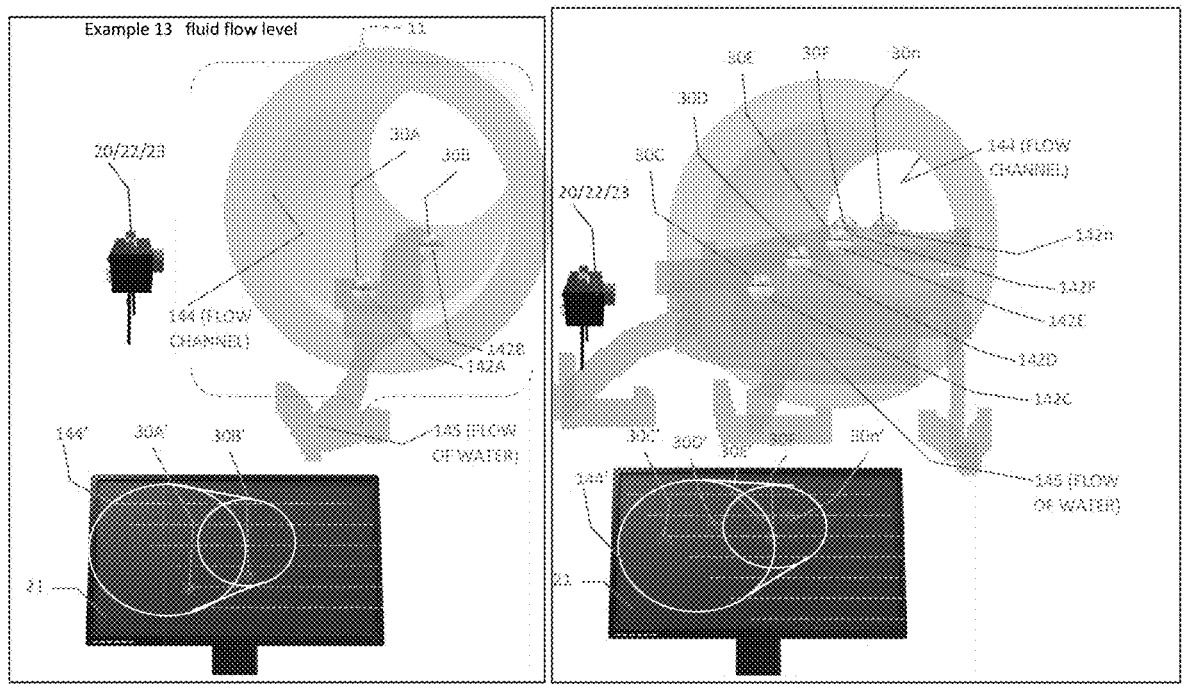

FIGS. 33A and B relate to monitoring rate and/or level of fluid flow through a conduit.

Figures 34A, 34B:
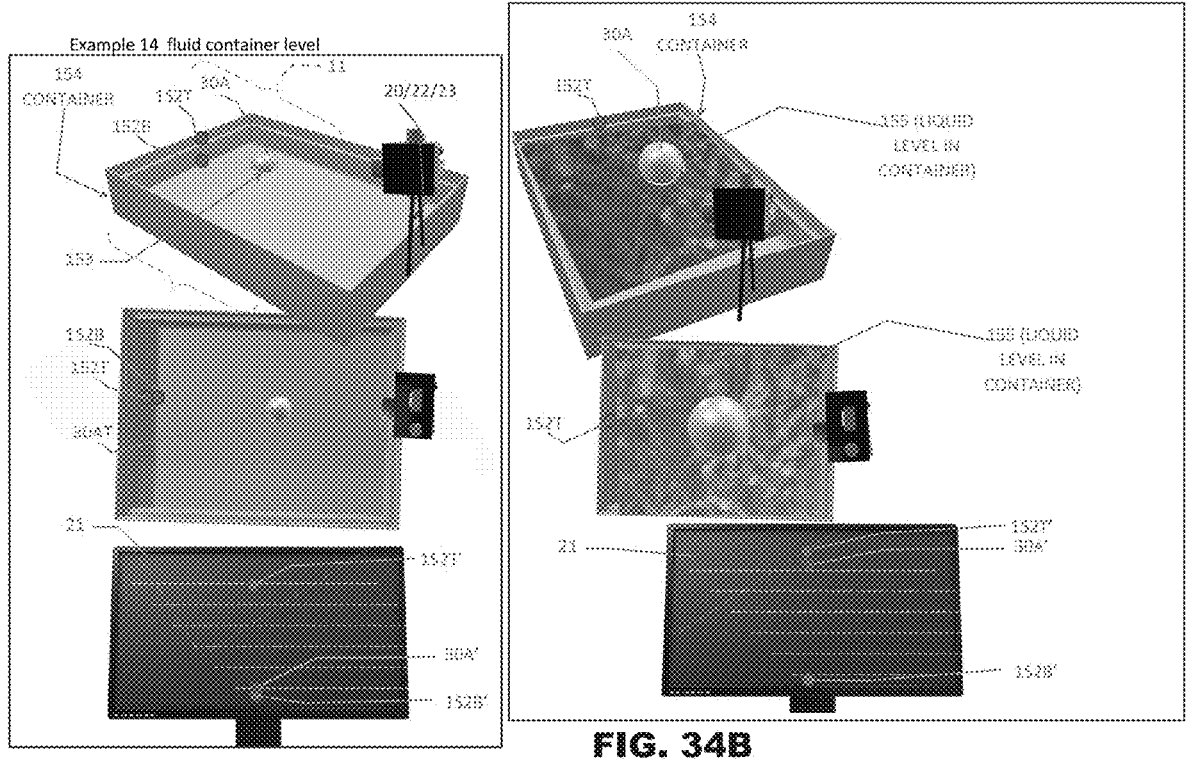

FIGS. 34A and B relate to monitoring fluid level in a container.

FIGS. 35A and B relate to monitoring solids level in a container.

IV. DETAILED DESCRIPTION OF EXEMPLARY EMBODIMENTS OF THE INVENTION

A. Overview

For a better understanding of the invention, several forms or embodiments is can take will now be described in detail. These are neither exclusive nor inclusive of all forms and embodiment. Variations obvious to those skilled in this technical area will be included within the invention.

B. Generalized Discussion of Aspects of the Invention

1. Definitions

Terms used in the descriptions of non-limiting exemplary embodiments of the invention herein will have their usual and ordinary meaning to those skilled in these technical areas. By example, below is intended to assist the reader in giving additional context to some of those terms:

(1) Object 1. Relates to a first object that carries an electro-optical imaging sensor and has a known geospatial position, e.g. from an on-board GNSS, INS, GNSS/INS, or other geospatial estimation system.

(2) Object 2. Relates to another object, whether or not mounted to, towed by, or separated from Object 1, that has at least one fiducial which can be detected by or with the electro-optical imaging sensor of Object 1.

(3) Tractor: Relates to conventional agricultural tractors and other self-propelled prime mover vehicles of any type, including but not limited to rear wheel drive, all-wheel drive, front wheel drive, front axle steer, back axle steer, all-wheel steer, and articulated or non-articulated, and with or without auto steering or precision ag systems, and with or without on-board navigation including but not limited to GNSS, INS, or GNSS/INS combinations, and with or without ground-working tools or crop working/application components (e.g. planters, sprayers, cultivators, harvesters, etc.).

(4) Pulled or Towed Implement. Relates to pull-behind trailered or wagoned apparatus of any type, whether or not including ground or crop working tools or hauling vessels, typically hitched at hitch point to a tractor, with or without independent steering, with or without independent auto steering, and with or without some form of propulsion. Implement can include just one or could include plural attached in series.

(5) Follow on implement. Relates to either pull-behind trailered or wagoned apparatus or self-propelled motive vehicle, whether or not including ground or crop working/application tools or hauling vessels, but that traverse generally the same ground in a later in time pass and are independent of a predecessor tractor or tractor/implement combination that traversed the same general ground in an earlier pass, whether immediately after the first pass or days, months, or more after the first pass, and whether or not there are intermediate passes by other tractors, implements or machines. A few non-limiting examples relative to a planter as the pulled implement include sprayers whether or not self-propelled, cultivators whether or not self-propelled, harvesters or combines whether or not self-propelled.

(6) Tile plow. Relates to a pull behind implement with a ground opening plow/trencher that is adjustable in depth during use to create a gradient for laying of field tile to promote water drainage in fields or other ground. Further details can be seen in U.S. Pat. No. 8,090,507 to Ag Leader Technologies, incorporated by reference herein.

(7) Boom sway. Relates to phenomena that can occur with pull behind or follow along sprayers with laterally extending or extendible booms with spray nozzles that collectively have a coverage area sometimes called a spray swath. During movement, forces experienced at the tires or frame of the sprayer (e.g. bounce, centripetal during turns, etc.) can be transferred to a cantilevered boom and cause up/down, back/forth, or a combination of such movements or even oscillations that can displace at least some of the spray nozzles (particularly nearer the free end of the boom) from normal position which can displace spray coverage. This can be particularly troublesome when intending the spray coverage to be limited to specific areas. Further details in the context of crane booms can be seen in Kawai et al., Anti-sway system with image sensor for container cranes, J. of Mechanical Science and Technology 23 (2009) 2757-2765, incorporated by reference herein.

(8) GNSS. Acronym for "Global Navigation Satellite System" and relates generically to any satellite-based geospatial estimation system, including but not limited to GPS.

(9) GPS. Acronym for "Global Positioning System", a satellite-based geospatial estimation and version of GNSS.

(10) INS. Acronym for "Inertial Navigation System" and relates generally to any of a variety of inertial navigation and geospatial estimation components and systems.

(11) IMU. Acronym for "Inertial Measurement Unit" and relates to any of a variety of inertial measurement component that can measure and supply inertial navigation (INS) estimates.

(12) GNSS/INS. Relates to systems that combine GNSS and INS components and estimates into a final estimate solution.

(13) Optical Imaging Sensor. Relates to an electronic or electro-optical imaging sensor that detects and conveys the information that constitutes an image by optically capturing in its field of view (FOV) an image and converting the variable attenuation of light waves (as they pass through or reflect off objects) into signals, small bursts of current, that convey the information. Digital imaging or digital image acquisition is the creation of a digitally encoded representation of the visual characteristics of an object, such as a physical scene or the interior structure of an object. The term is often assumed to imply or include the processing, compression, storage, printing, and display of such images.

(14) Digital Camera. One type of optical imaging sensor, it relates to an instrument that can image a field of view and store it is digital memory. Non-limiting examples include CCD (charge coupled device) and CMOS (complementary metal-oxide semiconductor). Further details can be seen in U.S. Pat. No. 6,324,296 to inventors McSheery et al., incorporated by reference herein.

(15) Fiducial. Relates to an object placed in a field of view of an imaging system that has an optical imaging sensor which appears in the image produced, for use as a point of reference or a measure. It may be either something placed into or on the imaging subject, or a mark or set of marks in the reticle of an optical instrument. It may be active in the sense of emitting some signal or energy or movement. Non-limiting examples include light sources, including LEDs and LED laser diodes. It may be passive in the sense it does not generate any signal, energy, or movement, but is identifiable in camera space. Non-limited examples include reflectors, colored markers, or distinct shapes. Another example is inherent structural features on an object that can identified and distinguished in camera space by, for example, machine vision calibration or learning.

(16) Machine vision. Relates to camera, processor, and software to evaluate images and automatically identify locations, colors, shapes, or other parameters or combinations of the foregoing in the image based on either pre-programming or machine learning. Further details can be seen in U.S. Pat. No. 6,539,107 to inventors Michael et al., and U.S. Pat. No. 7,336,814 to inventors Boca et al, each incorporated by reference herein respectively.

(17) IR LEDs. Relates to Infrared LEDs or LED laser diodes that are configured to emit light energy on in the infrared spectrum (e.g. ~800 nm to 1 mm), which therefore is not visible to the human eye.

(18) Six-axis measurement or position. Relates to estimating position and attitude of a 3-D object in 3-D physical space using 6DFOM (6 degrees freedom of movement). See, e.g., Kim, S., et al., Kalman Filtering for Relative Spacecraft Attitude and Position Estimation, AIAA Guidance, Navigation, and Control Conference and Exhibit 15-18 Aug. 2005, San Francisco, California downloadable at dnc.tamu.edu/drjunkins/yearwise/2005/conference/gnc_2005_formation_esti mation_visnav.pdf, incorporated by reference herein. 6DFOM refers to the freedom of movement of a rigid body in three-dimensional space.

Specifically, the body is free to change position as forward/backward (surge), up/down (heave), left/right (sway) translation in three perpendicular axes, combined with changes in orientation through rotation about three perpendicular axes, often termed yaw (normal axis), pitch (transverse axis), and roll (longitudinal axis). See diagram of FIG. 19.

(19) Translation of camera space to physical space. Relates to interpreting content in an image captured in the FOV of a camera to position(s), distance(s), or dimensions in actual physical space. For background and details of the fundamentals of the same see, e.g., U.S. Pat. No. 6,324,296 to inventors McSheery (incorporated by reference herein), U.S. Pat. No. 8,310,656 to inventor Zalewski (incorporated by reference herein), U.S. Pat. No. 9,678,583 to inventor Cheng (incorporated by reference herein).

2. General Features of Many of Exemplary Embodiments (FIGS. 1-20)

As discussed above, a common set of aspects of at least many embodiments of the invention can be the combination of:

(a) Some sort of optical imaging sensor with a field of view through free space that includes or is intended to capture a physical space of interest for a given application.

(b) Some type of one or more fiducials associated with one or more objects in physical space that can be optically captured by the optical imaging sensor and identified in what will be called camera space, as well as differentiated from other objects or background in the image. The fiducials can be just one, or could be plural, including in a geometric configuration, or pattern, or cloud array. In one no-limiting example, the fiducial is an infrared (IR) LED.

(c) A process to correlate imaged fiducial(s) in camera space into estimation of position in physical space. Examples can range from comparison of imaged fiducial(s) relative to reference position(s), lines, axes, or other references in camera space; to calibration or registration between camera space and physical space to allow indication or estimation of position of the fiducial(s) or landmark(s) in physical space with their representations in camera space. In one example, the calibration uses a camera space reference position or coordinate system that is correlated to physical space. The known geometric relationship between the sensor and acquired geospatial information about object 1, and the known geometric relationship between the fiducial(s) and object 2, allows the camera space translation to be combined with the object 1 geospatial information to make the estimate of geospatial position of object 2, even though there is no independent geospatial information acquisition system on object 2. It is to be understood that calibration is not necessarily required. Some of the examples show how simply display or detection of imaged fiducials can be interpreted by the user as indicating information about object 2.

(d) A translation of the estimated object 2 position into a form that can be used by the operator or by other components. In one example, the imaged fiducials are displayed to the operator relative a reference frame or grid on a digital display. In another example, the camera space imaged fiducials and their translation to physical space are communicated via a signal to another component (e.g. precision ag auto steering). In another example, the estimated object 2 position is communicated to digital storage which can be used at a later time, e.g. follow along vehicles.

(e) In some examples, the optical imaging sensor is a camera associated with an agricultural machine, and the fiducials are associated with another agricultural machine. The agricultural machines can be connected to one another or independent of one another. Other examples relate to a moveable machine relative to a fixed object. Other examples include objects carried by moving materials. It is to be understood that these are non-limiting examples and that the paradigms and aspects of the invention can be applied in analogous ways with other objects or machines whether in agricultural production or otherwise.

(f) In many of the examples, the fiducials are active in the sense they are light sources that are operated to emit light during sensing but they are passive in the sense they do not activate or actuate any process or other component. One specific example are infrared LEDs, which emit in the infrared spectrum and are therefore not visible by the human eye but can be imaged (and distinguished from other luminance or illumination captured by the imager) with appropriate configuration of the imager. It is to be understood, however, that different fiducials are possible. For example, other types of light sources and spectral outputs are possible. By further example, reflectors could be used that reflect light and can be captured in camera space. A still further example is use of machine-vision and image recognition to identify passive fiducials on the second object. One example is image recognition of corners or edges of object 2, which would be used instead of active fiducials such as LEDs. Image recognition can be based on one or more characteristics of an acquired image. Non-limiting examples include pattern or shape recognition, color analysis, pixel counting and thresholding, edge detection, blob detection, and neural net/deep learning/machine learning processing. See, e.g., U.S. Pat. No. 6,539,107 for more details, incorporated by reference herein. Use of feature recognition can be used to turn unique shapes and/or colors (or other detectable imaged features) on the implement into fiducials. This could avoid nothing in terms of active fiducials to be placed on the implement. A machine learning algorithm could identify unique looking parts of the implement and turn them into fiducials and then use those to estimate the orientation and/or position of the implement.

(g) In a general context, one aspect of the invention is use of a combination of components to track, monitor, or model relative movement of objects or materials in physical space by camera vision. Fiducials associated with the object(s) in physical space are identifiable in the image plane or space of a camera having a field-of-view that includes the fiducials. Calibration of the camera field-of-view image plane or space to the physical space allows recognition of movement of the fiducials in image space. This can be translated into magnitude, direction, and/or orientation in physical space.

3. General Apparatus for at Least Many Exemplary Embodiments

With particular reference to FIG. 1A, at a high level, an apparatus according to aspects of the invention is diagrammatically depicted.

Non-limiting examples of components that might be utilized are:

| Parameter being tracked | Relative position, movement, or orientation of at least one object or material in physical space to another object or reference |
| --- | --- |
| Optical imaging sensor | One or more optical imaging sensors or imagers |
| Placement of optical imaging sensor | At a known location relative to Object 1 with automatically acquired geospatial information about Object 1 |
| Camera space of optical imaging sensor | 2D image plane ($X_c$, $Y_c$) or 3D if camera(s) capable of seeing depth |
| Fiducials | One or more fiducials associated with Object 2 that can be identified in camera space |
| Placement of fiducials | On objects or materials (Object 2) being tracked in physical space |
| Physical space of fiducials | Area around fiducials and ideally in field of view of optical imaging sensor |
| Identification of fiducials in camera space | Filtering techniques (e.g. physical and/or mathematical) to identify and distinguish accurately the fiducials in camera space from other objects |
| Correlation of camera space to physical space | Calibration to allow processor to translate position of identified fiducials in camera space to position in physical space |

As will be appreciated, including with reference to specific examples set forth below, an overall system applied to a tractor (as object 1) and a towed trailer (as object 2) according to the invention could take the configuration of FIGS. 5A and 5B. In FIGS. 5A-B, the imaging sensor is a digital camera mounted in a known position on the tractor. Geospatial information about the tractor is automatically acquired by on-board GPS. In this example, the fiducials are diagrammatically illustrated by red dots and mounted in a known position on the towed trailer. As will be appreciated, the fiducials can vary in number and arrangement. FIG. 5A shows just two arranged along a vertical axis on the trailer. FIG. 5B shows eight arranged in a predetermined geometric shape (here as cube), as but one other example of many possible. The camera-space image of the fiducials is shown diagrammatically in both FIGS. 5A and B. In one example the fiducials are IR LEDs and, thus, not visible to humans; but can be acquired and distinguished by many if not most digital imagers. As further diagrammatically illustrated, the fiducials could be filtered from other image content and displayed alone or just in combination with some reference boundaries, but this is not required. As can further be seen in these figures, when the tractor and trailer are aligned (e.g. a reference position) as in FIG. 5A middle, the imaged fiducials align with a reference position on the display (one way to indicated alignment). But when the tractor is turned relative the trailer (FIG. 5A right side, and FIG. 5B), the displays diagrammatically indicate vertical plane (X, Y) offset of the imaged fiducials from the reference (aligned position) at least in direction. FIG. 5B provides illustration of how that offset with a 3-D fiducial cloud could also indicate vertical plane (X, Y) offset from reference, but also indicates 3-D orientation by the imaged relationship of the 8 fiducials.

Applying the general concepts above to the simple example of FIGS. 6A and B (tractor, towed trailer, two IR LEDs mounted along vertical axis on the trailer), a preassembled fiducial set of fiducials, with its own mounting hardware could have onboard battery power and circuitry. In this case, the two infrared LEDs could thus operate without wired connection to any other component, which frees the set to be easily mounted in a variety of locations. It could have a manual on/off switch. Alternatively, it could have an economical remote on/off control that is wireless. An example would be an infrared receiver to a switch that would be instigated by an infrared emitter. Other forms of automatic on/off or possible. Some non-limiting examples might be radio, Bluetooth, and Wi-Fi. Alternatively, low power LEDs could allow LED operation continuously for substantial time periods, eliminating the need for the operator to turn them on and off. Some battery sources can provide into the thousands of hours of continuously operation of one or two IR LEDs of the type and intensity sufficient to be detected in digital camera imaging in agricultural environments. Because they are IR sources, they would not illuminate with visible light or otherwise be visible by at least humans. For example, a relatively inexpensive commercially-available digital camera (e.g. model RealSense 415 from manufacturer Intel Corporation, Santa Clara, CA, U.S.A.) could have a relatively wide-angle view lens and its own mounting hardware. It would be sensitive to the emitted light from the LEDs and distinguish the emitted light from the LEDS for the range of intended environments and uses discussed herein.

The camera would be mounted to object 1 or other known location (e.g. geospatially known relative to earth). The LED assembly would be mounted to object 2. A field of view sufficient to capture the mounted LED assembly over its normal range of motion would thus allow tracking of those fiducials in physical space over normal operation.

FIG. 1A also indicates such a system could include a processor that either has a software-based filtering technique and calibration technique (see, e.g., FIG. 5B), as well as what will be called an identification technique, namely configured to accurately distinguish and identify images of the IR LEDs versus extraneous other matter. Alternatively, there can be separate components that are either hardware-based or a combination of hardware and software based for filtering, calibration, and identification techniques.

As will be appreciated by those skilled in this technical area, the processor could be operatively connected to other components. One is a display screen. The image plane or space of the camera could be displayed as a visual representation of camera space. By the filtering, calibration, and identification techniques, renderings of the images of the LED in camera space can be displayed. In this example, they are displayed all by themselves relative to a pre-configured 2D camera space coordinate system $X_c$, $Y_c$ (X=horizontal axis; Y=vertical axis) as in FIG. 6A. With appropriate calibration techniques, in the case of a vertically spaced set of two LEDs, alignment along camera space axis $X_c$ results in the images of fiducials 1 and 2 (the two LEDs) to be aligned along that axis on opposite sides of axis $Y_c$. As indicated in FIG. 6B, if the object 2 (implement 12) moves out of such alignment, the images of the LEDs would move from the position shown in FIG. 6A. From that, the observer would see the direction of movement away from alignment as well as magnitude. This could include both horizontal and vertical movement.

As discussed further later, some digital imaging technology commercially available allows the digital imaging to resolve depth or Z-axis position. Examples include RealSense™ Depth Cameras D415, D435, or SR300, available from Intel Corp., Santa Clara, CA USA. Information can be found at www.intel.com/content/www/us/en/support/articles/000026260/emerging-technologies/intel-realsense-technology.html, incorporated by reference herein.

As will be further appreciated, because the processor essentially understands the image plane XY (or XYZ if depth recognition enabled) based on a digitized array of pixels, commercially available software related to image recognition could correlate through calibration position of the images of the LEDs in camera space $X_c$, $Y_c$ (or $X_c$, $Y_c$, $Z_c$) to actual position in physical space $X_p$, $Y_p$, $Z_p$. By known geometric relationships, that translation could further include information along physical space $Z_p$ axis (towards and away from the camera) if such movement is possible. With a hitch point implement that is less of a concern than if the object 2 was unattached to object 1. However, some hitch point implements are not rigid and therefore the $Z_p$ axis could still be relevant for them. Sprayer booms are one example.

In any event, by geometric calculations in the processor, it is possible to feed to another system the estimation of position of the LEDs relative to the camera, which allows an estimation of position of object 2 to object 1, or position of object 2 relative to the earth. This could be used by further automated systems such as autosteering of object 1.

This feedback from the camera/fiducial system according to the invention could be used to correct or compensate for implement drift and be an input to autosteering to bring the implement back into correct alignment, or used to track where the implement truly tracked for further use.

A further example would be implement autosteering. Some implements include an autosteering subsystem on-board, allowing computed guidance instructions to be sent from a navigation system to control independently or quasi-independently of tractor steering (manual or autosteer) the implement. The camera/fiducial system could inform the implement autosteer to correct any drift from desired motion path of the implement. An example of implement autosteer can be found at U.S. Pat. No. 9,964,559 to Ag Leader Technologies, Inc. and incorporated by reference herein.

As can be further appreciated, other components could be utilized in the system. One example would be GPS or INS, or any combination of them, or other inputs. In one example, mounting the camera in a known position relative to a GPS antenna would thus allow the calibrated correlation of position feedback from the camera/LEDs relative to a GPS position. The same could thus be translated and analyzed regarding the estimated position from the camera/LEDs into a GPS position for any number of uses. Additional components such as control of spray boom position, spray width, or even spray on and off could be informed by this system to more accurately apply spray to a field. Analogous applications are, of course, possible. As will be appreciated by those skilled in this technical field, the camera/LED fiducials do not require expensive components, wired connection, or GPS. They alone could be used as positional feedback to an operator on a display to track implement position or other relative positions.

It is to be further understood that the degree of accuracy can be tuned according to need or desire. For example, in some situations, a single LED fiducial without much filtering, calibration, or identification processing, could give a rough visual display tracking for an operator. Any substantial movement of an implement from a reference or alignment position could be seen and corrective action taken.

On the other hand, as will be further discussed below, a variety of tunings or optimizations can be built into the system to make the estimations of position of the fiducials in physical space quite accurate in camera space. Therefore, it is envisioned that, through optimization and tuning, even on relatively large implements where the fiducials are ten or more feet away from the camera, the point source nature of LEDs could be resolved effectively according to need or desire. As such, the benefit of a relatively cheap, robust, fast way to derive an estimation of relative position has many potential beneficial applications even in the relatively harsh and unpredictable conditions of agriculture or moving components relying on optical sensing with other ambient lights that can create significant challenges.

For example, an accuracy of at least 5 cm at no further distance than 10 meters, and 3 degrees at that same distance, is deemed effective for many applications. The exact accuracy drops off as distance increases. Significant drop off occurs at 10 meters. For some applications, this is not usually a concern. Take the example of parking up to a grain bin. At 200 meters away we need very little detail. A simple heading and a distance scale of, e.g., "it is further than 100 meters" is usually acceptable. As we get closer, we may desire more accuracy to place the vehicle right under the spout. Beneficially, as we get closer the accuracy increases again, solving the issue in these types of applications.

4. General Operation

Figure 1B:
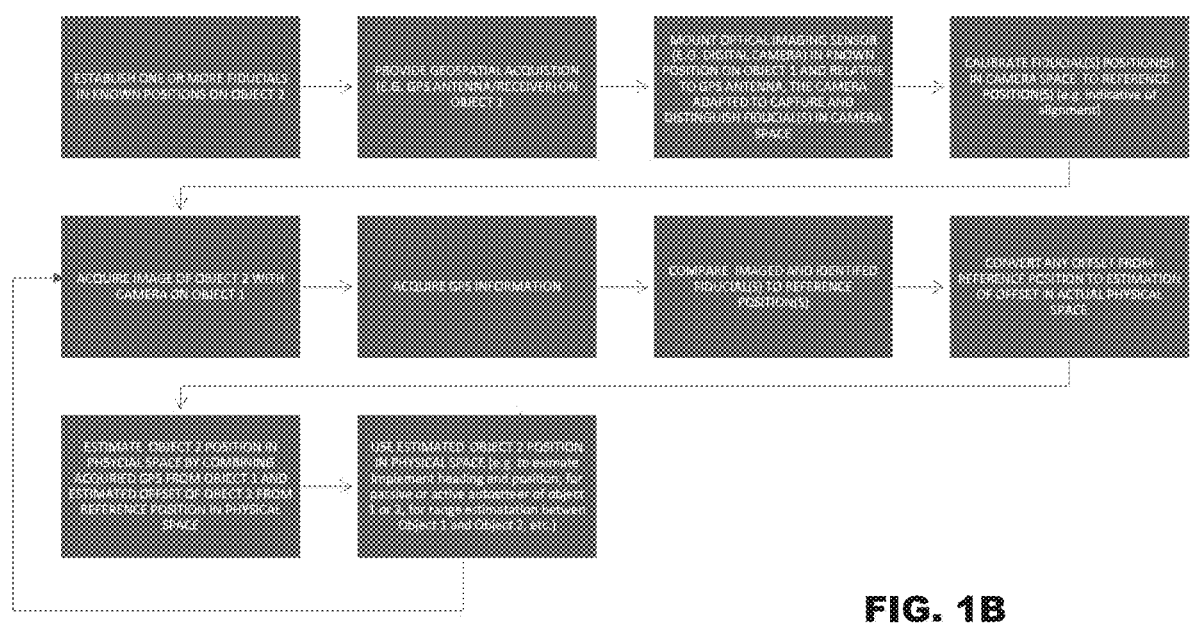

With additional reference to FIG. 1B, an example of how the apparatus/system of FIG. 1A could be used is shown.

The optical imaging sensor and fiducials are mounted. A calibration or training occurs to register fiducials imaged in camera space to physical space. In use, while geospatial information about object 1 is acquired, the fiducials are tracked in camera space. Combining the acquired geospatial position of object 1 (and thus optical imaging sensor) with processor-computed translation of imaged fiducials to physical space allows estimation of position of the fiducials (and thus object 2) in physical space. As shown in FIG. 1B, that process can be repeated, including at a relatively high rate (e.g. on the order of milliseconds) so that a relatively high temporally and spatially resolved tracking of object 2 position can be obtained. That tracking can be used immediately or logged and used later.

The challenges for camera-vision-based tracking are many, especially in agricultural contexts. The environment can be rugged. It can be high light or low light and extraneous ambient light and reflections. There is vibration, debris, and irrelevant objects, some moving, in the field of view.

As indicated above, in operation, an optical imaging sensor is configured to not only view relevant physical space for a given application but be able to accurately distinguish fiducials in physical space that are captured in its image space. This usually requires some type of filtering technique or techniques so that irrelevant objects are not mistakenly identified as relevant. This also usually requires some type of correlation, registration, or calibration between camera space and physical space so that position of identified relevant fiducials in camera space can be related to position (and movement) of the fiducials in physical space.

Effective implementation of such systems, including the challenges and unpredictability because of the various factors involved, some of which are antagonistic with one another, can be illustrated with respect to the following specific examples. Examples of factors that can be antagonistic include:

(a) How to effectively capture images or optically sensed information in high dust and debris, variable ambient light conditions?

(b) How to effectively distinguish fiducials in camera space with other objects, some moving, in the sensor field of view?

(c) How to accurately verify the camera space objects are truly the relevant fiducials of interest in the operating environments noted?

5. Preconfiguration, Installation and Operation

Prior to installation, see e.g. FIG. 18, the designer or operator would select with method 200 such things as number, type, and operating parameters of visual fiducials such as LEDs. Some examples of alternatives are noted in design choices 220 of FIG. 18. The actual visual fiducial physical configuration would then be selected. The sensor of the visual fiducials, such as a digital camera, would be pre-initial lives according to the designers needs and desires as indicated.

A second stage, installation steps 230 (FIG. 18, middle), would involve mounting the LED configuration to an object or objects of interest. The sensor or camera would be mounted to another or second object or location. Calibration of camera to field-of-view would take place.

There are states of operation 240 (FIG. 18, right) that would include powering up the visual fiducials such as LEDs per their pre-configuration, powering up, and then capturing the field of view with the sensor. Monitoring of field of view by the camera would occur over instigated movement of one or more of the objects relative to one another. If an image of a visual fiducial is identified, it would be associated with and tracked in camera space. Pre-calibration would allow either simply display relative to camera space coordinates correlated to physical space, or alarm if out of range or misalignment is detected, or passed on to some other system for use.

As will be appreciated by the specific examples below, fiducials comprising LEDs can be pre-selected to have operating parameters that are advantageous for certain applications of the invention. A few non-limiting examples are as follows:

a. An interesting benefit of LEDs is that their emission frequencies can be tuned. On the one hand, all LEDs used in a system could have the same output frequency or spectral band. On the other hand, different LEDs on the same assembly could have different frequencies. In that sense, they could be differentiated in camera space on that basis.

b. Another example is color which can be related to output frequency.

A still further example would be pulsing the LEDs. As solid-state sources, they have instantaneous on/off. All sources could have the same pulse rate. Alternatively, they could be tuned to different pulse rates and as such could be distinguished from one another in camera space on that basis.

Other operating parameters of the LEDs are possible. One might be intensity. Different LEDs could be driven at different intensities as a differentiating factor. Other examples are discussed herein.

The Figures indicate just a few non-limiting examples of different physical configurations for the fiducial or fiducials. In general, variations from a single LED of given operating parameters to plural (two or more) is possible. The two or more can be in a 2-D (e.g., linear) arrangement. They could have three or more in a 3-D arrangement.

Because of their relatively small size and low cost, as well as relatively low power for substantial estimated operation by battery, the designer can create a number of potential configurations according to need or desire.

As will be appreciated, relatively straightforward geometric principles would allow both 2-D and 3-D LED configurations to map out into the image plane of camera space and be translated as far as estimate of actual position in physical space. Additionally, by pre-configuration of what will be called a point cloud of plural LEDs, geometric relationships in physical space can be used to estimate 3-D change in position even using the 2-D image plane of camera space. Other configurations are, of course, possible. Some are mentioned below. A few additional examples are the LEDs could be pulse modulated with a synchronized frequency. LEDs that are at different distances would show their pulse time slightly out of phase due to the extended flight time. We could use to this measure the 3-D position of the LEDs directly. Other examples are given herein.

Non-limiting examples of pre-configuration step for the optical sensing subsystem according to need or desire. There could be filtering, calibration, and camera space identification techniques of all sorts to tune or optimize the ultimate solution of estimated position of LED fiducials in physical space.

Details of such techniques and/or theories can be found in the literature. For example, US 2006/0119574 to Richardson, US 2008/0211771 to Richardson, and US 2009/0128482 to Richardson (all incorporated by reference herein) are but a few examples of camera vision-based position sensing using optically identifiable fiducials in physical space including use of plural fiducials to deduce orientation (pitch, roll, yaw). These references provide one skilled in the technical area of any invention as well as others with background regarding how fiducials in physical space captured in an image plane of a digital imager that has a known reference frame can be used to translate at least an estimate of relative position in physical space, including change of position over time.

As indicated later, and as explained in some of the specific examples, further tuning or optimization for the applications according to the present invention can include but are not limited to selection of the LEDs and their operating parameters, the physical configuration of the LEDs, and then using filtering and calibration techniques, along with image recognition techniques, to accurately distinguish the captured images of LEDs in camera space from all else.

A preassembled LED assembly can have mounting hardware to allow selective placement on an object 2. It will be appreciated that the method of mounting can vary according to need or desire. Non-limiting examples are adhesives, screws, or bendable metal claws. Any number of ways are possible. It could include such things as temporary or permanent adhesives, magnetic mounts, or others.

The optical imaging sensor could also have built-in mounting structure for attachment to an object. Similarly, it could be simply screws, adhesive, or some malleable or strap-on configuration. These are non-limiting examples. It allows flexibility in position of the camera to get a desired field of view. The same is true for the LED subassembly.

As a part of installation, calibration would likely be required to some extent. Using pre-configured calibration instructions and techniques, once camera and LED subassemblies are mounted, the installer can calibrate to the desired level of accuracy and precision before operation.

The Figures and description give just a few non-limiting examples of fiducial configurations or assemblies.

If active visual fiducials such as LEDs are used, there could be some power on and driving step initiated. As mentioned, LEDs could have an onboard battery power source and driving circuit. A simple on switch could suffice. Battery life could be for a substantial period of time. On the other hand, as is known in this technical field, LEDs effective for at least many of the complemented application herein could be configured to operate effectively at such a low power usage per period of time that the LEDs could be left on continuously for long periods of time and remain operable. For example, once mounted, they could be left on for months (an entire growing season or more) and then batteries replaced.

In the example of commercially-available Aimpoint red dot sight (model LPI IR Laser Aiming Device from Aimpoint, Malmo, SWEDEN), an LED and reflector combination capable of IR spectrum emission, they can operate continuously for on the order of 50,000 hours with a single Duracell model DL1/3N battery or 2L76 battery. For reference, there are approximately 8,760 hours in a year. Therefore, there may be no need for more complex and expensive (and subject to failure) on-off switches. Features of the LPI include: IR Laser Aiming Device, wavelength 840 nm, Class 1, eye safe; operates over relatively large temperature range (at least −10° to 50° C. (14° F. to 122° F.)); is humidity, water, shock, vibration, and chemical resistant.

By IR or infrared it is meant its ordinary meaning of the infrared region of the spectrum; infrared radiation, namely electromagnetic radiation having a wavelength just greater than that of the red end of the visible light spectrum but less than that of microwaves. Infrared radiation has a wavelength from about 800 nm to 1 mm. The camera or other optical imaging sensor would also need power and could require a lens to obtain the required field of view. Some mounting locations, such as on a tractor, would have a readily available electrical power source that could be accessed by wired connection. Alternatively, some types of cameras that could suffice could have onboard battery power.

Mounted, powered up, and initialized, tracking would proceed with the movement of the one or more objects while the camera captures images.

By the appropriate configuration and calibration, the tracking of the fiducials as captured in camera space can be translated into physical space positions which can then further be used to display or feedback or communicate to other components. Those other components, as mentioned above, could use such feedback for a variety of purposes including further automated action.

It can therefore be appreciated that the generalized paradigm of the invention meets at least most of objects, features, aspects, and advantages of the invention. It combines the counter intuitive use of fiducials in physical space on one object that can be optically detected at a known imaging location to track, monitor, or estimate position, movement, or orientation of the fiducials/landmarks relative to that imaging mounting location in physical space. For example, even in bright daylight, image recognition or processing can detect and differentiate the fiducials/landmarks from other environmental objects or background captured in camera space. In one example, the imaged fiducials are presented to an observer on a display of the camera space in a manner that allows human observation of the imaged fiducials/landmarks relative to camera space reference(s) or coordinates. This, in turn, provides the observer an immediate understanding of position of those fiducials/landmarks, and thus the object(s) on which the fiducials/landmarks are mounted, in physical space. In another example, by image recognition and processing, imaged fiducials in camera space can be translated to physical space coordinates. This allows automated use of such information. Non-limited examples are autosteering of vehicles or implements, motion-control of moving parts of vehicles or implements, or analogous automated instruction or compensation.

As mentioned, the following a several techniques the inventors have conceived that can be beneficially applied to the general apparatus/method described above. These will be discussed with additional reference to FIGS. 7-20.

FIGS. 7A and 7B illustrate a tractor as object 1 and a towed trailer as object 2. Fiducials on the trailer are IR LEDs at the four corners of the trailer box. The tractor has an on-board GPS. A digital camera is mounted in known relationship to the GPS on the tractor. But as indicated in FIG. 7A (see annotations on left side), these techniques can be applied in a variety of contexts. Objects 1 and 2 can be different than tractor/towed trailer. GPS can be another geospatial position acquisition system. The fiducials can vary. FIG. 7B is one example of set-up, operation, and enhancements with the invention.

6. The Fiducial Identification Problem and Solutions

With reference to the Figures, below are non-limiting examples of how the system can be configured. This includes techniques to add flexibility or accuracy.

a. Light-Based Techniques for Optimization (1) Fiducial Shape

As indicated by the non-limiting examples at FIG. 8, the designer can select the type and form factor of the fiducials. A single fiducial can be used for some applications. It is to be understood that the single fiducial could be placed in a known position on object 2. Or several single fiducials could be placed in known but spaced apart positions on the same object 2. One example would be a fiducial at each arm of a two arm sprayer that can lift or lower each arm independently. Another example would be a fiducial at each planter row unit or at each spray nozzle.

FIG. 8 shows just a few examples of more complex multi-fiducial clouds. As indicated herein, these can allow one or more of 3-D r resolution, 6-axis resolution (if at least 3), and other flexibility. Because such clouds are relatively small and relatively inexpensive, they also could be placed one to an object 2, or several or many to different parts of an object 2.

As will be appreciated with reference to U.S. Pat. No. 6,539,107 to inventors Michael et al. (incorporated by reference herein), analysis of at least three fiducials, with at least one being out-of-plane with the other two, allows for the possibility of resolving not only X,Y position of object 2, but Z position, as well as the three orientations of roll, pitch, and yaw.

A visual fiducial assembly can be arranged around a cloud frame of certain form factor/shape. It could be transparent or nontransparent or any range of transmission therebetween. The cloud frame can be mounted on a mount that includes a battery or circuit to operate the LEDs. Some sort of fasteners could be utilized to mount the mount to an object. One example shown are screws or bolts. Another non-limiting example would be flexible straps.

In this manner, a plurality or cloud of visual fiducials in known relationship to one another can be self-contained apparatus for any type of use. By simple geometries, such an array of spaced apart LEDs can be monitored in camera space once acquired in camera field of view and a variety of information about position of the object to which the cloud is attached can be derived. As indicated above, if only one side of the cloud of LEDs is in the field of view, this indicates one relative position of the cloud frame to the camera field of view. If the cloud frame is tilted relative to the axis of field of view, other information can be derived about the object to which it is attached (e.g. orientation).

As can be further understood, each of the LEDs could, with appropriate image recognition software, be individually identified in camera space. This would give more detail of physical position and orientation compared to simply one or two LEDs. Parameters that could vary the LEDs include, but are not necessarily limited to, variations in color, intensity, or other LED operating characteristics that can be distinguished from one another by appropriate image processing or filtering. Additionally, using similar techniques as motion control, one or more objects can be tracked over time using the fiducial(s) in camera space to inform what relative movement or position exists in physical space.

Configurations of a cloud of fiducials having at least three fiducials in a pre-determined arrangement relative to known location camera would allow enhanced understanding of orientation as well as the distance away from camera, as can be appreciated.

(2) Fiducial Type

Light Emitters

Emission Color, Intensity, Duty Cycle

As mentioned herein, if the fiducial is a light source, the designer can choose not only type and wavelength, but also operational parameters. One example is constant-on IR LED of intensity sufficient to be imaged in ag or other environments of interest in the use. IR has benefits mentioned herein at least for ag use. But the invention is not limited to IR.

Similarly, the designer can select the emission intensity according to need or desire. One benefit of aspects of the invention is that the types of digital imagers that can be effective are relatively economical and can pick up light energy over the types of distances envisioned.

But there are techniques to help resolve relevant fiducial emissions for irrelevant. Non-limited examples include filtering out of all but the fiducial wavelengths or pulsing the fiducial light sources at a duty cycle that is distinguished by the camera.

Size, Form Factor

The designer can also select the size and form factor for any fiducial according to need or desire. Typical single IR LED sources (a few mm in wide, length, height) can suffice. But there may be uses that benefit from larger sources. And, as discussed, there can be a point cloud of plural fiducials or machine-programmed or learned pattern recognition without light sources.

(3) Filtering Techniques Optical And Digital

FIG. 9 diagrammatically indicates a few types of filtering of light for the above purposes. Filtering techniques can vary depending on need or choice. They can include physical and/or mathematical filtering. Optical filters are possible. But so are digital filters that are applied to the detected light energy at each pixel of the imager. Such techniques are known in the imaging technologies.

FIG. 7B diagrammatically illustrates how filtering techniques could be used in the methodology of the invention.

7. The Depth Estimation Problem and Solutions

As mentioned, emerging technology includes digital imagers that can resolve depth along the FOV aiming axis. Some commercially-available examples have been mentioned above. See FIG. 10 and US 2012/0105585 to Maslakar et al (incorporated by reference herein) and Zanuttigh et al., Time-of-Flight and Structured Light Depth Camera, Chapter 2 Operating Principles of Structured Light Depth Cameras, Springer International Publishing Switzerland 2016, pgs. 43-79 (incorporated by reference herein) for background information and details of concept.

The fundamental idea is that such technology inherently produces X, Y, and Z axis information about imaged fiducials, which can be used according to aspects of the invention.

FIG. 10 diagrammatically illustrates the basics of this concept. This could allow less processor calculations because the camera itself basically reports depth information. Some cameras are executing the processing. However, some still offload the calculations on the receiving device. See also www.intel.com/content/dam/support/us/en/documents/emerging-technologies/intel-realsense-technology/Intel-RealSense-D400-Series-Datasheet.pdf accessed Nov. 27, 2018 (incorporated by reference herein).

8. Machine-Vision and Techniques

As mentioned, instead of light or other emitting/active fiducials, machine vision/machine learning can be used to identify inherent/passive features of object 2 as fiducials. See FIGS. 11A and B, and U.S. Pat. No. 6,539,107 to inventors Michael et al. and U.S. Pat. No. 7,336,814 to inventors Boca et al., both incorporated by reference respectively. See also www.emva.org/wp-content/uploads/EMVA_MV-Fundamentals-01_2016-11.pdf accessed Nov. 27, 2018 (incorporated by reference herein).

The fundamental idea is that image recognition software and techniques known in the art can be applied here to learn what are relevant fiducials and/or what their physical space relationship is to camera space capture.

FIG. 11A diagrammatically illustrates some of the basics of this concept. Instead of lights as fiducials, specific locations, shapes, patterns, or features inherent in object 2 will be fiducials. For example, as indicated in yellow inverted-trapezoid-shaped outline in FIG. 11B (upper left corner), the optical imaging sensor can be programmed or trained to recognize the inverted trapezoidal shape of the front of the grain wagon when in aligned position with the imager. By programming or training, the software recognizes the shape from different camera viewing angles plus can estimate in camera space position of the trailer in physical space by evaluating the imaged shape.

The other non-limiting examples of FIG. 11B can use the same or similar approach. The box shape of each planter unit can be machine-vision recognized and evaluated. The boom of a sprayer, or even each nozzle position can likewise. The shape of a hopper for unloading grain to an auger for filling grain bin can be shape recognized. Likewise can the tongue of a trailer or a garage door to allow a vehicle to back up to either.

9. The Camera Movement Problem/Solution

As mentioned, there are challenges of the camera moving with the vehicle and why inertials solve that issue. The challenge is identifying whether the implement is drifting right of the tractor (looking backwards from the seat at it) or the tractor is beginning to turn left. The issue is the fiducials will move to the right side of the camera view either way. At first this seems irrelevant. If the tractor turns left or the implement drifts, the position from the GPS on the tractor to the position of the fiducials remains the same. Now imagine the tractor and implement moving in 3-D space. As the tractor rolls left the reported GPS position will also move left. The GPS is not capable of detecting that it has tilted, and that the center of the vehicle has not moved as far left as the GPS, which is on the roof, has. We fix this using inertials (aka IMU or more generically inertial navigation system [INS]) by estimating the amount of rotation using gyros and then providing an offset to the GPS position by knowing the distance from the center axle of the tractor up to the GPS. So far, this still does not talk about the challenges with the camera. So, the IMU has fixed the GPS position and its now accurate as the tractor rolls and pitches around. The remaining issue is update rates. Most agricultural GPS devices update at 10-20 hz. The camera will likely update at 60 hz or faster. This means the camera will detect changes visually before we receive new information about how the tractor is moving. We solve this final issue by using the IMU information to interpolate the position of the tractor between GPS updates at a rate as fast or faster than the camera. Now, each camera frame has an accurate location of the tractor to go with it.

FIG. 12 diagrammatically indicates the addition of an IMU to the system for this purpose. The fundamental principle is to use inertial sensor(s) to measure position/orientation of object 1 (and thus the imager because it is in known/fixed relationship to object 1), and make that information available to the processor to compensate for any offset/change that would affect the position estimation of object 2. The inertial sensor(s) measurements can be converted into electrical signals that quantify orientation and/or motion. By techniques well-known in precision ag (including systems that use GPS corrected INS), such inertial sensor(s) information can be converted to digital form and used by a digital processor.

FIG. 13 gives a high-level flow chart of the refresh rate solution. As indicated, the fundamental concept is to not only compensate for camera movement, but at a rate faster than GPS update rate so that the compensation is does not miss or lag the GPS data. This promotes benefits. For example, major benefits include at least the following. We can describe the difference between the tractor moving or the implement moving. Imagine you are floating deep in space on a space walk out from your ship. When you look at your ship it appears to be spinning. With no reference points, how do you know if the ship is spinning or you are? Part of the answer is our body can feel the strain and pull caused by the centripetal acceleration required to spin. The IMU works in a similar fashion. It can feel the rocking and pulling required to differentiate if the tractor is rocking back and forth or if the implement is. Using the IMU in this way is called sensor fusion. We use GPS and IMU readings to input to a statistical model called a Kalman filter. The output of this filter is a good estimation of the tractor's orientation in 3D space. To bring it all together, if we see the implement slide to the left via the camera but the IMU did not sense the tractor turning, we can state the implement lost traction and slid to the left.

10. The Boom Sway Type Problem and Solution

FIGS. 14A and B diagrammatically illustrate the effect of boom sway on placement of spray from each nozzle. For effective application of sprayed product, alignment of not only tractor but each spray nozzle with its relevant crop row is required. FIG. 14A illustrates in simplified form how a boom extends from mounting location on the vehicle in either lateral direction to free opposite distal ends. Some of these booms can be many tens of feet in length from mounting location to distal end and cover many rows. As mentioned earlier, forces on the boom from movement of the vehicle can accelerate either or both boom sides away from orthogonal with the vehicle. Depending on the rigidity and length of the boom between mounting location on the vehicle and distal free end, some such generally horizontal sway can misalign individual nozzles from their respective rows.

As mentioned, at least one fiducial cloud could be mounted on any boom arm and monitored for fore or aft movement or sway. The system would estimate such movement in physical space from evaluation of the fiducial in camera space. The high speed of optical detection and computation of the estimation (millisecs or quicker) allows electrical/electronic instructions from the processor to the sprayer to adjust rate of spray at each arm. By geometrical relationships of nozzle positions along the boom arm, spray rate at each nozzle could be minutely adjusted, or turned off temporarily. Alternatively, fiducials could be at each nozzle and position estimated via the optical detection to then instruct the sprayer as to appropriate spray rate at each nozzle, with such adjustments being made in milliseconds. FIG. 14B.

For background information on how flow rate to each nozzle of a boom-based sprayer can be controlled, see U.S. Pat. No. 8,839,681 to inventors Stewart et al., incorporated by reference herein. See also Ag Leader patents U.S. Pat. Nos. 9,629,304; 8,600,629; and 8,090,507; all three incorporated by reference herein; regarding how sensed measurements can be processed and used to generate control signals to adjust some function or actuator on an implement.

For details about how sway of a crane boom can be imaged and the amount and direction of sway estimated from the imaging, see Kawai et al., Anti-way system with image sensor for container cranes, J. of Mechanical Science and Technology 23 (2009) 2757-2765, incorporated by reference herein.

The fundamental principle here is identifying boom sway (direction and magnitude) through fast (millisecond) monitoring of boom position via optical sensing through free space, and using the same to adjust, almost in real time, spray rate at each spray nozzle on the boom if necessary.

11. Calibration Issues and Solutions

FIGS. 15A and B illustrate general concepts about calibration of imaged fiducials to physical space. Incorporated-by-reference citations, such as U.S. Pat. No. 6,324,296 to inventors McSheery et al.; U.S. Pat. No. 8,310,656 to inventor Zalewski; U.S. Pat. No. 9,678,583 to inventor Cheng; www.re.cum.edu, Daftry et al, Flexible and User-Centric Camera Calibration Using Planar Fiducial Markers, (2013), Institute of Computer Graphics and Vision, Graz University of Technology, Austria; www.academai.edu, Abahsa, et al., Robust Camera Pose Estimation Using 2D Fiducials Tracking for Real-Time Augmented Reality Systems, Laboratoire Systemes Complexes, France; and US 2017/0337700 to Wilson and Hall, each incorporated by reference herein, give details about some techniques to do so. The designer would select what, if any, calibration is needed, as well as technique, resolution, etc.

The fundamental principle is that there is a calibration or training programmed into the system to allow the processor to estimate how fiducial position(s) in camera space translate to fiducial position(s) in physical space. As indicated herein, this can be by no calibration or by simple to complex, depending on need or desire. Many of the incorporated by reference citations provide ways to do so. The designer could apply the general techniques in the incorporated by reference citations to create desired calibration or training for a given application of the present invention.

For example, a simple capture of fiducials in tractor/trailer aligned position, and storage of the same in processor or other memory, would allow comparison during use. By geometrical knowns (e.g. where the fiducials are placed relative the trailer) and camera optical characteristics, the proportional relationship between location in camera space (and movement in camera space) to physical space can be made.

Another example would be capturing and storing a large training set of captured fiducials in known physical space positions relative to camera. Then, during use, the captured fiducials in camera space can be matched to the appropriate image in a training set to derive position and/or orientation in physical space.

As can be appreciated with reference to FIG. 15B, if the fiducial cloud is a set of eight IR LEDs (like FIG. 5B), or is machine-vision-recognized, training or calibration can range from storing where in camera space the imaged fiducial cloud would appear and in what orientation (FIG. 15B, top left). Then, during use, if object 2 is in a different position, the acquired image of the fiducial cloud changes location, orientation, size, etc. in camera space. A larger training set could be stored images from a number of object 2 positions. During use, the closest stored image to the acquired image can be matched by the processor to derive physical space position of object 2.

See also, e.g.,
www.ri.cmu.edu/pub_files/2013/9/paper0019.pdf downloaded Nov. 27, 2018 (incorporated by reference);
www.academia.edu/23815590/ Robust_camera_pose_estimation_using_2d_fiducials_tracking_for_real-time_augmented_reality_systems downloaded Nov. 27, 2018 and FIG. 15A (incorporated by reference);
U.S. Published Patent Application 2017/0337700 to inventors Wilson and Hall (incorporated by reference).

12. The Follow Along Problem and Solutions

FIGS. 16 and 17 diagrammatically illustrate the benefit and techniques for using optical detection of object 2 position in a first pass, storing that information, and then recalling and using in a second or subsequent pass.

FIG. 16 illustrates a tractor and towed implement in simplified form and the tortuous path and uneven terrain it might experience. At time/location 1 (lower left corner) tractor and trailer may be generally aligned and on flat terrain. But at time/location 2 during travel across the field (next position up and right) uneven terrain may roll the implement relative the tractor or vice versa. This could cause GPS antenna roll that might affect estimation of actual physical position of the implement along the field. If used later by another vehicle/implement in another pass, it might cause erroneous guidance relative to plants/rows in the field. At time/location 3 (next up and to right), uneven terrain could cause pitch of tractor (and GPS antenna) versus trailer, and in position 4 (upper right) terrain or other causes could cause yaw between heading of trailer and heading of tractor. Again, if just GPS geospatial information about the tractor is used to log path through the field, uses such a log may not provide accurate information about actual through-the-field travel of the implement at one or more of times/positions 1-4. Therefore, using such a log may cause damage to plants or wasteful or ineffective application of product relative to plants in the rows.

Follow along vehicles/implements could be close in time by independent of the first pass vehicle/implement. One example is a grain cart (towed or self-propelled) following a grain combine.

Follow along vehicles/implements could be more remote in time from the first pass. Examples include a first pass planter and then second, third, etc. passes sprayer and combine, to name just a few.

FIG. 16 diagrammatically illustrates how during a first pass through a field, a tractor and trailer can follow a non-linear guidance path. The tractor/implement combination is shown at a first time and location in lower left corner, and then at three subsequent times during this first pass. Undulations in terrain or vehicle or trailer drift can cause one or the other to depart from the guidance path. Therefore, a GPS solution to tractor position may not accurately give position or heading of the implement.

FIG. 17 diagrammatically illustrates how a first pass implement (e.g. planter at leftmost) may use the invention to more accurately log actual implement path during first pass, so that another vehicle/implement, in a second or follow-on pass, can use logged implement position information from the first pass using the present invention to be guided to follow more closely to the same path in the second pass. Thus, a cultivator, sprayer, or harvester will know actual first pass implement path to do so. This allows that second, third, or more pass to, e.g., follow the crop rows and placement accurately.

As will be appreciated from the foregoing, the invention can take many forms and embodiments. Variations obvious to those skilled in this technical art will be included within the invention. But the foregoing examples are intended to show how to make and use the aspects of the invention and some of the design principles and decisions involved. These examples meet one or more of the objects of the invention. They take advantage of optical detection through free space in combination with known geospatial position of optical detector, instead of the cost and complexity of a geospatial component on or added to object 2. They take advantage of the overt and subtle advantages of using optical detection of fiducials to estimate physical space position. They take advantage of high-speed acquisition of optical detection, and its high-speed translation into physical space estimates to allow immediate, almost real-time use of that information. But, also, they take advantage of the ability to acquire at high speed with good spatial resolution the object 2 position information, store it, and retrieve it for later use.

As will be appreciated by those skilled in this technical art, aspects of the invention allow quite fast (millisecond) image capture and translation to physical space position on basically a continuous basis. Even at speeds typical of present-day agriculture (e.g. several miles per hour to 10 or 15 or more mph), with appropriate calibration and digital processing and storage power/capacity, estimation of object two position (or portions or parts of object two) can be on the same order of speed (milliseconds) and with spatial resolution down to a few inches or less. This allows logging of almost a continuous relatively high-resolution estimation of physical space position or other geospatial information that can be derived therefrom. Such a precision "map" so to speak of object 2 movement across the earth, regardless of the movement of object 1 (when acquiring the map in a first or earlier pass, or during a second pass) can provide the types of benefits discussed herein. One example for agriculture is to know with that precision where a first pass implement actually traveled through a field. Then, a second pass implement can be controlled to follow within a margin of error that same path.

FIG. 18 indicates examples of some of the design decisions to create and install a system according to the present invention. It also indicates how use of the estimated implement position of a first pass with the present invention could be used either during that first pass or logged for later use in subsequent passes.

13. Kits

FIG. 20 in simplified form illustrates that components to install the system of the invention can be made available in kit-form for convenience of users. The kit can contain (a) one or more digital cameras with mounting structure(s); (b) a fiducial cloud with mounting structure(s) and battery power source; (c) a microprocessor/software/display, (d) instructions, and (e) needed cables/connectors. The kit can be installed as desired on a variety of objects 1 and 2 by simply mounting the camera(s) on object 1, mounting the fiducial cloud on object two, and operatively connecting the processor to the camera and to an on-board geospatial acquisition component (e.g. GPS). The instructions would coach the user as to mounting placement and initialization, as well as calibration (if needed or used). As will be appreciated, the kit can be removed from a first set of objects 1 and 2, and moved to another set at the discretion of the user.

This exemplary embodiment in FIG. 20 diagrammatically illustrates both a potential system according to the invention and a specific form factor (eight LEDs on cubical frame). As will be appreciated, the fiducial cloud could take many forms according to need or desire. The precise packaging could, of course vary. FIG. 20 shows a non-limiting example of a cardboard card to which the components could be wire-tied and then that combination wrapped or enclosed in clear plastic, or put into an enclosed cardboard box.

As can be appreciated, a variety of connectors to mount camera(s) and fiducial clouds could be included. Examples would be any of the foregoing implements, fixed objects, or other possible objects to be tracked relative to another object.

As can be appreciated, the relatively small size of LED fiducials and the other components could allow quite compact packaging. Also, in some cases a protective housing (e.g. transparent case) could surround the LED cloud to protect it from the elements when installed and used.

As can be further appreciated, the type of fasteners could range from adhesives, to screws, to the end of all metal legs, to any of a variety of mounting methods such as within would be within the skill of those skilled in the art.

As will be appreciated with reference to the prior examples, a combination of components can be packaged or otherwise commercially sold or distributed in kit-form such that a kit-owner could select how to use the combination of an image sensor, one or more fiducials, and their respective mountings. The kit could include instructions for use of the components. In one non-limiting example they could be on a CD included with the kit. An alternative would be paper sheets. A still further alternative would be information with the kit for accessing such instructions on-line, such as a link to a website or URL that can either be displayed or downloaded.

As will be further appreciated, the number of components and types in each kit could vary. A kit could include just one camera and one fiducial assembly. But it could include plural of each or other combinations.

14. Summary of Generalized Embodiment

As the reader will appreciate from the foregoing, the invention and its aspects provide at least one or more of its stated objectives. From more simple implementations to more sophisticated, the fundamental use of optical detection of one or more fiducials, combined with an automatically acquired geospatial position associated with optical imaging sensor, provides a highly flexible, economical, and useful paradigm for agriculture. It can be applied in analogous ways to other uses.

To further assist in an understanding of such flexibility, several non-limiting specific examples are set forth below.

C. Specific Examples to Illustrate Flexibility of the Invention

To further assist the reader in understanding how aspects of the invention can be applied in use, a variety of specific examples are set forth below. As will be appreciated, most use light sources as the fiducial and a digital camera as the imaging device, but passive fiducials and other imagers can be substituted in analogous ways. Those skilled in the art will also appreciate that variations are possible with each.

As will be appreciated, the following examples utilize at least a similar paradigm to that the more generalized apparatus and method set forth above. To the extent they differ materially, such will be pointed out in more detail.

1. Example 1: Towed Implement Tracking (FIGS. 21A and B)

With specific reference to FIGS. 21A and B (which are duplicates of FIGS. 6A and B), a first exemplary embodiment 10 uses the following set of components:

Implement Tracking—A tractor-mounted camera 20 would look backward towards a pulled-implement 12. Two vertically-spaced apart IR LEDs 30A and B are mounted well-behind the implement hitch point 15. Calibration of camera space 21 with physical space 11 ($X_p$, $Y_p$, $Z_p$) in the camera field-of-view (FOV) 22 allows optical tracking of whether the implement 12 moves relative some reference position by sensing the position $X_c$, $Y_c$ of the images 30A' and 30B' of the LEDs 30A and 30B in camera space 21.

| Parameter being tracked | Position/heading of implement relative to tractor |
| --- | --- |
| Optical imaging sensor | CCD camera 20 with wide angle lens 23 |
| Placement of optical imaging sensor | On tractor 14 |
| Camera space of optical imaging sensor | 2D image plane 21 ($X_c$, $Y_c$) |
| Fiducials | IR LED x 2 (30A and 30B) |
| Placement of fiducials | On implement 12 pulled on tongue 13 from hitch point 15 to tractor 14 |
| Physical space of fiducials | Area 11 around/behind tractor 14 in which implement 12 would typically move |
| Identification of fiducials in camera space | Filtering techniques to identify and distinguish accurately the fiducials 30A and B in camera space 21 from other objects in camera space |
| Correlation of camera space to physical space | Calibration to translate position Xc, Yc of identified fiducials 30A' and 30B' in camera space 21 to position in physical space 11 |

The system would use a camera (e.g. 20) to optically identify points (e.g. here two LEDs 30A and B, but could be one or more 30A, B, . . . , n) attached on the implement. The change in shape, direction, distance, and other geometric factors of the point cloud (30A, B, C, . . . , n) emitted from the implement (e.g. 12) would allow us to calculate geometric information about the implement relative to the camera. The camera's physical location (e.g. on tractor 14) would be fixed in relation to GPS (e.g. many times available on the tractor or otherwise). This information can be combined to give GPS relative heading and position information about the implement. If only bearing from attachment point (e.g. 15) is required, the point cloud (30A, B, . . . , n) could be reduced to a single point. We would use the implement attachment point location 15 to infer orientation when combined with optical sensing to produce implement heading relative to the attachment point. While geometrically only a single point is needed, multiple points might still be needed to differentiate that LED from background noise.

The proposed system of this non-limiting example would rely on high range infrared LED emitters (e.g. on the order of ~1375 nm) to construct the point cloud. High range infrared is used because earth's atmosphere, particularly water vapor in the air, absorbs most of the sun's radiation in this band, almost all cameras can observe this band with minor modifications, and because the human eye cannot observe this band the equipment will remain aesthetically pleasing. There are multiple low points in received IR at sea level, but 1,375 nm has the largest band of very low power reception. See en.wikipedia.org/wiki/File:Solar_spectrum_en.svg, incorporated by reference herein. The camera can optionally include a strong filter for light outside of this spectrum to reduce noise. Further, the camera could contain a filter for the desired spectrum such that only powerful emitters can be observed by the camera. Combining this filter with strong emitting LEDs can further reduce noise.

A further method to reduce interference is using a prescribed shape for the point cloud. By establishing a known shape, interference that appears to be part of the point cloud will likely not fall into the prescribed shape and can be ignored. The prescribed shape will easily be recognized by the operator or image recognition software in any image or display of the point cloud in camera space.

Interference can also be reduced by affecting the LEDs. In one method, the LEDs would pulse at a known frequency, allowing filtering of all light sources which do not pulse at that frequency. In another method, each LED would emit at a slightly different band of high range infrared light so they are distinguishable. Distinguishing the LEDs would allow us to filter interference even if it fell within the above discussed shape because that interference does not emit in the correct band. Further, we could identify different implement pieces or vehicles based on the band its LEDs emit in.

Physically, the camera would be mounted firmly to fix its orientation relative to the GPS. This camera would require a lens wide enough to cover the possible range of motion of the implement. The basic implementation requires only one camera. However, multiple cameras could be used to cover more area and track multiple objects in space. The LEDs would be sold in packs with a method to adhere it to a position on the implement. The LEDs would be in the above described shape. The low power usage of LEDs means the packs could be battery powered, with a lifespan ranging in years. This would reduce installation complexity and cable production cost.

For pulled type implements, the system could be calibrated by engaging with a steering system on a straight line. If done on a reasonably flat surface and on a long enough line the implement should be straight behind the tractor, within tolerances. A one button "re-zero" calibration would calibrate camera or LED offsets. For fixed implements using the same "re-zero" calibration while not moving and with low wind speed should be sufficient.

Finally, this system is not necessarily restricted to implements. There are potential uses for automated grain carts, lining up grain augers with truck trailers, detecting fill level in a combine and drone control, among others.

As will be appreciated from the foregoing, this embodiment meets at least many of the objects of the invention.

Once installed and calibrated, the operator of tractor 14, having a digital display of at least part of FOV 22 in camera space 21, can quickly and easily visually see and understand alignment and any misalignment of implement 12 by position of imaged cues 30A' and 30B' in the displayed part of FOV 22. In this system 10, two LEDs 30A and B are selected to provide enhanced indication of alignment or misalignment relative to camera space coordinates $X_c$, $Y_c$. It is to be understood that a single LED 30 could be used, and more than two could be used. But in terms of cost and complexity, as well as balancing of those factors, easy visual monitoring of alignment by view of displayed FOV 22, two LEDs in the arrangement shown in FIGS. 21A and B can have benefits over just one because: (a) it is easy to see and perceive on a display and (b) it is easier to resolve relative a reference framework on the display.

As will be further appreciated by those skilled in the art and other examples later, more than two LEDs in a linear array that can be calibrated to camera space $X_c$, $Y_c$. Moreover, two linear arrays, one along $X_c$ and one along $Y_c$ are possible. Other geometric (regular, symmetrical, linear, non-linear, or not) arrangements are also possible as are the types of visual indications on the displayed FOV 22 to help the operator understand any misalignment. In other words, an orthogonal 2-D coordinated system is not necessarily the only option. Other examples might be a pyramid with an LED at each vertex, with the LED at the top of the pyramid physically closer to the camera. As will be appreciated by those skilled in the art, a variety of form factors of 2D or 3D arrays of LEDs could be used. As mentioned, for 6 axis solutions from camera space fiducials, at least three fiducials are needed. The designer can select the number of LEDs and there arrangement according to need or desire.

As will be further appreciated, a subtle but important benefit to this paradigm is there does not need to be any direct or indirect electrical connection between camera 20 and fiducials 30 by utilizing optical imaging through physical space. There is no wiring hookup or need for transmitters and receivers for wireless communication. Optical physical space imaging avoids the same.

In a similar vein, utilizing relatively inexpensive visual fiducials that can be differentiated in camera space promotes economy as well as sufficient accuracy. Still further, use of LEDs in this passive sense is a counterintuitive but non-complex hardware set to solve the problem.

As will be appreciated, real-time, on-the-go visual indication of misalignment of implement 12 relative to hitch 15 of tractor 14 can be important for agricultural producers. The mere visual indication can inform the operator of need for corrective action. As further explained, utilizing image recognition software that is commercially available, the designer can program the software according to need or desire. This would include designating what parameters are to be used, and then typically test effectiveness. This could include calibration of the captured visual fiducials 30A' and B' in camera space 21 into physical space coordinates can allows quantifying the misalignment of implement 12 relative to tractor 14 in physical space with enough accuracy to be used as inputs to, for example, a precision ag auto steering system. This can allow automatic compensation for undesirable implement misalignment by compensation through corrective auto steering action, both tractor (passive steering of the implement); and implement steering, which is active implement steering. As mentioned, certain software allows the designer to take advantage of machine learning to obtain effective image recognition of fiducials. For example, there is software that makes it easier to train a neural net to fix perspective by recognizing feature points.

As will be appreciated, the system 10 could both provide visual display to the operator with on-screen visualization of imaged fiducials in camera space plus quantify it for digital computation and use by other systems such as autosteer.

Alternatively, by image recognition/evaluation software, the position of fiducials 30A' and B' in camera space 21 can be calibrated to actual fiducials 30A and B in physical space 11. That calibration can be translated into a signal that can be communicated automatically to another device or component. One example is an auto steering system such as are commercially available and well-known in agriculture. Any alignment offset could be compensated by automatic on-the-go adjustment of tractor 14 steering.

The specific example 10 of FIGS. 21A and B illustrates the following set up. Physical space landmarks or fiducials 30, here two LED's 30A and B, are mounted along a generally vertical axis $X_p$ on implement 12.

Implement 12 is attached by tongue 13 to hitch 15 of tractor 14 along axis $Z_p$.

Camera 20 with lens 23 captures the field of view 22, here basically implement 12 over its normal range of positions during typical use. As can be appreciated, field of view 22 can be adjusted or configured according to need or desire relative to the configuration of system 10. It may not always be required that LEDs 30A and B are in FOV 22 at all times, but current camera and lens technology can basically make this possible if needed it.

Physical space, here diagrammatically indicated at Ref. No. 11, is characterized as XYZ space. In physical space 11, implement 12 can be characterized as having a general coordinate system $X_p$, $Y_p$, $Z_p$.

In contrast, camera space 21 is characterized as to the 2-D coordinates $X_c$, $Y_c$.

In system 10, LEDs 30 are selected because they are essentially point sources of light. They can have an intensity, color, or other optical parameters that can be captured in FOV 22, and distinguishable from other objects or background in camera space 21, by fairly straightforward techniques. As generally illustrated in FIG. 18, those techniques can basically allow FOV 22 to image LEDs 30A and B basically exclusively of other things in camera space 21. By calibration, camera space 21 can be correlated to physical space including $X_P$, $Y_P$, $Z_P$. One simple example is cross hairs at $X_C$, $Y_C$ in camera space 21 (e.g. $X_c=\emptyset$, $Y_c=\emptyset$). The starting calibrated position of alignment of $X_P$ and $Y_P$ with $X_C$ and $Y_C$ for LEDs 30A and B is illustrated in the bottom enlargement of FIG. 21A. This would indicate to a viewer of that display that there is alignment of implement 12 and tractor 14 along $X_p$, $Y_p$.

Then, any movement of imaged fiducials 30A' and B' away from $X_c=\emptyset$, $Y_c=\emptyset$ would show the viewer direction and magnitude of misalignment (see lower display in FIG. 21B).

2. Example 2: Tile Plow Angle Detection (FIGS. 22A and B)

With reference to FIGS. 22A and B, another possible application that utilizes an image sensor and one or more imageable fiducials is as follows:

Tile plow angle detection—A camera 20 would be mounted on the vehicle 14 looking back at the tile plow 42. See, e.g., Ag Leader U.S. Pat. No. 8,090,507 (incorporated by reference herein) for discussion of this tool, which etches a trench along the ground into which drainage tile piping can be inserted. LED 30 would be affixed to the portion 43 of the tile plow 42 that raises and lowers. The camera 20 detects the vertical angle of the LED 30 to measure the position of the tile plow portion 43. This information provides feedback for tile plow depth control. An example of a tile plow as a part of a water drainage system, and how it can be controlled relative to the ground as well as integrated into a precision ag application/system can be found at U.S. Pat. No. 8,090, 507 owned by Ag Leader Technologies. See also US 2009/ 0187315 A1 to Yegerlehner and Bell, incorporated by reference herein.

| Parameter being tracked | Tile plow depth relative to ground |
|---|---|
| Optical imaging sensor | CCD camera 20 with wide angle lens 23 |
| Placement of optical imaging sensor | On tractor 14 |
| Camera space of optical imaging sensor | 2D image plane 21 ($X_c, Y_c$) |
| Fiducials | Light sources (e.g. IR LED x 1) (ref. no. 30) |
| Placement of fiducials | On raiseable/lower portion 43 of tile plow 42 pulled by tractor 14 |
| Physical space of fiducials | Area 11 behind tractor 14 in which tile plow 42 would typically move |
| Identification of fiducials in camera space | Filtering techniques to identify and distinguish accurately the fiducial 30' in camera space 21 from other objects |
| Correlation of camera space to physical space | Calibration to translate position of identified fiducial 30' in camera space 21 to position in physical space 11 |

In this example, LED 30 is mounted on the raiseable and lower tile plow portion 43 of a tile plow implement 42. This allows an operator viewing a display of camera space 21 to quickly see vertical position of tile plow 43 relative to ground 16 because tractor-mounted camera 20 is in a known mounting location relative tractor, and therefore, the ground 16 as well as implement 42.

Figure 22B:
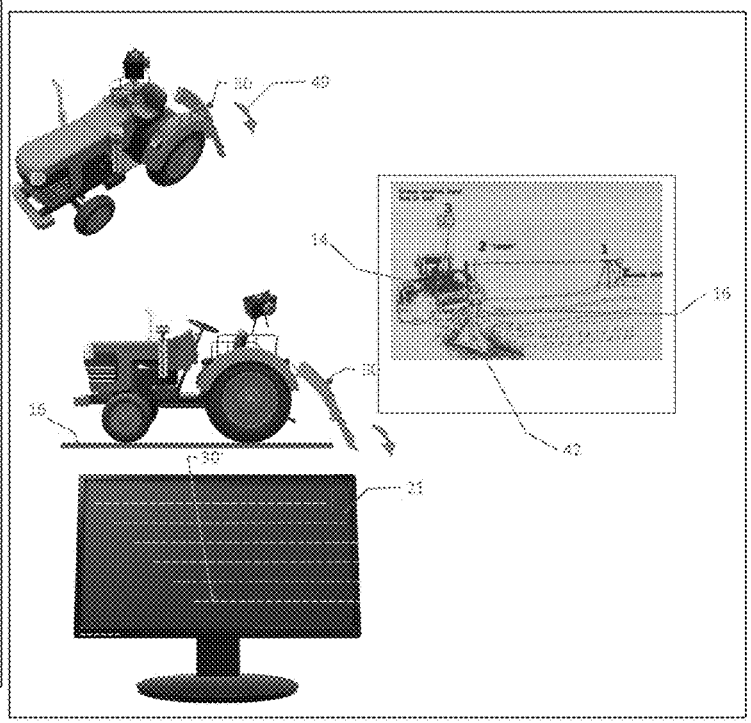

As indicated by up and down arrows 48 and 49, position of tile plow 43 would display as position 30' above horizontal axis $X_c$ in camera space 21 in FIG. 22A. Down position, when tile plow tip 43 is inserted below ground 16 level, would be shown at 30' in camera space 21 in FIG. 22B. The operator would be able to instantaneously recognize general tile plow position through calibration. The insert diagram in FIG. 22B shows how a tile plow moves through the ground.

As indicated previously, through appropriately programming of the system, automated recognition of plow 43 position relative to ground 16 could be used in inform other systems. For example, the position of plow 43 could be actively monitored and automatically adjusted for maintaining desired or predetermined position. As known by those skilled in the art, such on-the-go depth adjustment may need to be changed over distance for water flow purposes when laying drainage tile in a field. Having the visual image of optical fiducial 30 relative to ground while working distal tip 43 could be done automatically to a fine degree of resolution by calibrating fiducial image 30' in camera space 21 to actual position in physical space XYZ coordinates. An LED 30 mounted on plow 43 so that it is always above ground 16 whether plow 43 is raised or lowered allows the same because there is a measurable, and thus known, distance between the distal end of plow 43 and the LED 30 placement. As mentioned previously, this implementation according to the invention provides a major benefit of it does not require an expensive GPS system on the tile plow (e.g. could be on the order of $10K).

One example of how an implement such as a plow can be automatically adjusted using a different input as a depth control is at published Patent App. US 2009/0187315 to Gradient, Inc., incorporated by reference herein.

As can be appreciated, a display could show the imaged fiducials relative to some type of reference lines, grid, or boundaries to give the user a visual sense of position.

3. Example 3: Boom Sway Modeling (FIGS. 23A and B)

In reference to FIGS. 23A and B, another possible application that utilizes an image sensor and one or more imageable fiducials is as follows:

Boom sway—The effect of inertia on large booms could be modeled to reduce over spraying caused by backward boom movement.

| Parameter being tracked | Horizonal position of spraying boom or booms 56R and L relative to the direction of travel of tractor 14 |
|---|---|
| Optical imaging sensor | CCD camera 20 with wide angle lens 23 |
| Placement of optical imaging sensor | On tractor 14 |
| Camera space of optical imaging sensor | 2D image plane 21 ($X_c, Y_c$) |
| Fiducials | At least one light source, here three 30R, 30C, and 30L (e.g. IR LEDs) |
| Placement of fiducials | On implement (pull behind sprayer 52 or tractor mounted or motorized sprayer vehicle) |
| Physical space of fiducials | Area 11 at or behind tractor or motorized sprayer vehicle 14 where booms 56L and R would typically move |
| Identification of fiducials in camera space | Filtering techniques to identify and distinguish accurately the fiducials in camera space 21 from other objects |
| Correlation of camera space to physical space | Calibration to translate position of identified fiducials 30' in camera space 21 to position in physical space 11 |

FIGS. 23A and B simply show sprayer implement 52 attached to tractor 14 (or could be integrated with a mobile platform (e.g. a motorized all-in-one sprayer)) has left and right spray booms 56L and R that can be independently raised or lowered and turned on or off. This allows the operator or a precision ag controller to vary which arm is down and which spray nozzles operate at any given time. And independently motion controlled actuator or actuators (mechanical, electrical, hydraulic, etc.), can raise and lower either arm. Also, in many sprayer systems, application rates at each nozzle can be adjusted to quite minute resolution and quickly (milliseconds).

Boom sway can be addressed as follows. Boom sway is the forward and backward movement of the sprayer booms caused by turns, positive or negative accelerations, or the effect of gravity. High speed position information from the optical detection of fiducials on each spray arm can be calculated into boom sway data. With that information, the sprayer can simply turn off the relevant nozzles when the boom sways backward so far that it would cause double dosage of those plants. Alternatively, or in addition, the instruction to the sprayer could be to adjust the application rate. This could be at a nozzle-by-nozzle level based on calculation of the boom acceleration fore or aft and known position of each nozzle from proximal (fixed) end of spray arm to distal (free) end.

As will be appreciated, the fiducials and optical detection of them, could also be used to monitor the raised and lower states of the boom (e.g. boom height compared to the terrain), which are relevant to spray width due to distance from applicator to the target plants. But boom sway should be unaffected by the height of the boom.

In one aspect according to the invention, boom height control could work as follows. A fiducial (e.g. LED) is mounted at the very distal end of the boom and a camera just under the boom, looking down the length of the boom. When the boom goes too low it will be obscured by the plants and we will know to raise it. This does not allow us to control coverage due to height above ground and would not be relevant in pre-emergence use cases. But it shows another way to apply aspects of the invention.

Similar to other embodiments, visual optical fiducials LEDs 30L and 30R mounted at or near the end of arms 56L and R respectively, can be imaged and, by appropriate calibration into image space 21, fiducials 30L' and R' can be visually monitored to show, or inform the precision ag controller, raised or lowered position of either arm 56L and R.

Superior vehicle modeling—Users face serious consequences from inaccurate application of chemicals. Globally, crops are damaged or untreated and in Europe they face serious fines. Autoswath feeds off of vehicle modeling data for shut off and turn on. Accurate knowledge of the implement position will lead to a new level of Autoswath accuracy which translates to more accurate chemical application. This also includes the position of two implements attached in tandem.

In this context, vehicle modeling is the act of understanding the position of the implement given information about the tractor. Some embodiments of our current system have zero inputs from the implement and estimates the implement's position by modeling the kinematics of a pulled device. As can be imagined, this can have challenges due to the lack of inputs. For example, it would not estimate side slip. That is when the implement drifts to the side because it is on a hill and is sliding down as it is pulled. In some applications, even with such limitations the system might be sufficient.

See US 2013/0238200 to Woodcock (Ag Leader) and US 2011/0259618 to Zielke and Myers (Ag Leader) (both incorporated by reference herein), which describe precision ag automated swath control. See also commercially available DirectCommand@ and Auto Swath™ products from Ag Leader Technology, Ames, IA (USA).

As can be appreciated, a display could show the imaged fiducials relative to some type of reference lines, grid, or boundaries to give the user a visual sense of position. As exaggerated in FIGS. 23A/B, a reference grid can indicate an aligned position of spray arms, but if boom sway occurs, the imaged fiducials relative the grid show magnitude of boom sway by position of image fiducials relative to grid lines. In more sophisticated systems (as diagrammatically illustrated), the size of the imaged fiducial in camera space might be able to be used to deduce direction of boom sway (larger image means boom arm closer to camera than aligned position; smaller imaged fiducial indicates farther away).

4. Example 4: Implement Up/Down Sensing (FIGS. 24A and B)

In reference to FIGS. 24A and B, another possible application that utilizes an image sensor and one or more imageable fiducials is as follows:

Implement up/down sensor—A camera would be mounted in any of a variety of positions on the vehicle. Examples relative to a tractor could include on the main transport bar, the bar containing the transport wheels, or on the vehicle. In the case where the camera is on the transport bar, LEDs would be affixed to the application bar, the part of the bar that raises or lowers. The camera would calculate the position of the application bar relative to the transport bar and declare if the implement is raised or lowered. In the case where the camera is on the vehicle, LEDs would be placed on both the transport and application bars. The LEDs would be modulated and/or emit in different bands so they are distinguishable. The camera would calculate the angular difference between the application bar and the transport bar to declare if the implement is raised or lowered.

| Parameter being tracked | Position of moveable part 66 of implement 62 relative to another part of implement or pulling tractor |
|---|---|
| Optical imaging sensor | CCD camera 20 with wide angle lens 23 |
| Placement of optical imaging sensor | On first part 65 or tongue 63 of implement 62 or tractor 14 |
| Camera space of optical imaging sensor | 2D image plane 21 ($X_c$, $Y_c$) |
| Fiducials | At least one light source 30 (e.g. IR LED) |
| Placement of fiducials | On second, motion-controlled part 66 of implement 62 |
| Physical space of fiducials | Area 11 in which motion-controlled implement part 66 would typically move |
| Identification of fiducials in camera space | Filtering techniques to identify and distinguish accurately the fiducials 30' in camera space 21 from other objects |
| Correlation of camera space to physical space | Calibration to translate position of identified fiducials 30' in camera space 21 to position in physical space 11 |

FIGS. 24A and B simply show implement 62 attached to tractor 14. An independently motion-controlled part 66 of implement 62, via some sort of a hinged or articulatable motorized (mechanical, electrical, hydraulic, etc.) actuator 67, can raise and lower implement motorized part 66. Similar to other embodiments, visual optical fiducials LEDs 30A-D mounted on movable implement part 66 can be image to period by appropriate calibration into image space 21, fiducials 30A', 30B', 30C', and 30D' can be visually monitored to show raised or lowered position of implement part 66.

Automated actuated, motion-control is described at US 2009/0187315 which is incorporated by reference herein.

As can be appreciated, a display could show the imaged fiducials relative to some type of reference lines, grid, or boundaries to give the user a visual sense of position. Here a rectangular boundary (e.g. dashed rectangle in middle of display of camera space 21 could help show alignment of four fiducials at corners of the trailer box versus direction and amount of misalignment.

5. Example 5: Guided Implement Attachment (FIGS. 25A and B)

In reference to FIGS. 25A and B, another possible application that utilizes an image sensor and one or more imageable fiducials is as follows:

Guided implement attachment—LEDs could be placed on the implement seeking to be attached. The camera would observe the orientation of the implement as the vehicle approached the attachment point and display required vehicle adjustments for the vehicle to meet the attachment point. This allows a single operator to easily hookup any type of implement.

| Parameter being tracked | Position of implement 72 relative to towing vehicle 14 |
| --- | --- |
| Optical imaging sensor | CCD camera 20 with wide angle lens 23 |
| Placement of optical imaging sensor | On towing vehicle 14 |
| Camera space of optical imaging sensor | 2D image plane 21 ($X_c$, $Y_c$) |
| Fiducials | At least one light source 30 (e.g. IR LED) |
| Placement of fiducials | On implement 72 to be hitched to towing vehicle 14 |
| Physical space of fiducials | Area 11 around the implement 72 |
| Identification of fiducials in camera space | Filtering techniques to identify and distinguish accurately the fiducials 30' in camera space 21 from other objects |
| Correlation of camera space to physical space | Calibration to translate position of identified fiducials 30' in camera space 21 to position in physical space 11 |

FIGS. 25A and B show still further potential use of the paradigm of the invention. Trailer 72 having a tongue 73 for hitching to a vehicle 14 could include one or more visual fiducials 30 on trailer 72. Alternatively, there might be just one on tongue 73 (not shown).

In stationary position, but apart from vehicle 14, is a trailer or implement 72. Camera 20 can initially capture in camera space 21 image 30' of each visual fiducial 30 mounted on implement 72 relative to the coordinate system $X_c$, $Y_c$ in camera space 21 (see FIG. 25A). The truck operator (e.g. on a display of camera space 21 positioned in the truck cab) can then at least roughly see relative orientation of trailer tongue 73 to vehicle 14 to assist in alignment, see FIG. 25B. As will be appreciated, techniques can not only show alignment in physical space of trailer tongue 73 with hitch point 15 of vehicle 14, but also distance between vehicle 14 and tongue 73. One way is quantifying size of imaged fiducial(s) 30' (e.g. smaller means farther away; larger means closer). Another is two or more fiducial LEDs 30A, B, . . . , n, in a pre-configured array (in this example, three 30A, B, and C). Calibration of space between imaged LEDs 30' and actual distance between tractor 14 and implement 72 can provide this type of information. Alternatively, for simple X, Y alignment, a single LED 30 could be used.

The operator would simply manipulate tractor 14 from where 30' (in this example imaged LEDs 30A', 30B', and 30C') are away from a reference or calibration position (e.g. center of cross hairs or $X_c$=0, $Y_c$=0 in FIG. 25B) to 30A', 30B', 30C' being at $X_c$=0, $Y_c$=0 (FIG. 25A). As can be appreciated, a display could show the imaged fiducials relative to some type of reference lines, grid, or boundaries to give the user a visual sense of position. But it does not have to. The display screen boundaries itself could give context to the viewer as to whether, in this example, the truck is aligned and at the hitching position for the trailer or not, including direction and magnitude of misalignment. But the display could also include a reference grid or boundary as in other examples to help a truck driver maneuver the truck into alignment for hitching to a trailer with the fiducials.

6. Example 6: Assisted Positioning of Multiple Vehicles (FIGS. 26A and B)

In reference to FIGS. 26A and B, another possible application that utilizes an image sensor and one or more imageable fiducials is as follows:

Assisted positioning of multiple vehicles—Either one vehicle would have the camera and another the LEDs, or both would have a camera and LED pair. The camera would provide feedback relating the position of the other vehicle so the operator can better control meeting or matching the other vehicle. This is useful for grain filling, seed filling, or grain dumping while moving or stationary to another vehicle

| Parameter being tracked | Position of set 82, 84 of vehicles to one another |
| --- | --- |
| Optical imaging sensor | CCD camera 20 with wide angle lens 23 |
| Placement of optical imaging sensor | On one or more of the vehicles 82, 84 |
| Camera space of optical imaging sensor | 2D image plane 21 ($X_c$, $Y_c$) |
| Fiducials | At least one light source 30 (e.g. IR LED) |
| Placement of fiducials | On at least one other vehicle 82, 84 |
| Physical space of fiducials | Area 11 around the vehicle 82 with the fiducials 30' |
| Identification of fiducials in camera space | Filtering techniques to identify and distinguish accurately the fiducials 30' in camera space 21 from other objects |
| Correlation of camera space to physical space | Calibration to translate position of identified fiducials 30' in camera space 21 to position in physical space 11 |

This still further alternative embodiment illustrates a separate vehicle, here combine 84, can include a camera 20 in known position with field of view 22. A tractor 14 pulling a trailer 82 (such as a grain cart) can include visual fiducials 30A and 30B. Optionally, as in FIGS. 26A and B, trailer 82 (such as a grain cart) can include visual fiducials (e.g. here four 30C, 30D, 30E and 30F). Once within field of view 22 of camera 20, by looking at a display of camera space 21 in the combine 84 cab, the operator of combine 84 can at least get a rough estimate of position of truck 14 and/or grain cart 82 relative to combine 84 for unloading purposes. By using display of imaged fiducials 30A' and B' (and here also 30C'-F') in camera space, alignment as in FIG. 26A, can be assisted will maneuvering combine 84 relative to grain trailer 82.

Figure 26B:
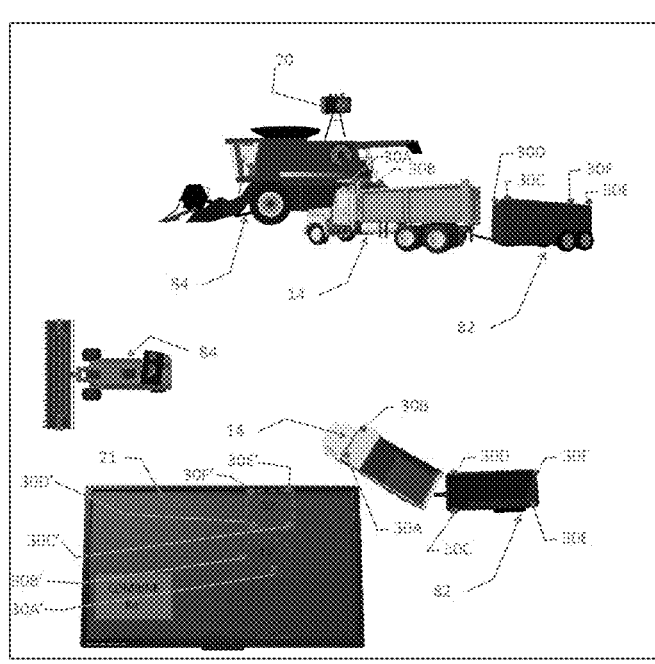

The scale and difficulty of direct view by a combine operator of position of unloading auger to grain cart or truck would make this embodiment valuable to the combine operator. The operator would guide the combine from a position of mis-alignment with trailer 82 (e.g. FIG. 26B) until at least some of the camera space fiducials 30A'F' are on axis $X_c$ and equidistant from $Y_c$ (see FIG. 26A). As can be appreciated, the reverse is possible. Fiducials 30 could be on a combine 84 and the tractor/grain cart 14/82 could have camera 20. The tractor/grain cart operator could match camera space fiducials 30A' and B' on a display in the tractor/grain cart cab to a reference grid calibrated to show alignment of the grain cart to the unloading auger of the combine.

As can be appreciated, a display could show the imaged fiducials relative to some type of reference lines, grid, or boundaries to give the user a visual sense of position. Here, a variation is illustrated. A camera mounted on the combine can track a grain truck and towed grain trailer by setting the camera's position and aiming direction or FOV appropriately to one side of the combine. By calibration or other training, fiducials entering the camera FOV can be interpreted as to relative position of truck and trailer to the combine. This could be more in a vertical plane such as prior displays. But, alternatively, the system could be programmed to display in top plan view relative positions by straight-forward conversions of estimations of actual physical locations via GPS on the combine and acquired fiducial images in camera space. Translating relative positions to top plan view may be easier and quicker to recognize and evaluate by the combine operator.

7. Example 7: Assisted Vehicle Position to a Static Target (FIGS. 27A and B)

In reference to FIGS. 27A and B, another possible application that utilizes an image sensor and one or more imageable fiducials is as follows:

Assisted vehicle position to a static target—The vehicle would mount the camera while a static target would mount the LEDs. The camera would provide feedback of the position of the vehicle relative to the static point. This improves loading and unloading and many other tasks.

| Parameter being tracked | Position of vehicle 94 relative to fixed target |
| --- | --- |
| Optical imaging sensor | CCD camera 20 with wide angle lens 23 |
| Placement of optical imaging sensor | On vehicle 94 |
| Camera space of optical imaging sensor | 2D image plane 21 ($X_c$, $Y_c$) |
| Fiducials | At least one light source 30 (e.g. JR LED) |
| Placement of fiducials | On fixed object 92 |
| Physical space of fiducials | Area 11 around fixed object 92 |
| Identification of fiducials in camera space | Filtering techniques to identify and distinguish accurately the fiducials 30' in camera space 21 from other objects 11 |
| Correlation of camera space to physical space | Calibration to translate position of identified fiducials 30' in camera space 21 to position in physical space 11 |

Another embodiment includes a vehicle 94 with camera 20 needing alignment with an unloading receiver 92 for, e.g., a grain elevator to fill a grain bin. Such bins (or similar storage structures) typically have so type of receiver into which the material to stored is unloaded from a vehicle (e.g. truck or trailer). The receiver typically is positioned, configured, and sized to allow for efficient transfer of material from the truck/trailer (unloading) and then further transfer into the bin for storage (typically including some type of external or internal conveyor).

Here elevator unloading receiver 92 has on it a plurality of visual fiducials 30A and B. Details about grain elevators and how grain is off-loaded from transport vehicles into the elevator are well-known to those of skill in the art. As indicated in FIGS. 27A and B, an operator of grain truck 94 can look at a display (e.g. in truck 94 cab) with field of view 22 displayed in camera space 21, and not only visualize alignment of vehicle 94 with receiver 92 by monitoring position of fiducial images 30A' and 30B' relative to camera space $X_c$, $Y_c$, but the relative position to reference boundary 97 (dashed rectangle in middle of the display) on the display to give an indication of how close vehicle 94 is to receiver 92. By simple geometrics, the closer the fiducial images 30A' and B' on the display of camera space 21 of FOV 22, the farther away truck 94 is from receiver 92. Conversely, the farther away images 30A' and 30B', the closer vehicle 94 is to receiver 92 in physical space. Boundary 97 can be calibrated when designed to indicate proportionally camera space closeness with physical space closeness of vehicle 94 to receiver 92. In the example of FIG. 27A, when truck is in correct position to dump its contents into receiver 92, imaged fiducials 30A' and 30B' are at opposite upper corners of boundary 97 on the operator's display, as just one example. In the example of FIG. 27B, when truck not in correct position to dump its contents into receiver 92 (e.g., here spaced away and to the side of fiducial 30B of receiver 92), imaged fiducials 30A' and 30B' are outside of boundary 97 on the operator's display, as just one example.

As can be appreciated, a display could show the imaged fiducials relative to some type of reference lines, grid, or boundaries to give the user a visual sense of position. Here the fiducials are placed on a fixed object (the loading receiver for an auger to a grain bin) and the camera is mounted on a moveable vehicle (a grain truck) to help the operator manipulate the truck to the receiver.

8. Example 8: Passive and Active Implement Steering (FIGS. 28A and B)

In reference to FIGS. 28A and B, another possible application that utilizes an image sensor and one or more imageable fiducials is as follows:

Cheaper passive and active implement steering—Current active implement steering systems require a GPS and, for some, an inertial detection sensor. These two items cost thousands of dollars. High quality, live feed cameras are measured in hundreds of dollars and LEDs in cents. This solution would provide active implement steering at substantially less cost. Similarly, passive implement steering can be provided at low cost.

| Parameter being tracked | Implement 102 steering direction |
| --- | --- |
| Optical imaging sensor | CCD camera 20 with wide angle lens 23 |
| Placement of optical imaging sensor | On tractor 14 |
| Camera space of optical imaging sensor | 2D image plane 21 ($X_c$, $Y_c$) |
| Fiducials | At least one light source 30 (e.g. IR LED) |
| Placement of fiducials | On steerable implement 102 pulled on tongue 13 from hitch point 15 to tractor 14 |
| Physical space of fiducials | Area 11 behind tractor 14 in which implement 102 would typically move |
| Identification of fiducials in camera space | Filtering techniques to identify and distinguish accurately the fiducials 30' in camera space 21 from other objects |
| Correlation of camera space to physical space | Calibration to translate position of identified fiducials 30' in camera space 21 to position in physical space 11 |

FIGS. 8A and B show a steerable implement 102 with front axle 107 with steerable wheels 108. In similar fashion, mounted fiducials 30A and B at or near steerable wheels 108 on axle 107 allows an operator to see relative position of the implement to tractor. The operator could manipulate the steerable wheels 108 to, on-the-go, keep alignment of implement 102 with tractor 14. Alternatively, sensed misalignment (direction and magnitude) could be quantified in a signal to the implement steering control to compensate automatically. See U.S. Pat. No. 6,865,465B2 to inventor McClure (incorporated by reference herein) for details about active implement steering.

9. Example 9: Articulated Vehicle Steering (FIGS. 29A and B)

In reference to FIGS. 29A and B, another possible application that utilizes an image sensor and one or more imageable fiducials is as follows:

Articulated vehicle steer angle sensor—Either one or two cameras would be mounted on the cab of the articulated vehicle. The camera(s) would observe LEDs on the front and rear fenders of the vehicle. The camera(s) would analyze the angular offset of the front and rear fender to calculate the steer angle.

| Parameter being tracked | Steering angle between front 114 and back 112 of articulated vehicle |
|---|---|
| Optical imaging sensor | CCD camera 20 with wide angle lens 23 |
| Placement of optical imaging sensor | On vehicle cab 116 |
| Camera space of optical imaging sensor | 2D image plane 20 ($X_c$, $Y_c$) |
| Fiducials | At least one light source 30 (e.g. IR LED) |
| Placement of fiducials | On both front 114 and back 112 of articulated vehicle (opposite sides of articulation point 115) |
| Physical space of fiducials | Area 11 around each set of fiducials 30 |
| Identification of fiducials in camera space | Filtering techniques to identify and distinguish accurately the fiducials 30' in camera space 21 from other objects |
| Correlation of camera space to physical space | Calibration to translate position of identified fiducials 30' in camera space 21 to position in physical space 11 |

In the case of an articulated vehicle having a front section 114 and rear section 112, a camera on front section 114 can have visual fiducial(s) 30 on the rear section 112 in field of view 22 and inform an operator of relative position.

In analogous ways, a visualization of alignment/misalignment can be on a display for the operator, and/or a quantification of the same used as an input to auto steer. As will be appreciated, the camera is placed on one portion of the articulated vehicle and the fiducial(s) on the other. Optionally, another camera/fiducial(s) combination could be placed in reverse fashion so cameras and fiducials are on both parts of the vehicle. The placements and number of fiducials as well as camera must be selected to keep fiducials in the camera FOV during all relevant vehicle motions.

Figures 30A, 30B:
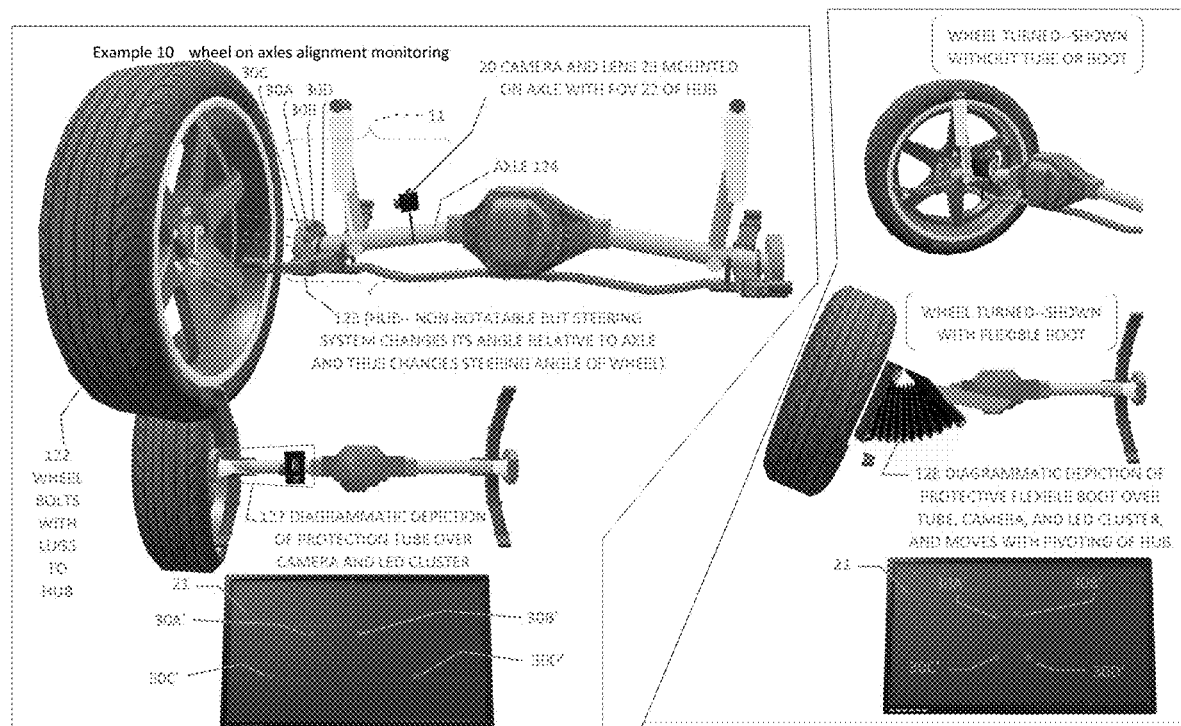

10. Example 10: Wheel Angle Sensing (FIGS. 30A and B)

In reference to FIGS. 30A and B, another possible application that utilizes an image sensor and one or more imageable fiducials is as follows:

Wheel angle sensor—The camera would be mounted in an enclosed tube on the axle. Another enclosed box would be attached to the point on the wheel that turns. These two enclosures would be connected by a flexible rubber gasket or brushes which allow the box to move while the tube remains stationary without allowing debris to enter the tube nor box. The LEDs would be affixed, inside the box, to some point which rotates equivalently as the wheel rotates. The camera, in the tube, would observe the rotation of the LEDs to calculate current wheel angle.

| Parameter being tracked | Wheel 122 angle of a vehicle |
|---|---|
| Optical imaging sensor | CCD camera 20 with wide angle lens 23 |
| Placement of optical imaging sensor | On vehicle axle |
| Camera space of optical imaging sensor | 2D image plane 21 ($X_c$, $Y_c$) |
| Fiducials | At least one light source 30 (e.g. IR LED) |
| Placement of fiducials | On steerable non-rotating hub 123 of steerable wheel 122 |
| Physical space of fiducials | Area 11 around fiducials 30 |
| Identification of fiducials in camera space | Filtering techniques to identify and distinguish accurately the fiducials 30' in camera space 21 from other objects |

-continued

| Parameter being tracked | Wheel 122 angle of a vehicle |
|---|---|
| Correlation of camera space to physical space | Calibration to translate position of identified fiducials 30' in camera space 21 to position in physical space 11 |

In an analogous fashion, the visual fiducial(s) 30 mounted on steerable hub 123 of wheel 122 could be captured in camera 20 field of view 22 mounted on, for example, axle 124. Pivoting of hub 123 (by the vehicle steering system) changes the angle of wheel 122 relative to the vehicle, as is well-known. Thus, when mounted by lugs to the hub 123, wheel 122 pivots in kind. Thus, a cloud of fiducials 30A-D mounted on hub 123 can be imaged by fixed camera 20, and images 30A'-D' of the fiducials 30A-D displayed on a monitor as shown in FIGS. 30A and B to inform an observer of the calibrated wheel position.

As noted in these Figures, practical considerations or options can include mounting camera 20 in an enclosure that is robust such as enclosure 127 (e.g. a tube) mounted on axle 124, and/or an accordion flexible boot 128 (shown diagrammatically) can connect at opposite ends to and between axle 124 and hub 123 to allow for pivoting of wheel 122 relative to axle 124, but also enclose the field of view 22 between camera 20 and LEDs 30 protected from environment and to make sure the field of view that is captured allows easy differentiation of visual fiducials 30. By wired or wireless connection, the acquired image of camera 20 can be sent to a processor which controls either displaying of field of view 22 or processing of that FOV 22 for automated understanding of wheel position.

An example of use of wheel angle in precision ag is at U.S. Pat. No. 10,024,977 to Ag Leader Technologies, incorporated by reference herein. As will be understood, there are a lot of ways to implement this application. Below is additional discussion by way of several examples.

Imagine we had a point cloud of LEDs 30 shaped like a trapezoid (FIGS. 30A and B) that was attached to a non-rotating (but steerable, pivotable) hub 123 that turns, in kind, with turning of the wheel 122. When the wheels 122 are straight, the trapezoid is flat, and appears 2D to the camera. When the wheels 122 turn, the trapezoid point cloud turns an equivalent amount and direction. The distortion of the trapezoid imaged by camera 20 can be analyzed to estimate the amount the wheel turned. The imaged trapezoid would be in one 2D shape when the wheel is straight because the camera is fixed in FOV 22, but would distort when the wheel is turned. Compare FIGS. 30A and B. By geometry, the direction and amount of turn could be extrapolated in a similar fashion as explained above with other applications.

Figure 30C:
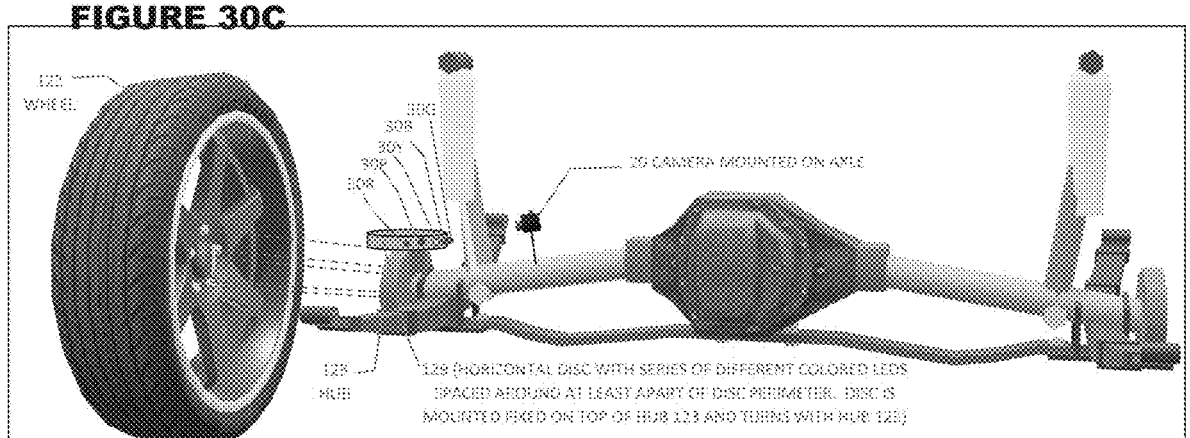
Figure 30D:
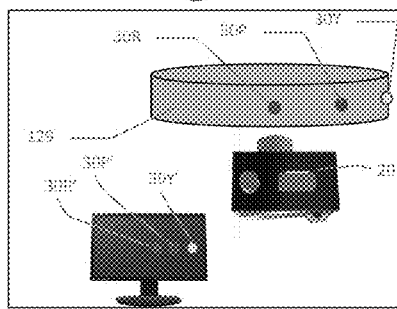
Figure 30E:
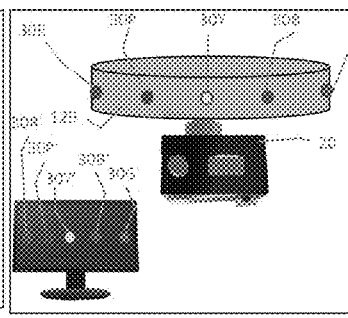

Another idea is to have a disc 129 that is mounted horizontally on hub 123 (see, e.g., diagrammatic depiction in FIG. 30C). Disc 129 would rotate equivalently with the steering of hub 123/wheel 122. The disc 129 is dotted around its circumference with different color LEDs 30. Let us say they go from red 30R, to purple 30P, to yellow 30Y, to blue 30B, and finally ends at green 30G as that sequence wraps around with, for example, ten or so total LEDs with slight variations in color through that spectral progression (only five are shown). Further, let us assume that when the wheel/hub 122/123 is straight the perfectly yellow LED 30Y is showing directly at the camera 20 (FIG. 30E). If the wheel assembly was moving out of the page of FIGS. 30C-F, as the wheel/hub 122/123 turns left, we will see procedurally increasingly more reddish LEDs 30 face the camera (FIG.

Figure 30F:
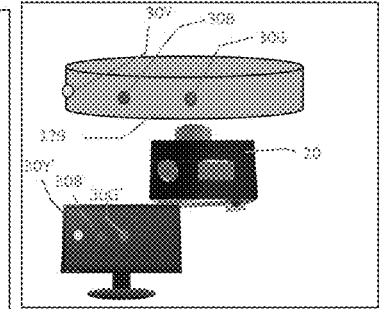

30D). As the wheel turns right it will progress to procedurally reveal increasingly more green LEDs (FIG. 30F). The exact color of the LED most directly facing the camera gives us a wheel angle estimate.

11. Example 11: GPS-Assist/Error Compensation (FIGS. 31A and B)

In reference to FIGS. 31A and B, another possible application that utilizes an image sensor and one or more imageable fiducials is as follows:

Automated GPS offset—LEDs would be affixed to a known GPS position. The camera would be mounted on the vehicle. The vehicle would approach the LEDs and match the position of the LEDs, in the camera's view, to a previous saved calibration image. When the LEDs were in the same position as before, the true current position of the vehicle is known. We can use this information to correct GPS data which may have drifted.

| Parameter being tracked | Vehicle 14 position relative to known GPS position 132 |
| --- | --- |
| Optical imaging sensor | CCD camera 20 with wide angle lens 23 |
| Placement of optical imaging sensor | On vehicle 14 |
| Camera space of optical imaging sensor | 2D image plane 21 ($X_c$, $Y_c$) |
| Fiducials | At least one light source 30 (e.g. IR LED) |
| Placement of fiducials | On object 132 placed at known GPS position |
| Physical space of fiducials | Area 11 around fiducials 30 |
| Identification of fiducials in camera space | Filtering techniques to identify and distinguish accurately the fiducials 30' in camera space 21 from other objects |
| Correlation of camera space to physical space | Calibration to translate position of identified fiducials 30' in camera space 21 to position in physical space 11 |

In an analogous fashion, some fixed physical landmark or object 132 in physical space 11 could include on it a visual fiducial 30. A vehicle 14 with camera 20 could be informed of relative position to landmark 132 by similar techniques as described herein.

As will be appreciated, feedback could be just a visual representation to the operator of vehicle 14. Alternatively, or in addition, quantification of alignment and distance, could be an input to auto steer of vehicle 14, in similar fashion to auto parking algorithms in many automobiles.

12. Example 12: Vehicle Position and Modeling [Two Implement Towing] (FIGS. 32A and B)

In reference to FIGS. 32A and B, another possible application that utilizes an image sensor and one or more imageable fiducials is as follows:

Superior vehicle modeling—Users face serious consequences from inaccurate application of chemicals. Globally, crops are damaged or untreated and in Europe they face serious fines. Auto swath feeds off of vehicle modeling data for shut off and turn on. Accurate knowledge of the implement position will lead to a new level of Auto swath accuracy which translates to more accurate chemical application. This also includes the position of two implements attached in tandem.

| Parameter being tracked | Position of one or more implements 12A, 12B, . . . , relative to single towing vehicle 14 |
| --- | --- |
| Optical imaging sensor | CCD camera 20 with wide angle lens 23 |
| Placement of optical imaging sensor | On each implement 12A, 12B, . . . |
| Camera space of optical imaging sensor | 2D image plane 21 ($X_c$, $Y_c$) |
| Fiducials | At least one light source 30 (e.g. IR LED) |
| Placement of fiducials | On one or each of towed implements 12A, 12B, . . . |
| Physical space of fiducials | Area(s) 11 around fiducials 30 on each towed implement 12 |
| Identification of fiducials in camera space | Filtering techniques to identify and distinguish accurately the fiducials 30' in camera space 21 from other objects |
| Correlation of camera space to physical space | Calibration to translate position of identified fiducials 30' in camera space 21 to position in physical space 11 |

By analogous technique, a tractor 14 operator could monitor relative position of two implements 12A and 12B, each having visual fiducials (e.g., implement 12A has fiducials 30A and 30B, and 12B has fiducials 30C and D). As illustrated, in this example the two implements (shown diagrammatically) are hitched serially to one another. This creates a double pendulum problem, which is a classic case of a chaotic problem (see chaos theory). Applying optical monitoring can assist the operator to maintain desired paths for both.

The double pendulum problem is well-known to those skilled in this technical area. Using aspects of the invention allows for modeling of such things as how sprayers react during movement over certain terrain or the double-pendulum problem for tandem trailers. By logging how one or more object(s) 2 respond(s) to variable conditions, the modeling can build a library or training set which can be referred to during actual use. The referencing can be used to alert an operator or to even inform a precision ag system relative to automatic vehicle steering, automatic implement steering (if available), follow on implement guidance, or first pass or subsequent pass vehicle guidance or implement operation.

Figure 32B:
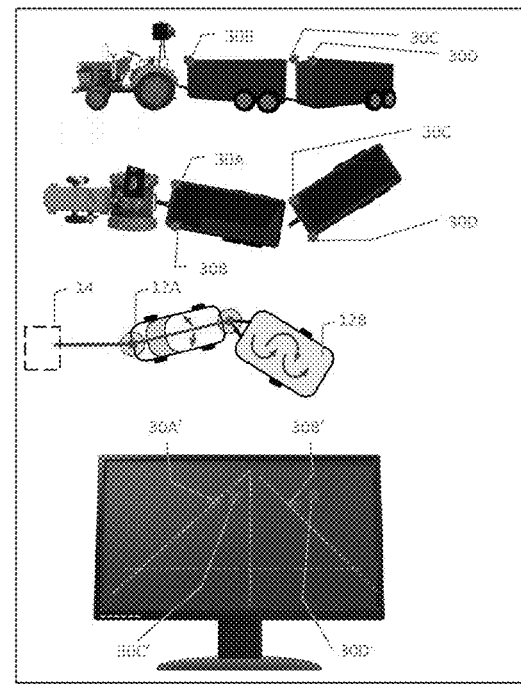

As indicated in FIGS. 32A and B, analysis of the imaged fiducials 30' from the fixed FOV 22 of camera 20 allows sensing of alignment (FIG. 32A) versus mis-alignment (FIG. 32B) relative to two tow-behind objects (e.g. implements). The diagrammatic insert in FIG. 32B illustrates the hitch points and turning motions of tow implement towing.

13. Example 13: Flow Estimation (FIGS. 33A and B)

In reference to FIGS. 33A and B, another possible application that utilizes an image sensor and one or more imageable fiducials is as follows:

Flow estimation—Current application systems use red balls of different density held aloft by the force of flow to estimate current flow. LEDs would be affixed to these balls and the camera estimate how high each ball was held aloft. That data would be used to calculate flow as well as warn the user if flow stops. Is it important to note that while this is not the most practical measurement of flow, it is easily retrofitted to current systems.

| Parameter being tracked | Objects 142A, B, . . . . , in flowing stream 145 of material |
|---|---|
| Optical imaging sensor | CCD camera 20 with wide angle lens 23 |
| Placement of optical imaging sensor | At fixed position relative to flow stream 145 |
| Camera space of optical imaging sensor | 2D image plane 21 ($X_c$, $Y_c$) |
| Fiducials | At least one light source 30 (e.g. IR LED) |
| Placement of fiducials | On at least one and likely plural objects 142A, B, . . . , that are placed in the flow stream 145 |
| Physical space of fiducials | Area 11 around each object 142A, B, . . . , in flow stream 145 in flow channel 144 |
| Identification of fiducials in camera space | Filtering techniques to identify and distinguish accurately the fiducials 30 in camera space 21 from other objects |
| Correlation of camera space to physical space | Calibration to translate position of identified fiducials 30' in camera space 21 to position in physical space 11 |

In this similar manner, differentiation of moving objects 142A, B, C, . . . , n in a fluid 145 flowing in a fixed channel 144 having a camera 20 in known location relative to channel 144 can monitor relative position of the objects 142A-n. As noted, by appropriate calibration, not only position in a horizontal plane can be monitored, but also in the vertical direction (e.g. depth in flowing fluid) by appropriate correlation of 2D camera space to 3D physical space by analysis of imaged fiducials 30A'-n' relative to known reference(s) (e.g. known position of camera 20 relative to channel 144).

An example of need for flow estimation is at U.S. Pat. No. 8,839,681 to Stewart et al., incorporated by reference.

Note how the highly diagrammatic example of FIGS. 33A and B. LEDs 30 on floatable balls 142 are shown diagrammatically by the red color (the top halves of balls 142), show how imaged fiducials 30' can show height of the fluid flowing in the tube. FIG. 33A has fluid height lower than FIG. 33B. But it can also be used to estimate speed of flow, such as by monitoring how quickly the imaged fiducials 30' pass through camera space 21. A diagrammatic depiction 144' of actual channel 144 (in this example a tube) can be generated and shown on display 21 by know digital graphics techniques.

14. Example 14: Liquid Level Measuring (FIGS. 34A and B)

In reference to FIGS. 34A and B, another possible application that utilizes an image sensor and one or more imageable fiducials is as follows. It is important to note that while this may not be the most practical measurement of flow, it is easily retrofitted to current systems.

Measuring liquid levels—A float affixed with LEDs would be placed into the tank and a set of LEDs would be placed at the top or bottom of the tank or both. The camera would be mounted inside of the tank, in a survivable enclosure, and measure how high the float was relative to either the top or bottom of the tank. With known dimensions, this information can be used to calculate total liquid product in the tank.

| Parameter being tracked | Liquid level 155 |
|---|---|
| Optical imaging sensor | CCD camera 20 with wide angle lens 23 |
| Placement of optical imaging sensor | In fixed position relative liquid container 154 |
| Camera space of optical imaging sensor | 2D image plane 21 ($X_c$, $Y_c$) |
| Fiducials | At least one light source 30 (e.g. IR LED) |
| Placement of fiducials | At known locations 152T and B relative to liquid container 154; optionally at top or bottom of liquid container 154 |
| Physical space of fiducials | Area 111 around fiducials 30, whether inserted object(s) 153 or on container locations 152T and B |
| Identification of fiducials in camera space | Filtering techniques to identify and distinguish accurately the fiducials 30' in camera space 21 from other objects |
| Correlation of camera space to physical space | Calibration to translate position of identified fiducials 30' in camera space 21 to position in physical space 11 |

A water fluid tank 154 having a camera 20 in fixed possession with a field of view of visual fiducials 152T at top of tank 154, and 152B at or near bottom of tank 154, can provide an automated remote view, via camera field of view 22, of how much fluid 155 is in the tank. A float 153 that floats at the top of any fluid 155 in tank 154 has a visual fiducial 30A. As indicated, the display would show 30A' relative to 152T' and 152B' for that purpose. FIG. 34A shows no liquid 155 in container 154, as float 153 and its fiducial 30A are at the bottom in physical space and camera space. FIG. 34B, in contrast, shows liquid 155 to almost full, as float/fiducial 153/30A are near the top of container 154 in physical space and, thus, in camera space.

15. Example 15: Solid Product Level Measuring (FIGS. 35A and B)

In reference to FIGS. 35A and B, another possible application that utilizes an image sensor and one or more imageable fiducials is as follows:

Measuring solid product levels—A vertical strip of LEDs would be placed on the container. The camera would be mounted at the top of the container and observe the strip of LEDs. As the solid product fills the tank it will lock more of the LEDs. The camera would report back how many LEDs were still visible. Combined with known dimensions, we would calculate the total volume of solid product in the container.

| Parameter being tracked | Solid product 165 level |
|---|---|
| Optical imaging sensor | CCD camera 20 with wide angle lens 23 |
| Placement of optical imaging sensor | In fixed position 162 to interior of product container 164 |
| Camera space of optical imaging sensor | 2D image plane 21 ($X_c$, $Y_c$) |
| Fiducials | Vertical linear array of plural LEDs 30(1)-(n) (e.g. IR LED) |
| Placement of fiducials | inserted and mounted vertically in the solid product container 164; optionally from at or near top to at or near bottom of solid product container 164 |
| Physical space of fiducials | Area 11 around fiducials 30 |
| Identification of fiducials in camera space | Filtering techniques to identify and distinguish accurately the fiducials 30' in camera space 21 from other objects |
| Correlation of camera space to physical space | Calibration to translate position of identified fiducials 30' in camera space 21 to position in physical space 11 |

FIGS. 35A and B show a setup for tracking how much granular or other flowable at least partially solid phase material exists in a container 164. A device or frame 163 carrying a linear array of fiducials 30(1), (2), . . . (n) (bottom to top) is positioned along the side wall of container 164 in the FOV of camera 20. As contents 165 of container 164 rises and falls (e.g. with the general level of particulate matter 165 in container 164; contents 165 shown diagrammatically by soccer balls but could be any solid or semi-solid including but not limited to grain, feed, seed, fertilizer, other chemicals, sand, rocks, soil, manufactured parts, and so on), only exposed LEDs 30 would be captured by camera 20. The number of exposed LEDs 30 imaged between LED 30(1)' and 30(D)' in camera space 21 would allow remote monitoring of level of material 165 in container 164 even if visual access to the bottom of container 164 was not possible. Here device 163 carrying fiducials 30 array is of a form factor and with characteristics pre-designed to be calibrated to various heights along container 164. In one non-limiting example of particulate matter comprising corn seed, device 163 could be several inches wide by many feet in height piece with LEDs 30 mounted at uniformly spacing along the inward facing side of its length. Here the particulates or solids 165 are diagrammatically illustrated as soccer balls.

In one example, LEDS 30 are along the side the container 164. For example, 12 LEDs could be spaced from top to bottom. If the camera 20 sees all twelve, then the container is approximately empty. If it sees seven, then it approximately half full.

D. Options and Alternatives

As indicated earlier, the foregoing exemplary embodiments are not limiting to the variations and embodiments possible with the invention. Persons having skill in this technical area will appreciated that such variations are possible.

A few additional examples of possible options and alternatives, and forward-looking features are set forth below. Again, these are non-limiting.

The foregoing specific examples give the reader an idea of non-limiting examples of possible implementations of aspects of the invention. In each of those examples, the combination and interoperation of features presents the benefits of economical, fast, and flexible automatic estimation of relative position without GPS or expensive geospatial sensors. This includes in a variety of hostile operating environments, especially when considering optical sensing. Furthermore, by having some pre-requirements such as a known mounting location of camera or optical imaging sensor relative an object, a landmark, or a GPS location, correlation of camera image plane/camera space to captured images of fiducials in physical space can be calculated.

U.S. Pat. No. 5,001,650 to Francis, et al. and U.S. Pat. No. 5,582,013 to Neufeld (both incorporated by reference herein) describe sensors that pick up IR signatures of humans in the context of rescue missions which image land or water from aircraft. These give additional details about how thermal imaging in camera space can inform an operator of relative position using an IR camera in physical space using an IR camera with known/fixed position on vehicle (e.g. aircraft). IR LEDs would be the analog providing thermal signature in camera space.

What is claimed is:

1. A method of tracking position of a second object relative to a first object, wherein the first object is a motor vehicle and the second object is towed by the vehicle, moving relative the vehicle, or fixed in position relative the vehicle, the method comprising:
   a. designating at least one fiducial on the second object, the fiducial comprising at least one of:
      i. a light source on the second object;
      ii. an inherent feature of the second object;
   b. mounting an optical imaging sensor on the first object, the optical imaging sensor:
      i. having a field-of-view to capture the fiducial(s) in relevant relationships of the second object to the first object; and
      ii. capable of identifying imaged fiducial(s) acquired in the field-of-view;
   c. estimating position of the second object in physical space without acquired geospatial data of position of the second object by combining analysis of the acquired fiducial(s) in camera space with offset of the second object from a reference or calibration differentiated by analysis of the imaged fiducials in camera space relative to:
      i. a single plane including one of horizontal and vertical;
      ii. two planes including horizontal and vertical; or
      iii. three planes including horizontal, vertical, and depth;
   d. using estimated position of the second object immediately during movement of the first object or logged for retrieval and use later.

2. The method of claim 1 wherein the optical imaging sensor comprises a digital camera adapted to produce a camera-space coordinate system correlated to a 2-D plane or 3-D coordinates in physical space.

3. The method of claim 1 wherein the light source is an LED.

4. The method of claim 3 wherein the light source is an IR LED.

5. The method of claim 1 wherein the light source is a plurality of light sources comprising:
   a. a pair of light sources spaced apart in a plane;
   b. three or more light sources in a pre-designed geometric relationship to one another in a single plane or multiple planes; or
   c. three or more light sources with at least one light source in a different plane than the others.

6. The method of claim 1 wherein the fiducial is an inherent point, feature, or pattern on the second object which can be detected, identified, and distinguished in camera space.

7. The method of claim 1 wherein the fiducial(s) are detected, identified, and distinguished by machine-learning, training, image recognition, or references based on shape or a grid.

8. The method of claim 3 wherein each LED light source comprises one or more of a pre-selected intensity, duty cycle, and emission band when operating.

9. The method of claim 1 wherein the first object is a tractor and the second object is a towed implement, and the use of the estimation second object position is used during movement of the tractor and towed implement or logged for retrieval and use during another pass with a different implement at a later time.

10. A method of monitoring whether a tow-behind implement attached to a tractor at a hitch point is aligned with the tractor comprising:
   a. mounting a set of spaced-apart light sources on the implement behind the hitch point without any electrical communication between the light sources and the tractor;

b. mounting a digital camera on the tractor, the camera having a field-of-view (FOV) that includes at least a substantial range of positions of the implement during use;

c. calibrating the FOV of view of the camera relative a calibration position correlated to physical space; and d. during use, tracking the position of images of the light sources captured in the camera FOV relative to the calibration position;

e. correlating offset of the light sources from calibration position to direction and magnitude of offset of the implement from the tractor without acquired geospatial data of position of the light sources on the second object;

f. using the correlation immediately during movement of the tractor or logging the correlation for retrieval and use later.

11. The method of claim 10 wherein the light sources each comprise an LED with a power source on a mounting interface to mount to the implement.

12. The method of claim 10 wherein the calibrating comprises training, image recognition, or references based on shape or a grid.

13. The method of claim 10 further comprising using the tracking of the position of the images of the light sources to steer the tractor.

14. A system of monitoring or tracking position of a second object relative to a moving first object comprising:

a. at least one fiducial on the second object without any electrical communication between the fiducial(s) and the first object, each of the fiducial(s) comprising at least one of:
  i. a light source on the second object; and
  ii. an inherent feature of the second object;

b. an optical imaging sensor mounted on the first object, the optical imaging sensor:
  i. having a field of view to capture the fiducial(s) in relevant relationships of the second object to the first object;
  ii. capable of identifying imaged fiducial(s) acquired in the field-of-view;

c. a processor or display adapted for estimating position of the second object in physical space by analysis of the acquired fiducial(s) in camera space relative to a calibration position correlated to physical space without acquired geospatial data of position of the light sources on the second object; and d. producing an output of estimated position of the second object relative the first object based on the correlation.

15. The system of claim 14 wherein the optical imaging sensor comprises a digital camera adapted to produce a camera-space coordinate system correlated to a 2-D plane or 3-D coordinates in physical space.

16. The system of claim 14 wherein the fiducials comprise IR LEDs, each at one or more of a pre-selected intensity, duty cycle, and emission band when operating.

17. The system of claim 14 wherein the fiducials comprise inherent features of the second object that can be trained for camera space recognition by image recognition software.

18. The system of claim 14 wherein the fiducials comprise a plurality or cloud of fiducials.

19. The system of claim 14 wherein the first object is a motive source and the second object is a towed implement.

20. The system of claim 14 wherein the first object is independent of the second object.

21. The system of claim 14 including a processor to store the estimated position for use with a follow along pass of the first object through the physical space after a first pass.

22. The system of claim 14 wherein the processor further comprises software for at least one of:
  a. filtering irrelevant content from the acquired image of the second object; and
  b. compensating for drift of the first object relative to a pre-determined path through the physical space.

23. The system of claim 14 wherein the calibration position is generated by training, image recognition, or references based on shape or a grid.

* * * * *